United States Patent [19]

Curtis, Jr. et al.

[11] Patent Number: 4,741,484

[45] Date of Patent: May 3, 1988

[54] APPARATUS AND METHOD FOR WINDING A MAGNETIC CORE FOR TOROIDAL TRANSFORMER

[75] Inventors: Joe E. Curtis, Jr., Lexington, Ky.; Clair E. Piatt, Bronson, Mich.; John L. Fisher, Lexington; John E. Cloyd, Versailles, both of Ky.

[73] Assignee: Kuhlman Corporation, Troy, Mich.

[21] Appl. No.: 11,454

[22] Filed: Feb. 6, 1987

Related U.S. Application Data

[63] Continuation of Ser. No. 662,330, Oct. 17, 1984, abandoned.

[51] Int. Cl.[4] .................... H01F 41/02; H02K 15/04; B65H 81/02

[52] U.S. Cl. .................................. 242/703; 242/4 R; 242/55.18; 242/76

[58] Field of Search ............ 242/703, 4 R, 4 B, 4 BE, 242/4 A, 54 R, 55.18, 55.19 R, 76; 29/605; 140/42.2

[56] References Cited

U.S. PATENT DOCUMENTS

| | | | |
|---|---|---|---|
| 1,984,778 | 12/1934 | Tross | 242/54 R |
| 2,245,180 | 6/1941 | Boyajian | 242/4 R |
| 2,443,248 | 6/1948 | Hurley | 242/55.18 |
| 2,492,713 | 12/1949 | Roy | 242/76 |
| 2,570,929 | 10/1951 | Fitch et al. | 242/76 |
| 3,258,212 | 6/1966 | LaTour | 242/55 |
| 3,484,051 | 12/1969 | Feinberg | 242/55.19 R |
| 3,786,353 | 1/1974 | Pun | 324/154 |
| 4,012,006 | 3/1977 | Leshik | 242/55.19 R |
| 4,145,014 | 3/1979 | Chatard et al. | 242/54 R |

FOREIGN PATENT DOCUMENTS

| | | |
|---|---|---|
| 221001 | 6/1909 | Fed. Rep. of Germany . |
| 479292 | 7/1929 | Fed. Rep. of Germany . |
| 2309109 | 11/1976 | France . |
| 19116 | of 1912 | United Kingdom . |
| 1079815 | 8/1967 | United Kingdom . |

OTHER PUBLICATIONS

European Search Report EP87200039.
"Amorphous Metallic Alloys" by F. E. Luborsky *Butterworths Monographs in Materials,* 1983.

*Primary Examiner*—Stuart S. Levy
*Assistant Examiner*—Joseph J. Hail, III
*Attorney, Agent, or Firm*—Townsend and Townsend

[57] ABSTRACT

A toroidal elecrical transformer having a low voltage coil, a high voltage coil and an annular magnetic core is disclosed. The preferred low voltage and high voltage coils are each continuous and form an arcuate elongated passage therethrough. The preferred annular magnetic core is wound in place in said arcuate elongated passage substantially from a continuous strip of magnetic material resulting in a toroidal transformer with continuous windings and a continuous wound core. Various components and sub-assemblies are also disclosed along with various apparatus and methods for producing such toroidal electrical transformers, its components and its sub-assemblies.

48 Claims, 40 Drawing Sheets

Fig-2
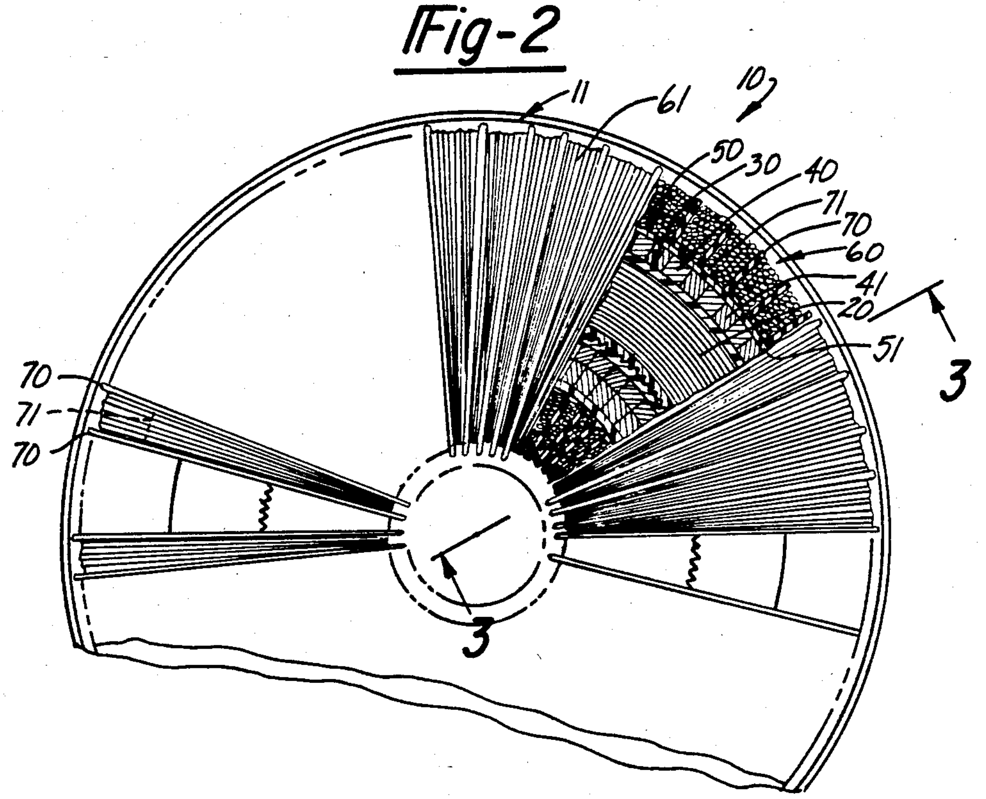
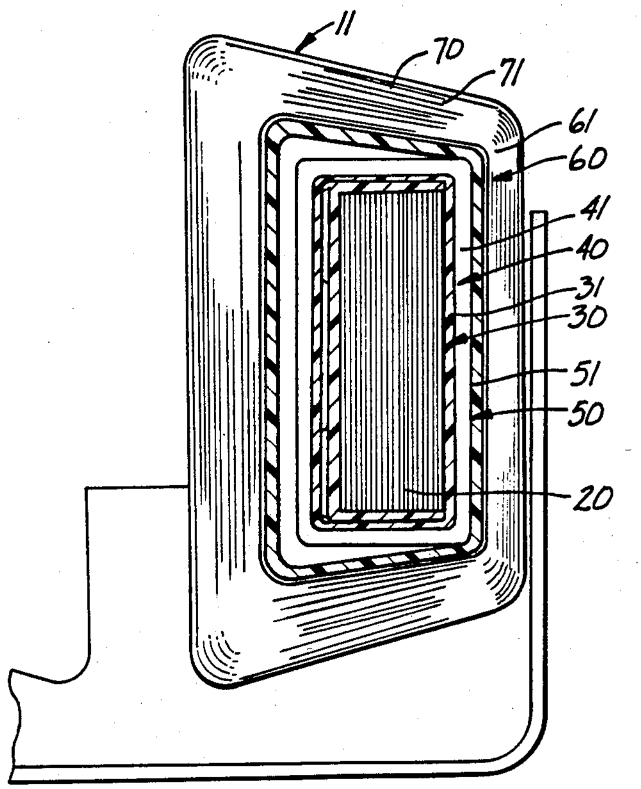
Fig-3

Fig-4
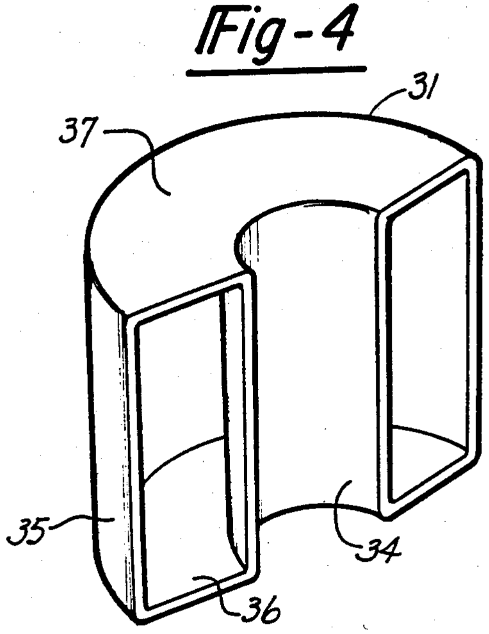
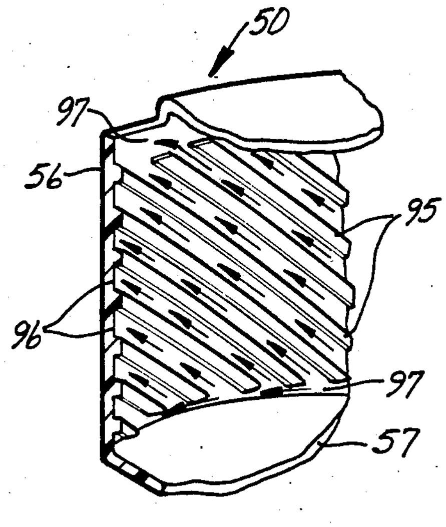
Fig-4a
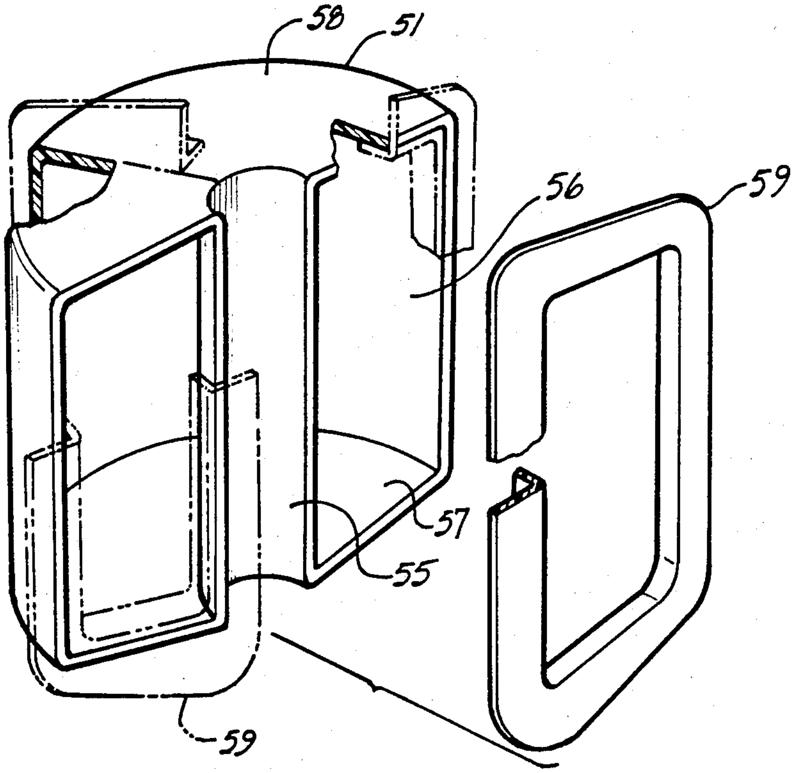
Fig-5

Fig-18
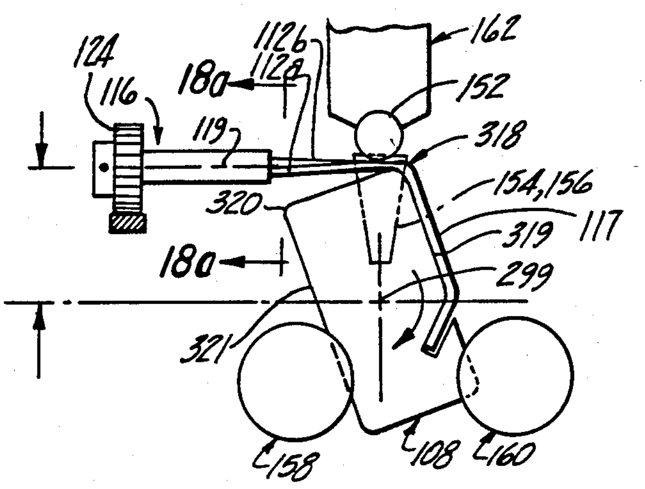
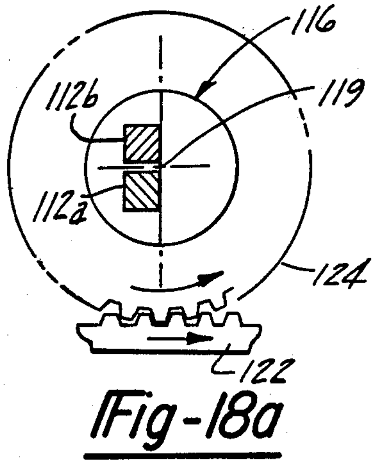
Fig-18a
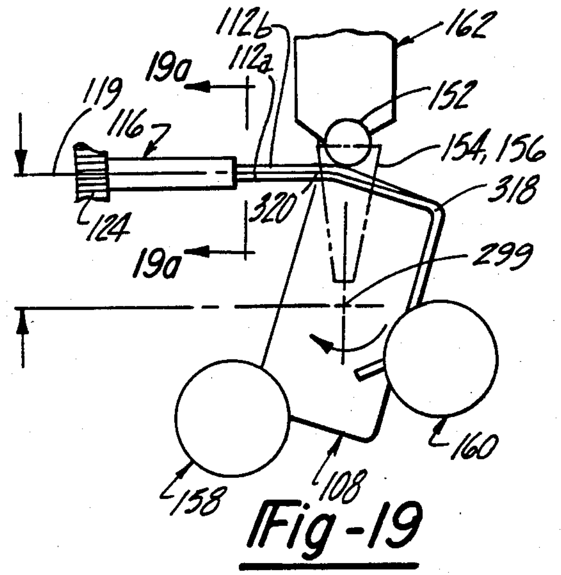
Fig-19
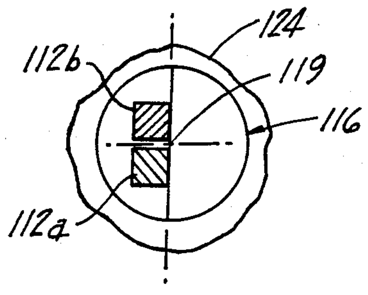
Fig-19a
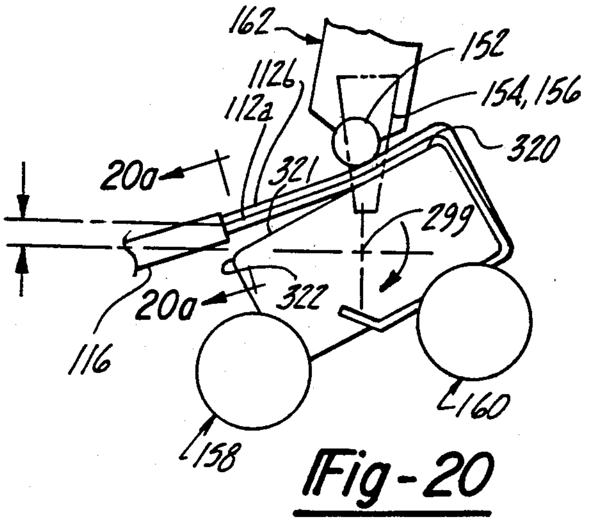
Fig-20
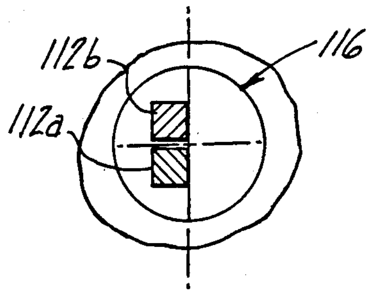
Fig-20a Fig-21
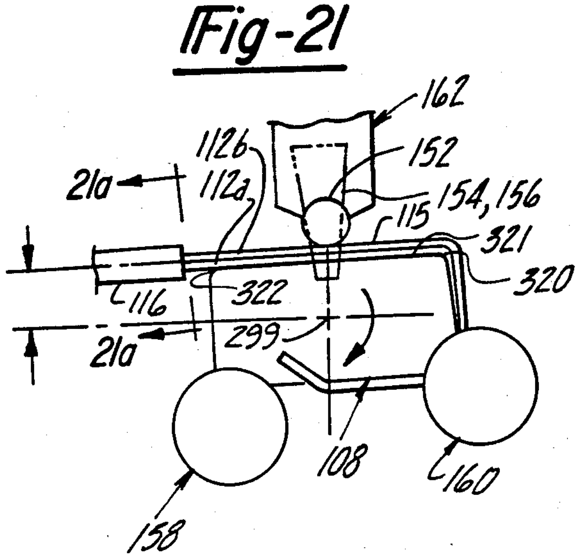
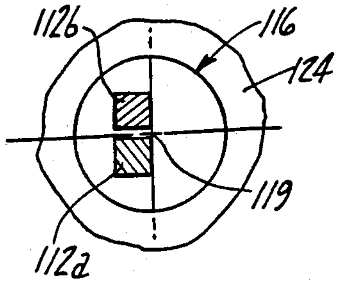
Fig-21a
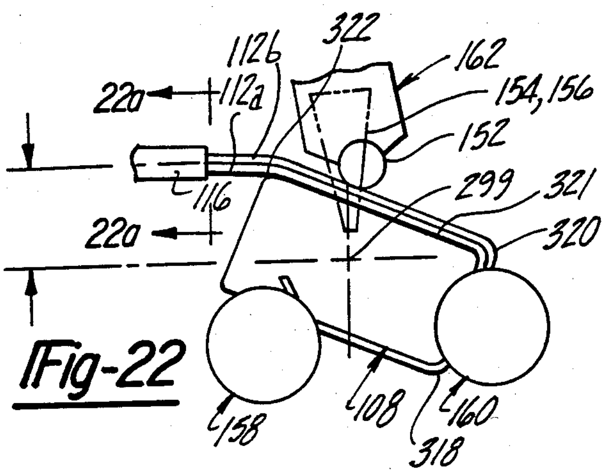
Fig-22
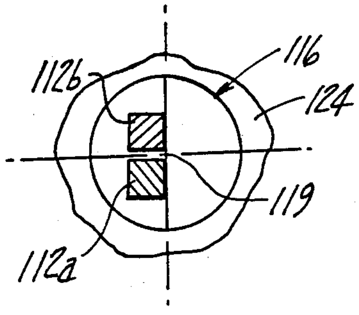
Fig-22a
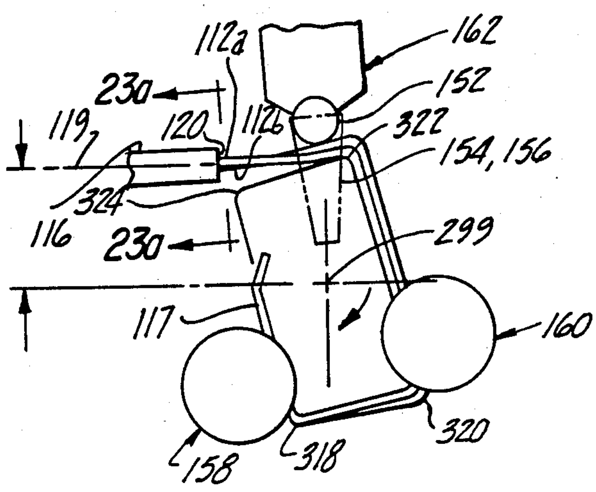
Fig-23
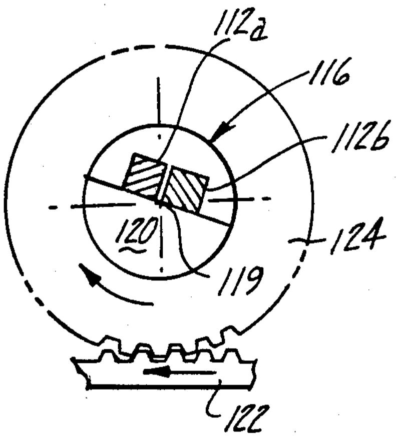
Fig-23a Fig-30
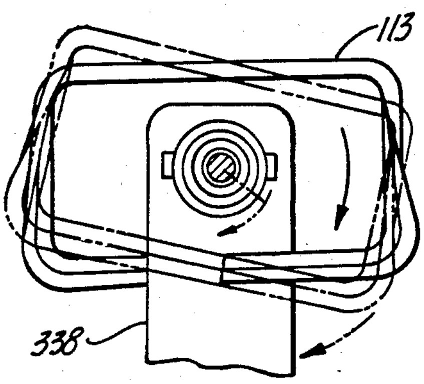
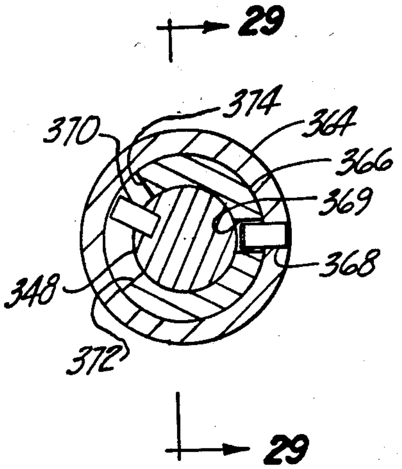
Fig-28
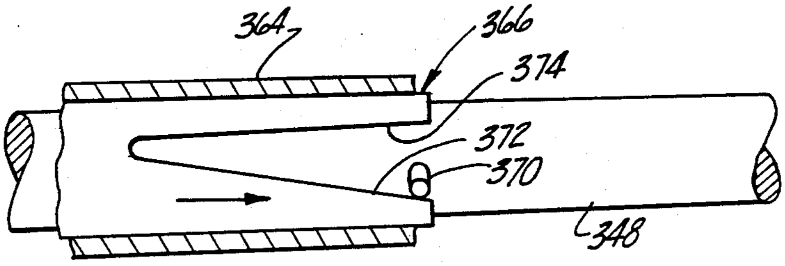
Fig-29a
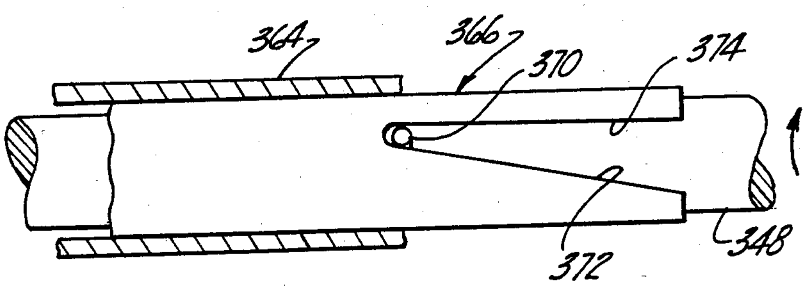
Fig-29b
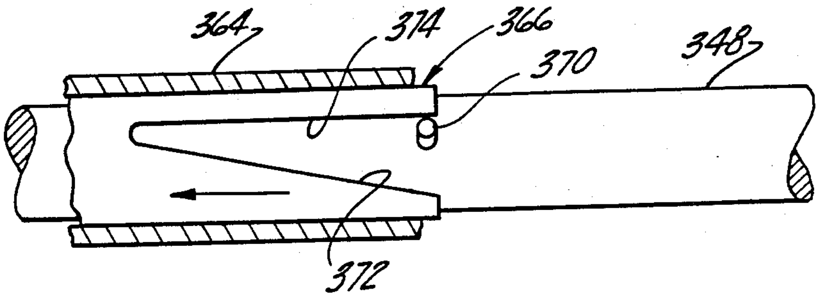
Fig-29c

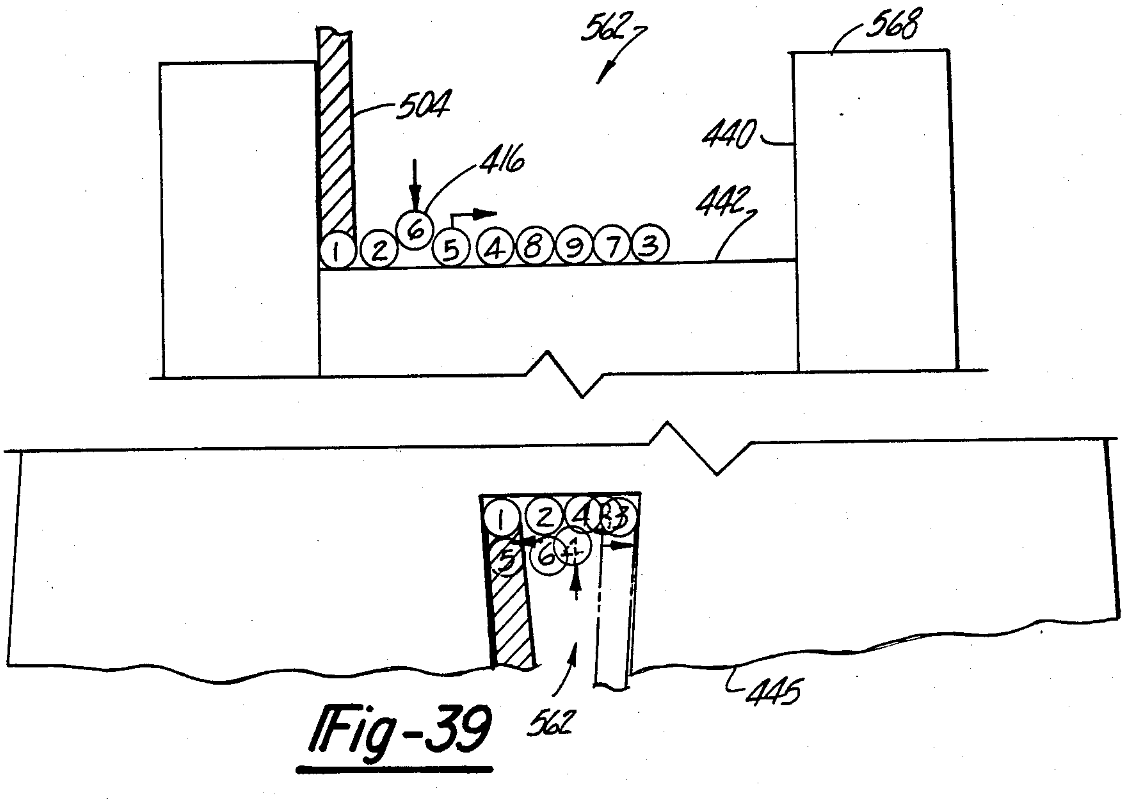
Fig-39
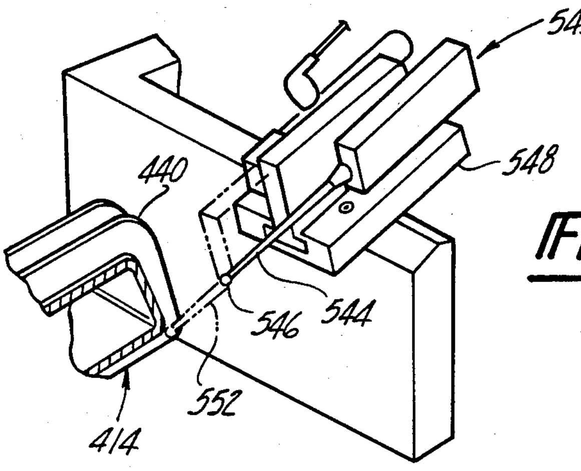
Fig-34a
Fig-34
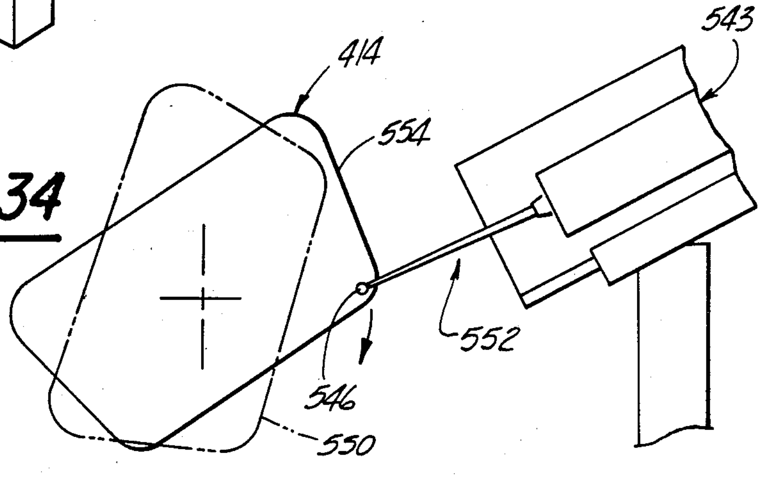

APPARATUS AND METHOD FOR WINDING A MAGNETIC CORE FOR TOROIDAL TRANSFORMER

This is a continuation of application Ser. No. 662,330, filed Oct. 17, 1984, now abandoned.

BACKGROUND OF THE INVENTION

The present invention constitutes both improvements to and additional inventions over the inventions disclosed in my co-pending Application Ser. No. 07/005,326, filed Jan. 6, 1982, entitled "Toroidal Electrical Transformer and Method for Making Same." The entirety of the disclosure of said co-pending application is incorporated herein by reference thereto.

SUMMARY 0F THE INVENTION

In general, this Application and the aforementioned co-pending Application are directed to new toroidal transformer designs and construction apparatus and methods which improve the efficiency of the transformer in several respects. For example, the inventions provide a toroidal transformer which is highly energy efficient in that the loss of electrical energy to heat is reduced both during periods of power conversion and periods of idling with little or no power conversion. Improved energy efficiency is obtained through both lower core losses and lower winding losses. Secondly, the transformer is volumetrically efficient in that a transformer with a given power rating has a relatively small volume and an advantageous cylindrical configuration, being therefore well suited for tank enclosures. Thirdly, the transformer is materials efficient in that a minimal amount of costly construction materials are required to manufacture the transformer. Fourthly, the transformer is manufacturing efficient in that it can be manufactured with efficient and highly-automated processes using a minimum of expensive manual labor. Fifthly, it is design efficient in that a wide variety of power ratings and utility requirements can be met with the same basic design produced on the same basic machines. Sixthly, it is thermally-efficient in that there is good thermal transfer from the heat producing components to an oil bath in which the transformer resides without need for special cooling devices. Seventhly, it is mechanically efficient since the toroidal shape is readily supported to reduce the possibilities of damage during transportation, installation and use. For example, the good mechanical mounting characteristics provides a sturdy structure having good resistance to shock forces applied to the transformer during short circuit conditions. Eighthly, it is noise efficient since the core is uncut and uses steel which is rolled in the direction of the flux path within the core thereby reducing noise generated either by high-magnetic induction at core cuts or by magneto-striction effects. Ninthly, it is aging efficient since both low thermal gradients and low hot spot temperatures contribute to a long life without substantial degradation of performance. Tenthly, it is E.M.I. efficient since its uncut core lowers exciting currents which in turn lower electromagnetic interference of telephone communications and the like.

The present invention differs from the invention of said copending application in a number of significant respects. Exemplary of those differences, but not inclusive of all such differences, are the following.

The present invention includes a low voltage coil winding machine and method for winding pie-shaped coils on a mandrel from a conductor comprising one or more continuous wires which in toto have one cross-sectional dimension greater than the orthogonal cross-sectional dimension by alternately twisting the conductor as it is being wound upon the mandrel so that the greater cross-sectional dimension of the conductor is oriented radially at the inner portion of the pie-shaped coil and the lesser cross-sectional dimension of the conductor is oriented radially at the outer portion of the pie-shaped coil. The present invention also provides a low voltage coil winding machine and method having a non-cylindrical forming mandrel with a forming cavity which moves radially as the forming mandrel rotates, and a directing head which is movably mounted for feeding the wire to the radially-moving forming window as the forming mandrel rotates. Furthermore, this invention provides a low voltage coil winding machine and method which has a non-cylindrical forming mandrel which is confronted by a peripheral roller and a side roller for engaging the conductor, and in which the peripheral roller is moved transversely with respect to the axis of the side roller for maintaining the line of engagement between the peripheral roller and the conductor in substantially the same plane as the line of engagement between the side roller and the conductor. The present invention also provides a low voltage coil winding machine and method for winding directionally oriented coils about a mandrel in which the coils are underbent on the mandrel due to material springback, including means for overwinding the coils after the coils leave the mandrel to compensate for springback.

The present invention still further provides a high voltage coil winding machine and method which winds conductor into a cavity in a winding mandrel having sides converging towards the opening of the cavity, and which has guide means with a portion extending into the cavity for accurately positioning the conductor within the cavity as the mandrel rotates. The present invention also provides a high voltage coil winding machine and method for winding a conductor onto a winding mandrel having one portion which is substantially straight and which includes a guide wheel for providing a reverse bend in the conductor before it is wound on the mandrel to reduce the bowing of the conductor away from the mandrel. The present invention still further provides a high voltage coil winding machine and method for winding a conductor into a plurality of coil bundles on a winding mandrel having a plurality of axially spaced annular cavities, and which has guide means for accurately locating the conductor with respect to the annular cavities, a measuring device for measuring the position of the cavities and positioning means for positioning the guide means with respect to each cavity in accordance with the measured position of each cavity.

The present invention still further provides a method and apparatus for dereeling a strip of core material from the inside of a pre-wound coil by rotating the coil, directing the strip away from the coil and applying a reaction force along the strip of material in a direction to resist the dereeling of the strip thereby limiting the degree of bending of the strip as it is dereeled from the inside of the pre-wound coil. The present invention additionally provides a method and apparatus for winding core material into an arcuate passage through preformed windings by rotating the core within the arcuate passage to wind up the core, and by applying a frictional drag force about the periphery of the core as it is being wound. The present invention still additionally provides a method and apparatus for winding core material onto a flanged bobbin in an arcuate passage through pre-formed windings by rotating the bobbin and applying a radially inward force on the core as the bobbin is rotated to limit lifting of the core material upon contact with the flanges of the bobbin. The present invention still additionally provides a method and apparatus for winding core material into an arcuate passage through pre-formed windings which are rotatable from a first position occupied by the pre-formed windings in use to a second position in which the pre-formed windings are separated to provide a passage to facilitate wind in of the core material using a movable wedge member for rigidly wedging said pre-formed windings in said second position during wind in of the core material.

The features and advantages of the products, methods and machines described in the specification are not all-inclusive, many additional features and advantages being apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

FIG. 2 is a partially cut-away top view of the toroidal electrical transformer of FIG. 1, less the transformer support structure.

FIG. 3 is a cross-sectional view of a portion of the toroidal electrical transformer taken along line 3—3 of FIG. 2, less the transformer support structure.

FIG. 4 is a perspective view of one section of the preferred core insulation tube of the present invention.

FIG. **4*a*** is a fragmented perspective view of one of the insulation members of the preferred toroidal electrical transformer, illustrating a preferred cooling fluid channel structure.

FIG. 5 is an exploded perspective view of one section of the preferred high/low insulation barrier of the present invention.

Figure 6:
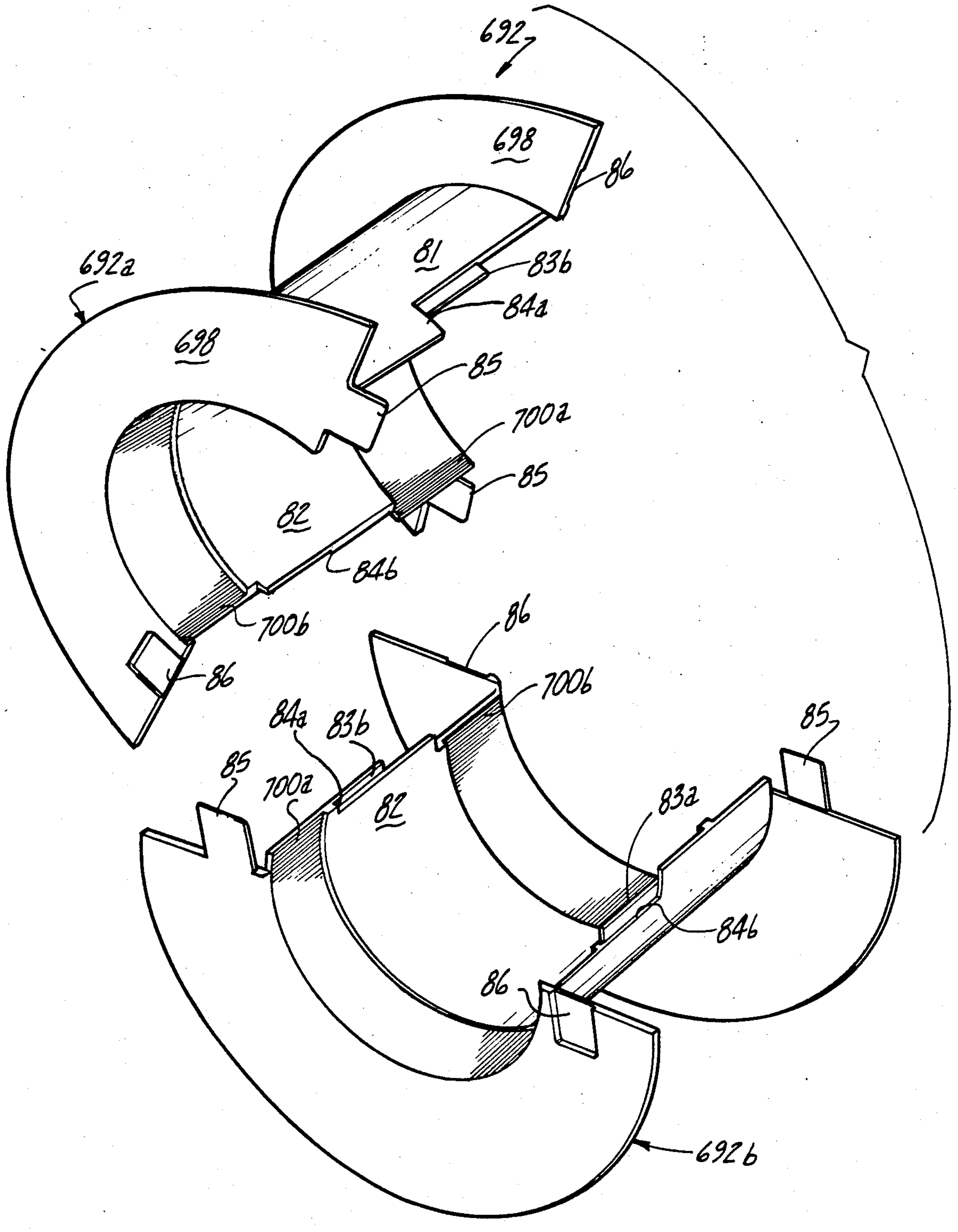

FIG. 6 is an exploded perspective view of a core wind-in bobbin of the present invention.

Figure 7:
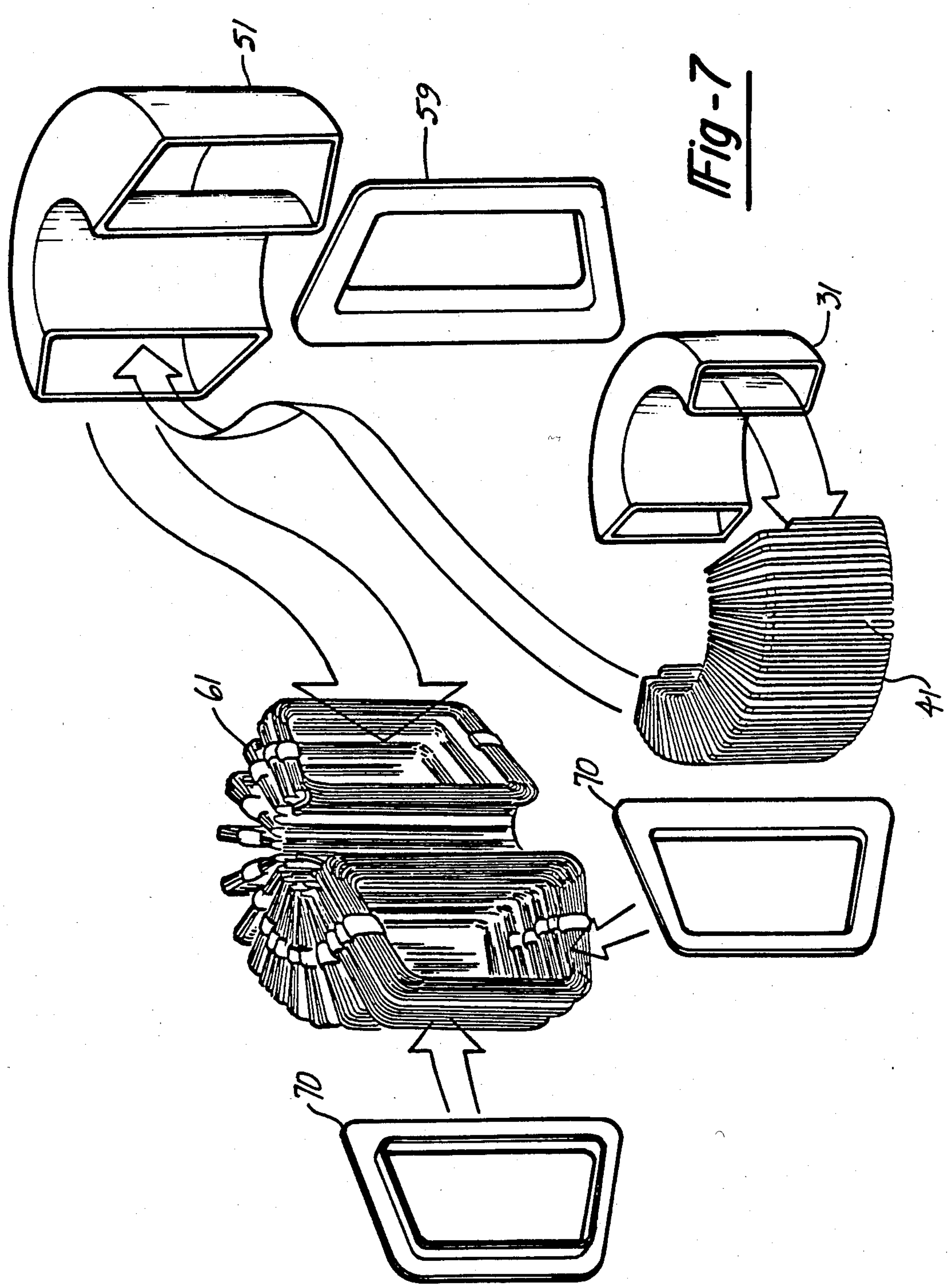

FIG. 7 is a schematic view illustrating the preferred assembly of the major transformer components prior to installation of the magnetic core.

Figure 8:
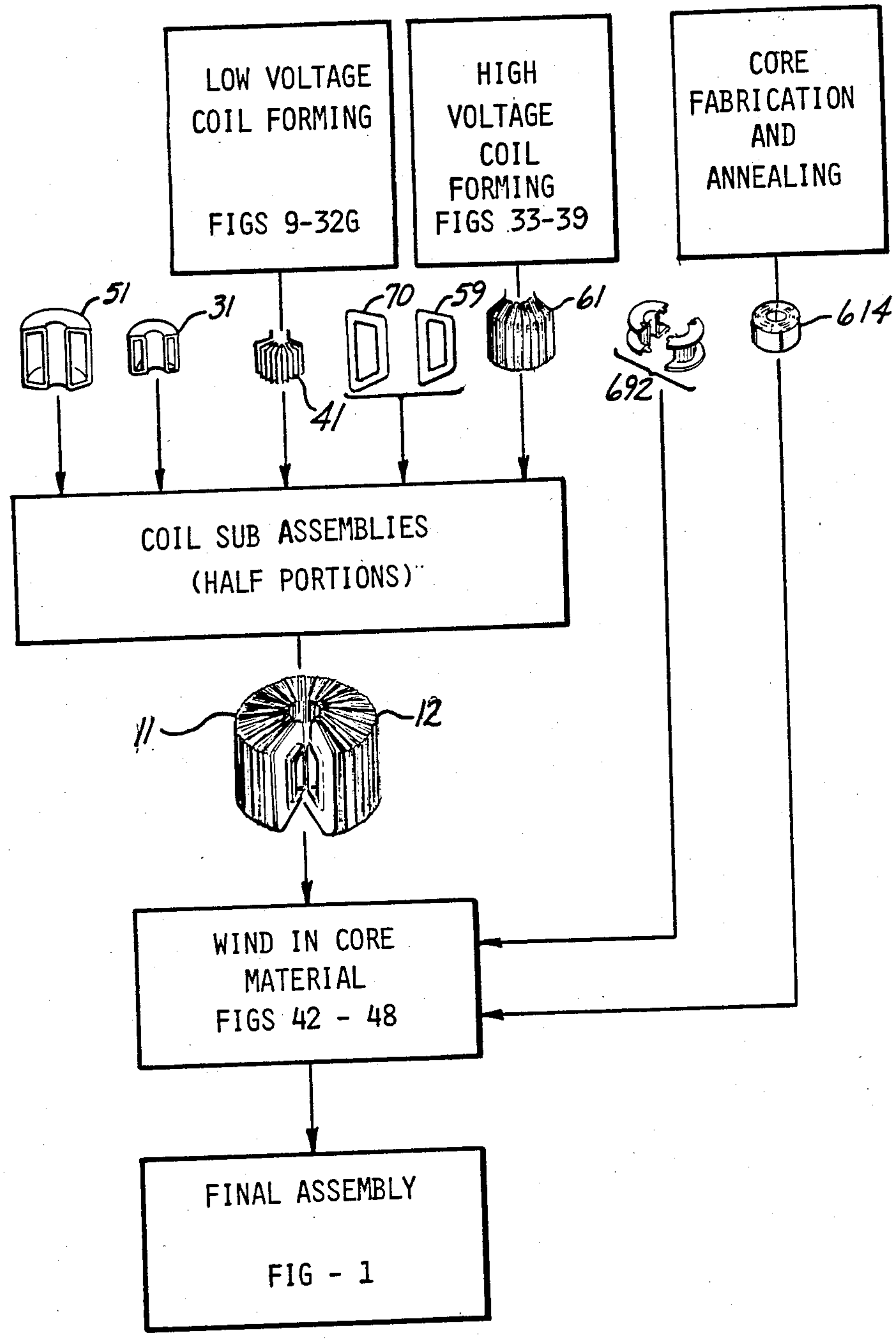

FIG. 8 is a block diagram, generally illustrating the preferred method of manufacturing a toroidal electrical transformer according to the present invention.

Figure 9:
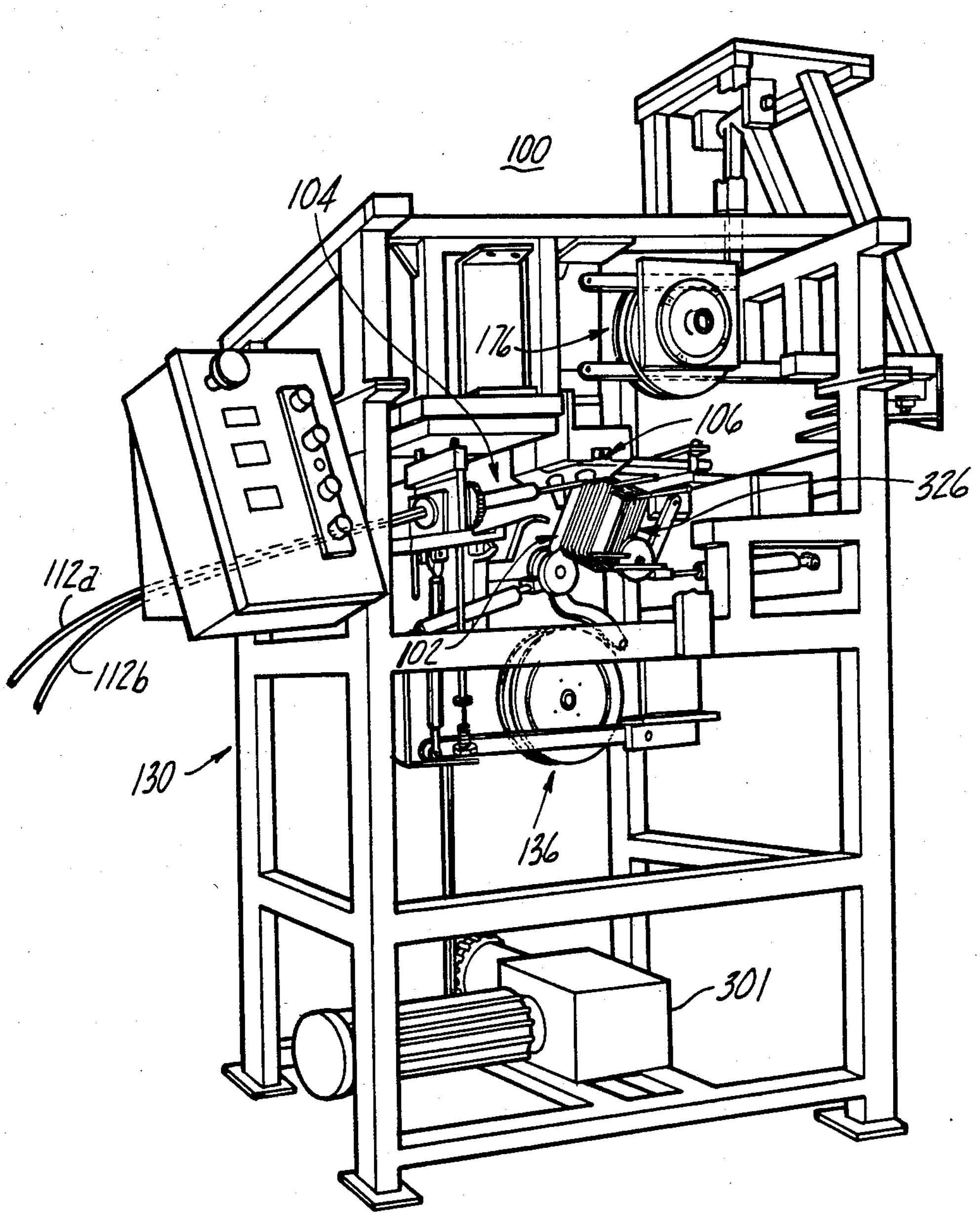

FIG. 9 is an overall view of a preferred low voltage conductor winding machine used in connection with the present invention.

Figure 10:
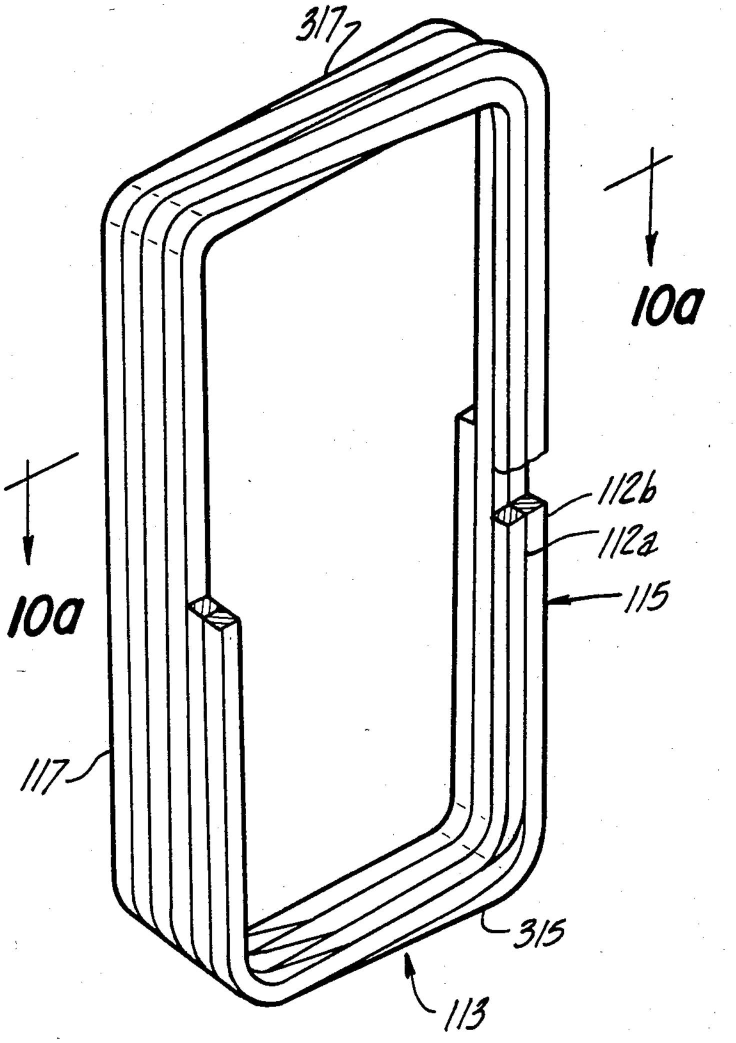

FIG. 10 is a perspective view of a few coils of a low voltage winding as produced by the low voltage conductor winding machine of FIG. 9.

FIG. **10*a* is a plan view in section of a few coils of the low voltage winding of FIG. 10 and is taken along line 10*a*–10*a* of FIG. 10**.

FIG. **10*b* is a perspective view of a forming mandrel of the low voltage conductor winding machine of FIG. 9**.

Figure 11:
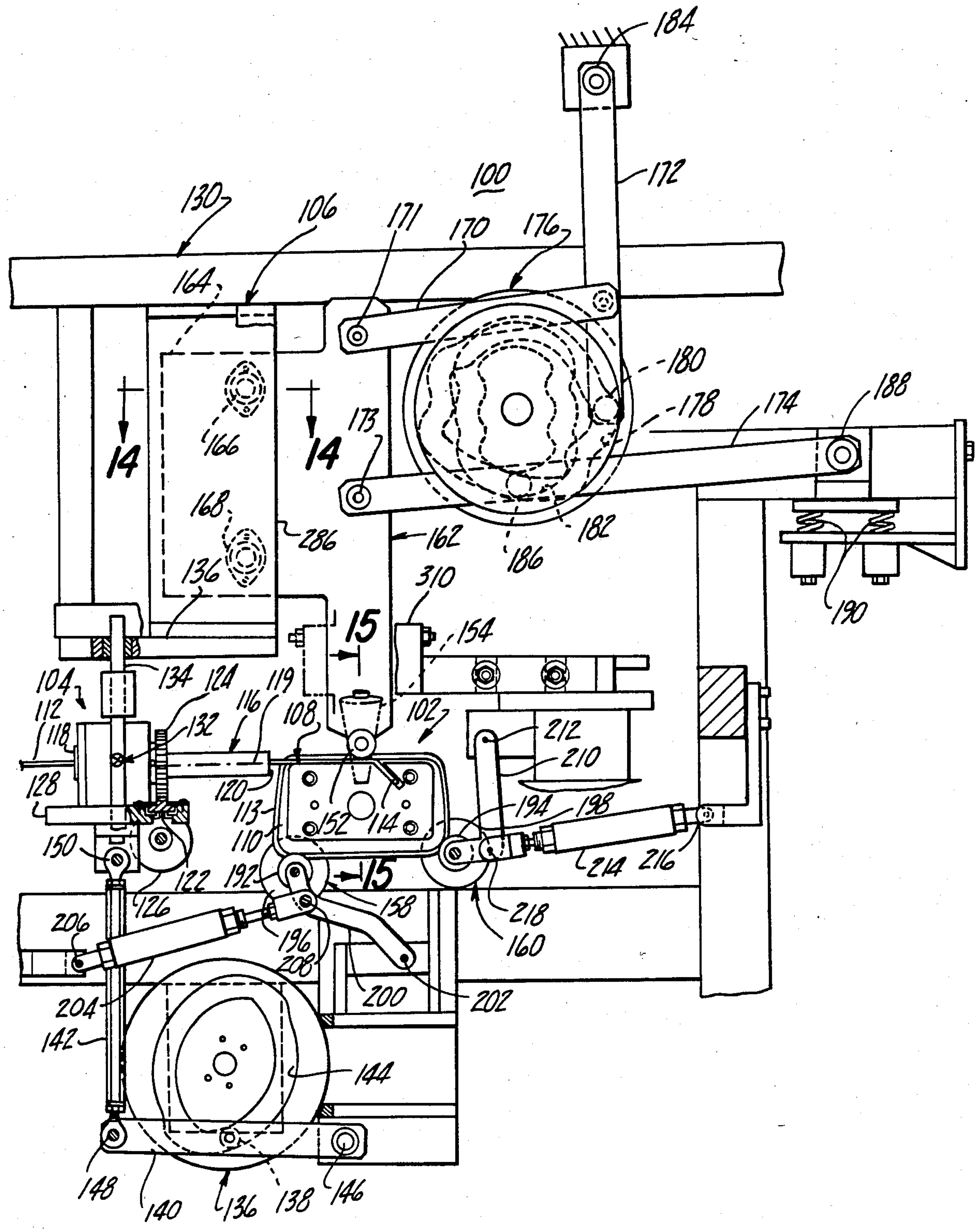

FIG. 11 is a side elevation view of the low voltage conductor winding machine of FIG. 9.

Figure 12:
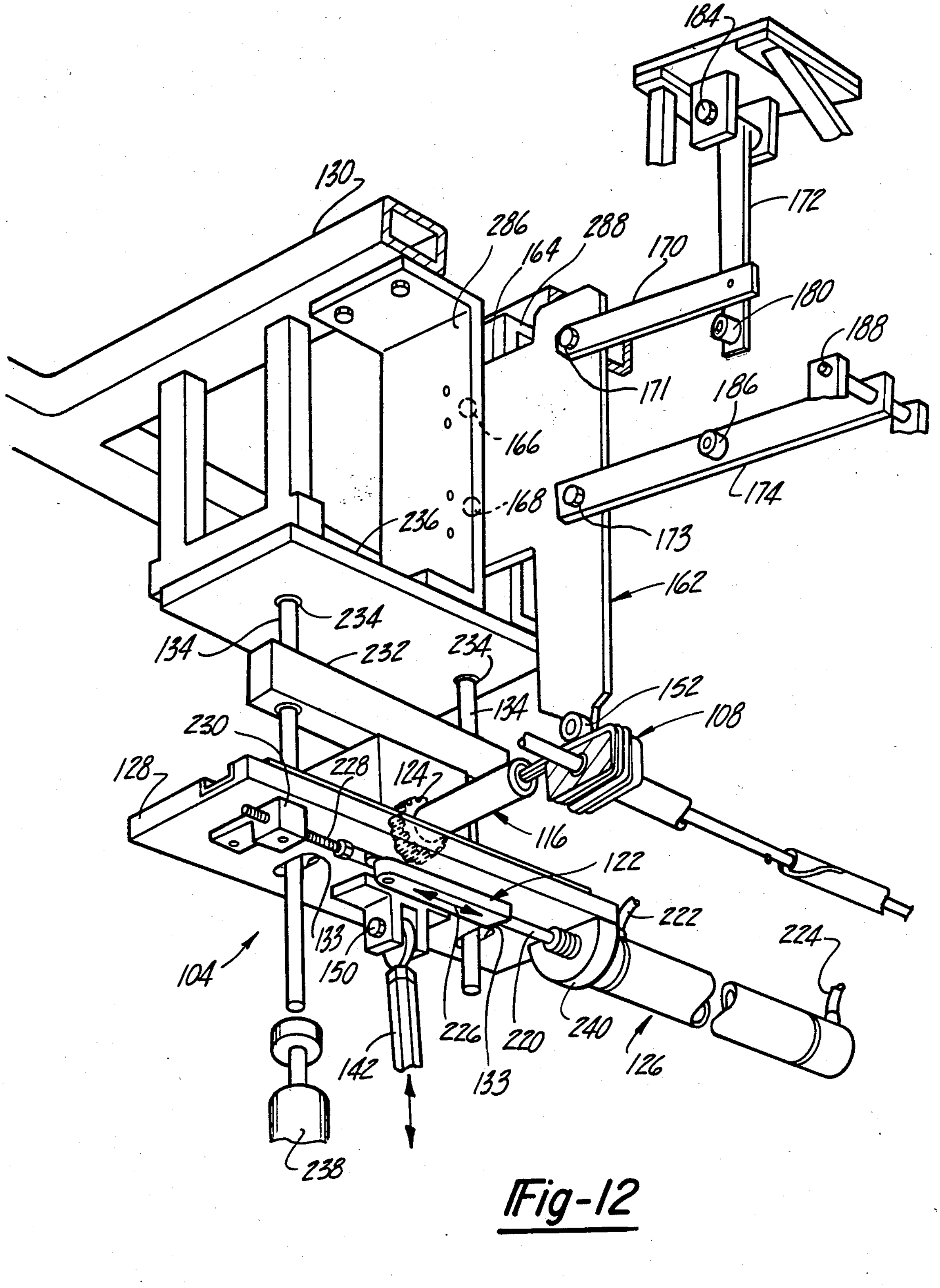

FIG. 12 is a perspective view of a twist head subassembly of the low voltage conductor winding machine of FIG. 9.

Figure 13:
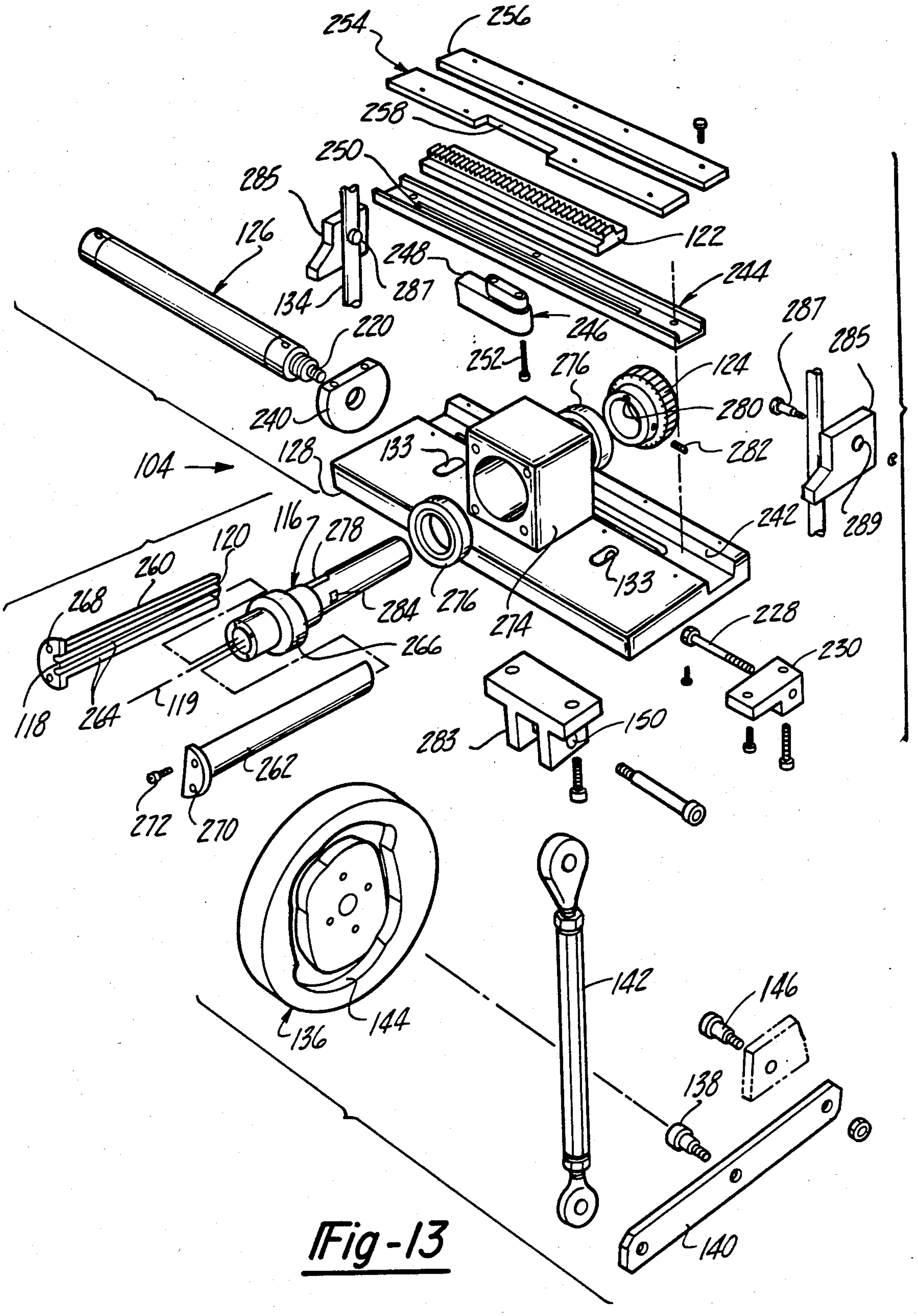

FIG. 13 is an exploded perspective view of the twist head subassembly of FIG. 12.

FIG. **13*a*** is a perspective detail view of a twist head table illustrating its pivotable mounting.

Figure 14:
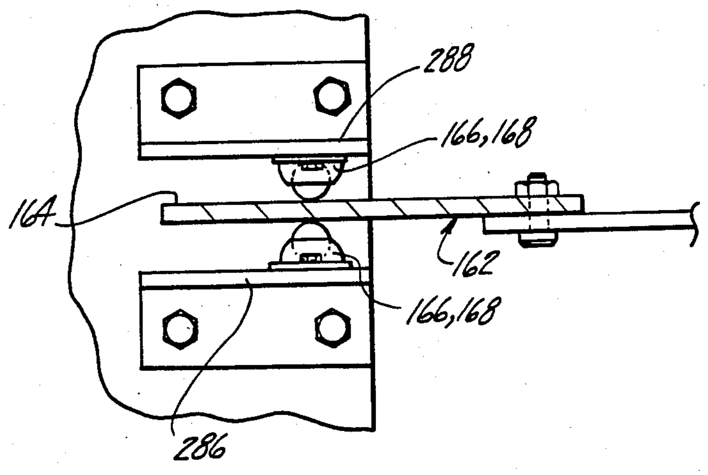

FIG. 14 is a sectional detail view of a portion of the low voltage conductor winding machine of FIG. 9 and is taken along line 14—14 of FIG. 11.

Figure 15:
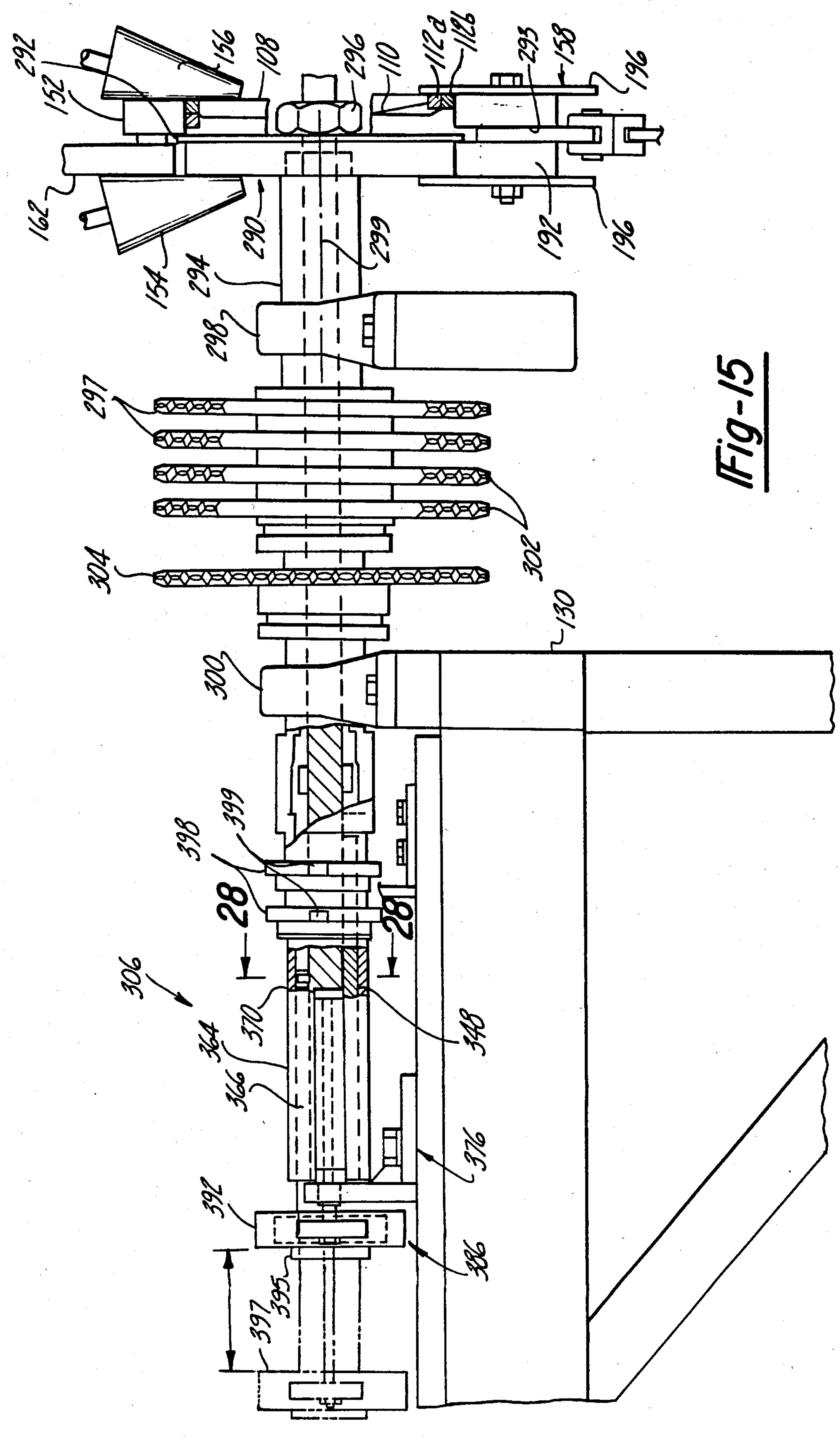

FIG. 15 is a front elevation view of a forming mandrel subassembly of the low voltage conductor winding machine of FIG. 9.

Figure 16:
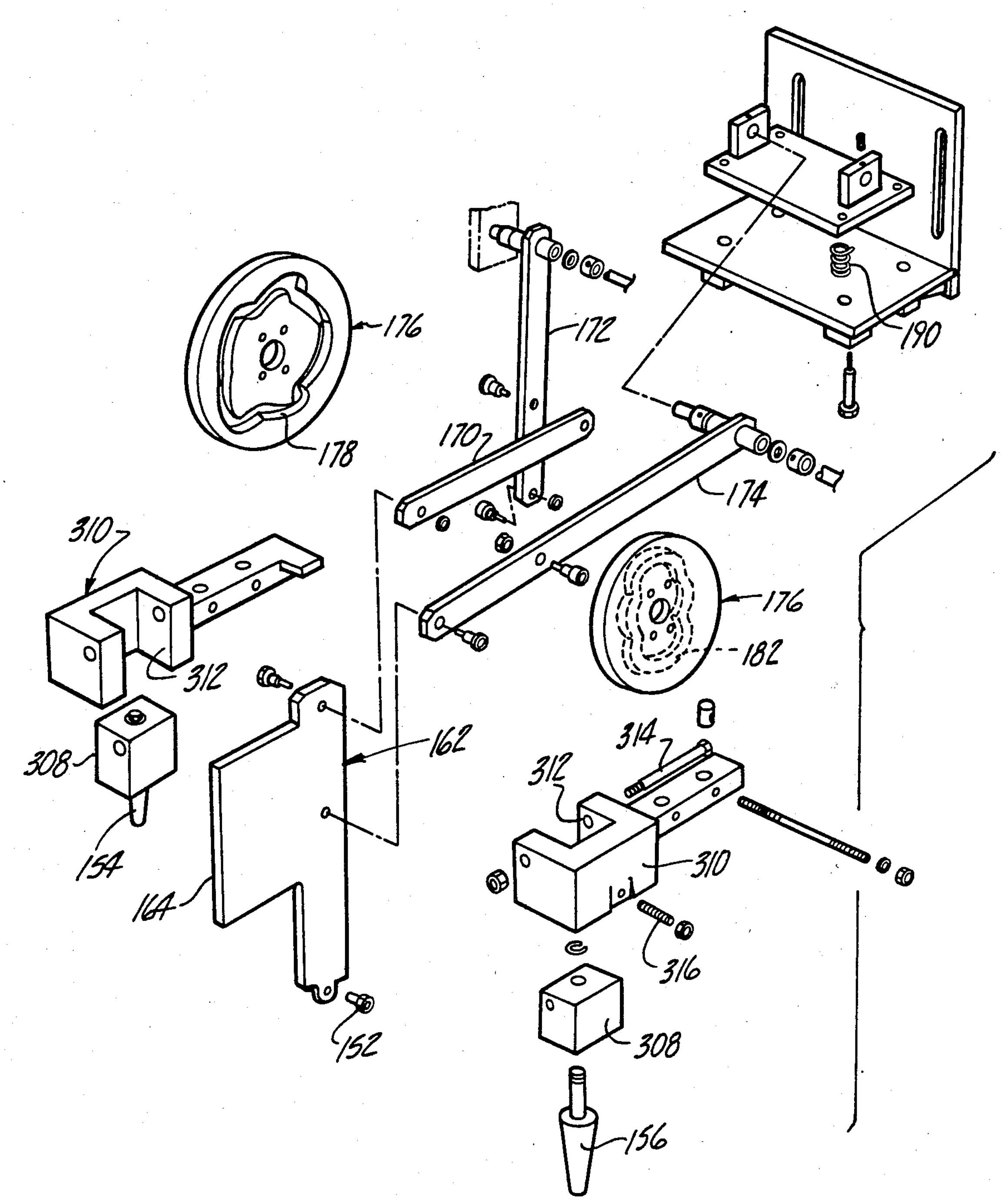

FIG. 16 is an exploded perspective view of side pressure rollers and associated mounting structure of the low voltage conduc:tor winding machine of FIG. 9.

FIGS. 17 through 24 are a series of sequential views of of the twist head and forming mandrel subassemblies of the low voltage conductor winding machine of FIG. 9.

Figures 17, 17A:
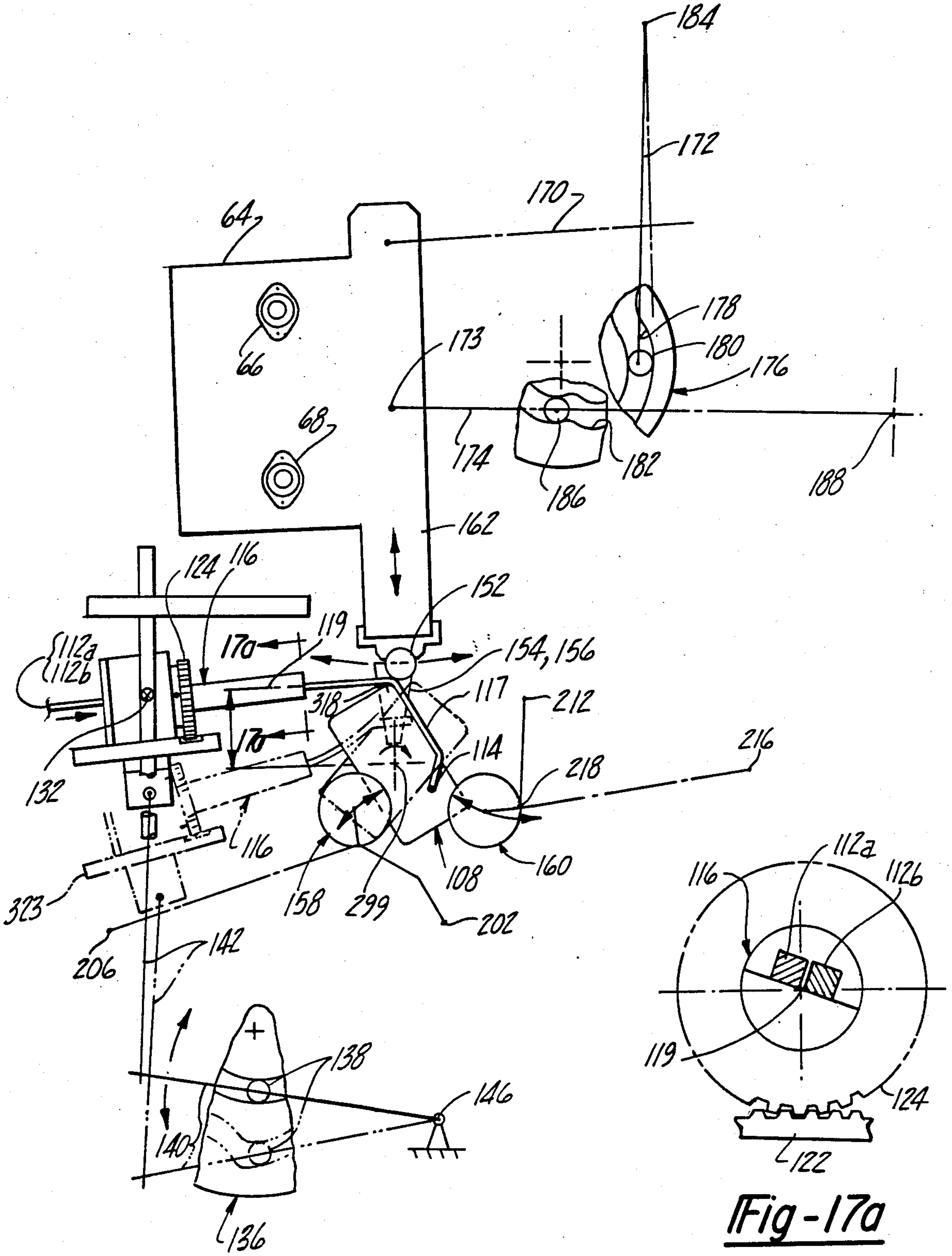

FIG. 17 is a side elevation view of the twist head and forming mandrel subassemblies at an initial stage in the formation of a low voltage conductor coil.

FIG. **17*a* is a sectional detail view of a portion of the twist head subassembly and is taken along line 17*a*–17*a* of FIG. 17**.

FIG. 18 is a side elevation view of the twist head and forming mandrel subassemblies at a later stage in the formation of a low voltage conductor coil.

FIG. **18*a* is a sectional detail view of a portion of the twist head subassembly and is taken along line 18*a*–18*a* of FIG. 18**.

FIG. 19 is a side elevation view of the twist head and forming mandrel subassemblies at a later stage in the formation of a low voltage conductor coil.

FIG. **19*a* is a sectional detail view of a portion of the twist head subassembly and is taken along line 19*a*–19*a* of FIG. 19**.

FIG. 20 is a side elevation view of the twist head and forming mandrel subassemblies at a later stage in the formation of a low voltage conductor coil.

FIG. **20*a* is a sectional detail view of a portion of the twist head subassembly and is taken along line 20*a*–20*a* of FIG. 20**.

FIG. 21 is a side elevation view of the twist head and forming mandrel subassemblies at a later stage in the formation of a low voltage conductor coil.

FIG. **21*a* is a sectional detail view of a portion of the twist head subassembly and is taken along line 21*a*–21*a* of FIG. 21**.

FIG. 22 is a side elevation view of the twist head and forming mandrel subassemblies at a later stage in the formation of a low voltage conductor coil.

FIG. **22*a* is a sectional detail view of a portion of the twist head subassembly and is taken along line 22*a*–22*a* of FIG. 22**.

FIG. 23 is a side elevation view of the twist head and forming mandrel subassemblies at a later stage in the formation of a low voltage conductor coil.

FIG. **23*a* is a sectional detail view of a portion of the twist head subassembly and is taken along line 23*a*–23*a* of FIG. 23**.

Figure 24:
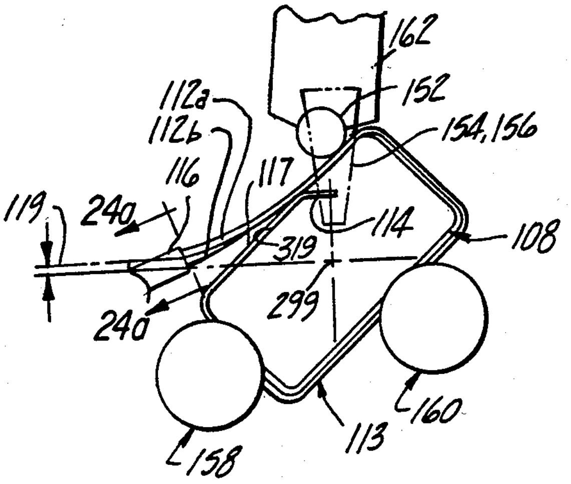

FIG. 24 is a side elevation view of the twist head and forming mandrel subassemblies at a later stage in the formation of a low voltage conductor coil.

Figure 24A:
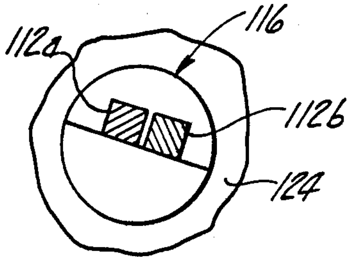

FIG. 24a is a sectional detail view of a portion of the twist head subassembly and is taken along line 24a-24a of FIG. 24.

Figure 25:
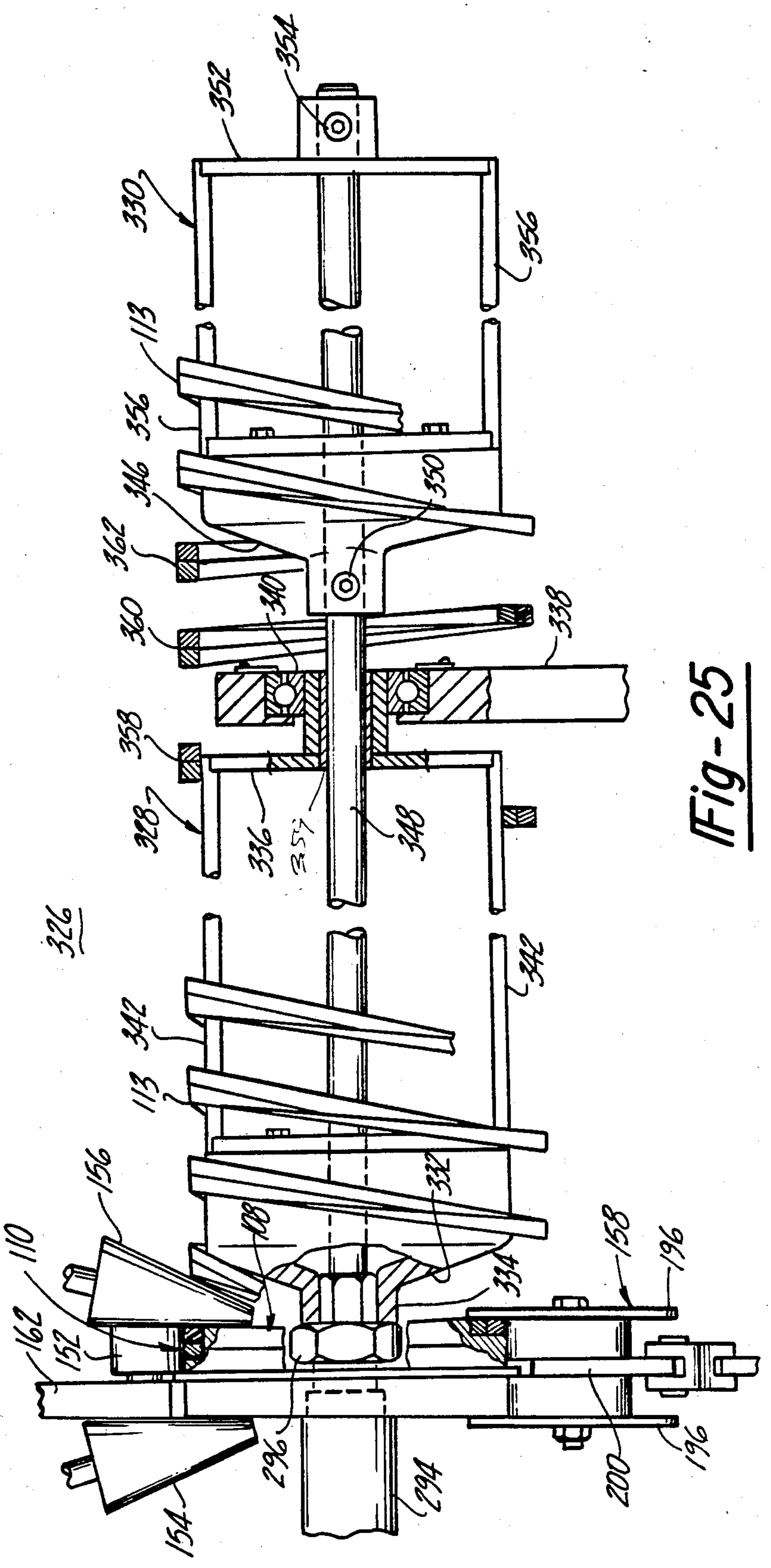

FIG. 25 is a front elevation view of a storage mandrel subassexl,ly of the low voltage conductor winding machine of FIG. 9.

Figure 26:
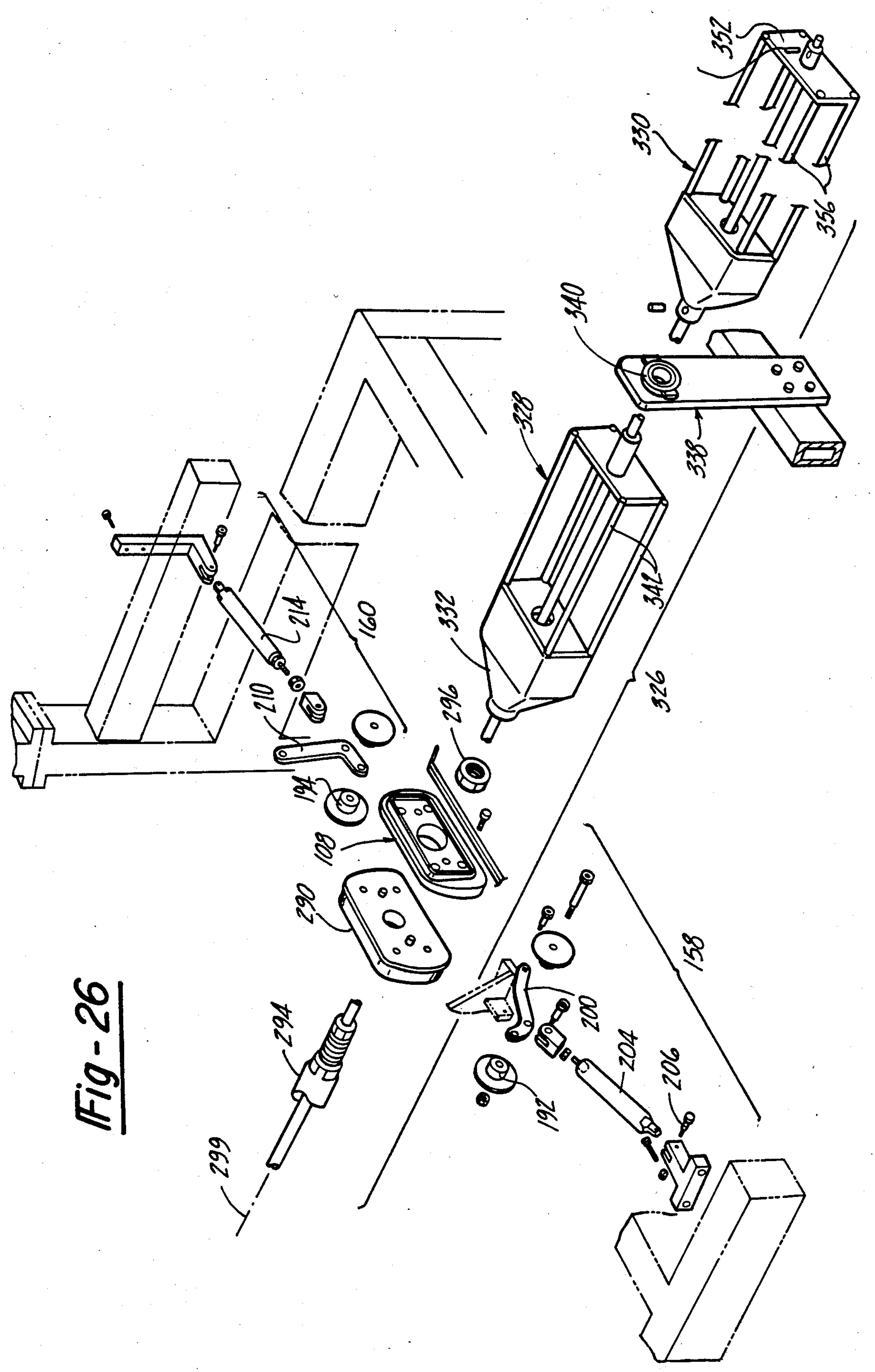

FIG. 26 is an exploded perspective view of the storage mandrel subassembly of FIG. 25.

Figure 27:
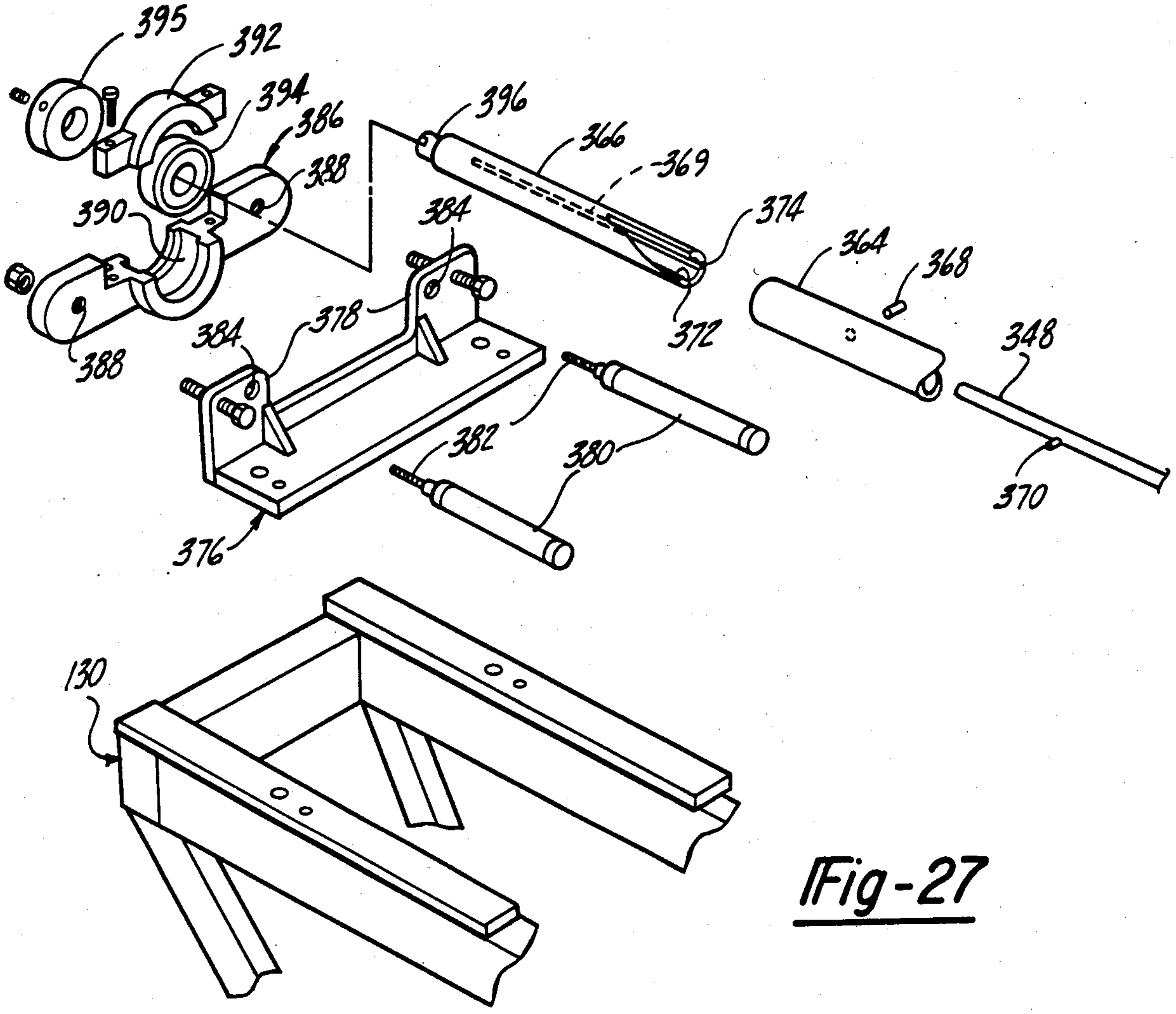

FIG. 27 is an exploded perspective view of an overtwist cam mechanism forming part of the storage mandrel subassembly of FIG. 25.

FIG. 28 is a sectional detail view of the overtwist cam mechanism of FIG. 27 and is taken along line 28—28 of FIG. 15.

FIG. 29a is a sectional detail view of the overtwist cam mechanism in a position prior to overwinding, and is taken along line 29—29 of FIG. 28.

FIG. 29b is a sectional detail view of the overtwist cam mechanism in a position during overwinding, and is taken along line 29—29 of FIG. 28.

FIG. 29c is a sectional detail view of the overtwist cam mechanism in a position after overwinding, and is taken along line 29—29 of FIG. 28.

FIG. 30 is a side elevation view of the storage mandrel subassembly during overwinding.

Figure 31A:
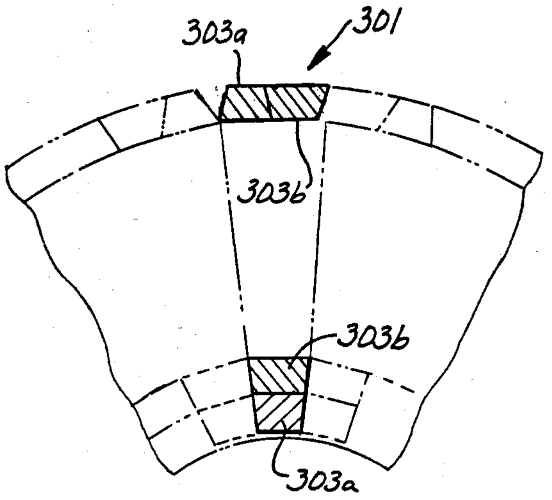

FIG. 31a is a plan view in section of a few coils of an alternative embodiment of a low voltage winding.

Figure 31B:
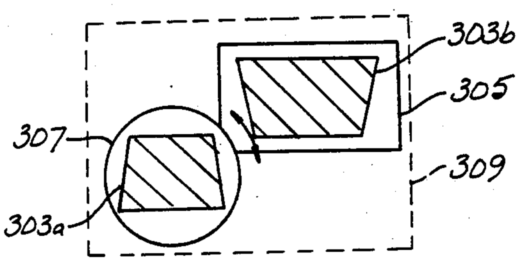

FIG. 31b and are views of a twist head and rollers in position for fcrming the outward portion of the low voltage winding of FIG. 31a.

Figure 31C:
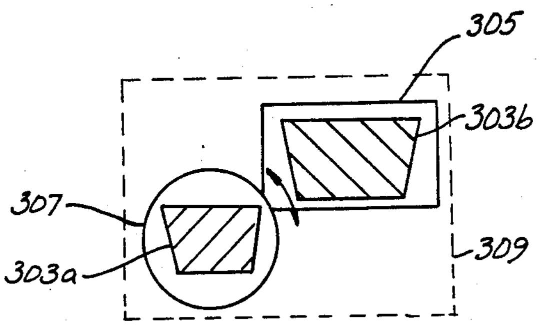
Figure 31D:
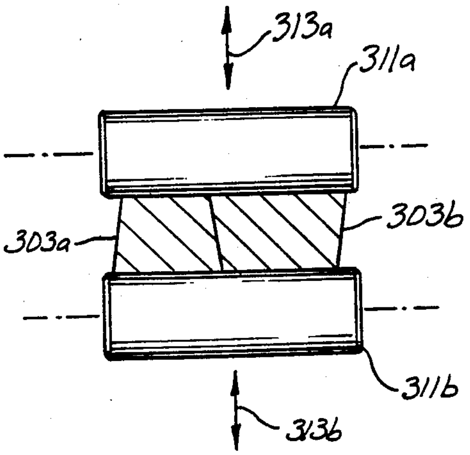
Figure 31E:
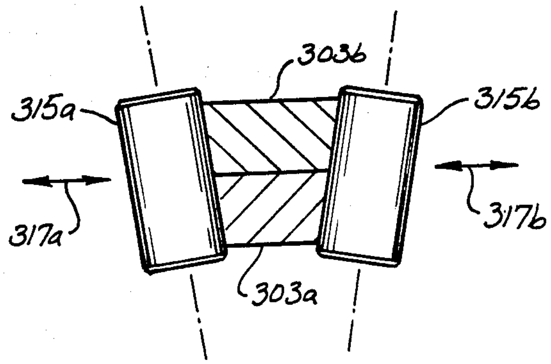

FIG. 31c and 31e are views of the twist head and rollers in position for forming the inward portion of the low voltage winding of FIG. 31a.

Figure 32A:
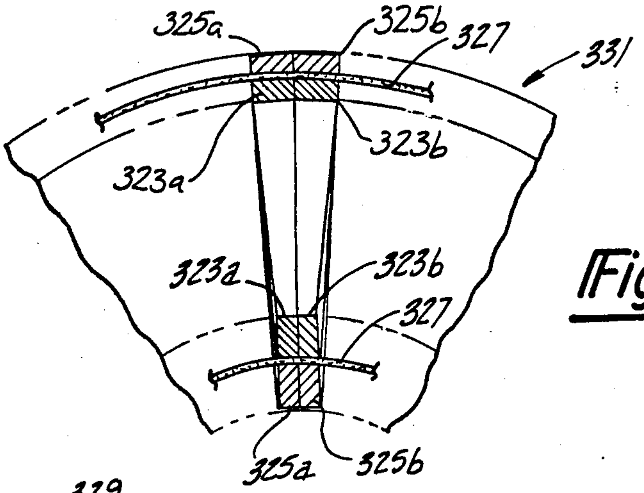

FIG. 32a is a plan view in section of a few coils of another alternative embodiment of a low voltage winding.

Figure 32B:
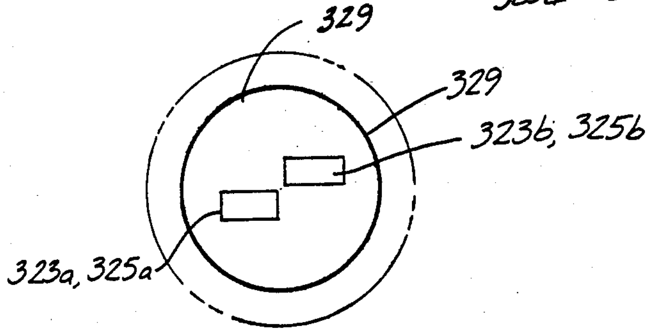

FIG. 32b is an end view of a twist head in position for forming the outward portion of the low voltage winding of FIG. 32a.

Figure 32C:
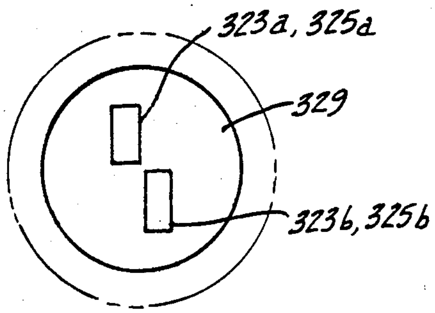

FIG. 32c is an end view of the twist head of FIG. 32b in position for forming the inward portion of the low voltage winding of FIG. 32a.

Figure 32D:
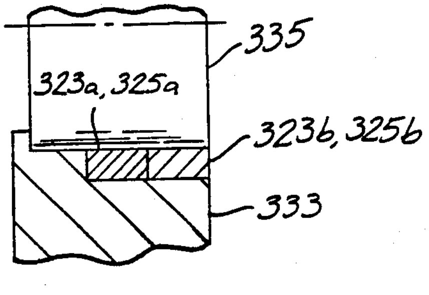

FIG. 32d is a sectional detail view of a forming mandrel during formation of the outward portion of the low voltage winding of FIG. 32a.

Figure 32E:
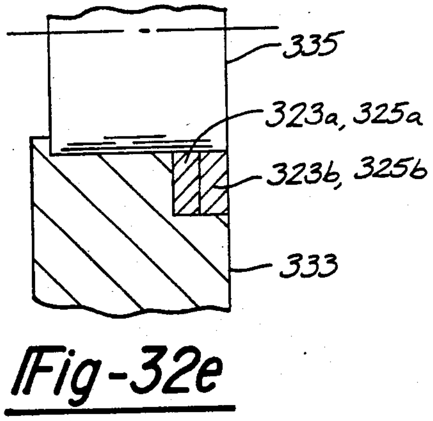

FIG. 32e is a sectional detail view of the forming mandrel during formation of the inward portion of the low voltage winding of FIG. 32a.

Figure 33:
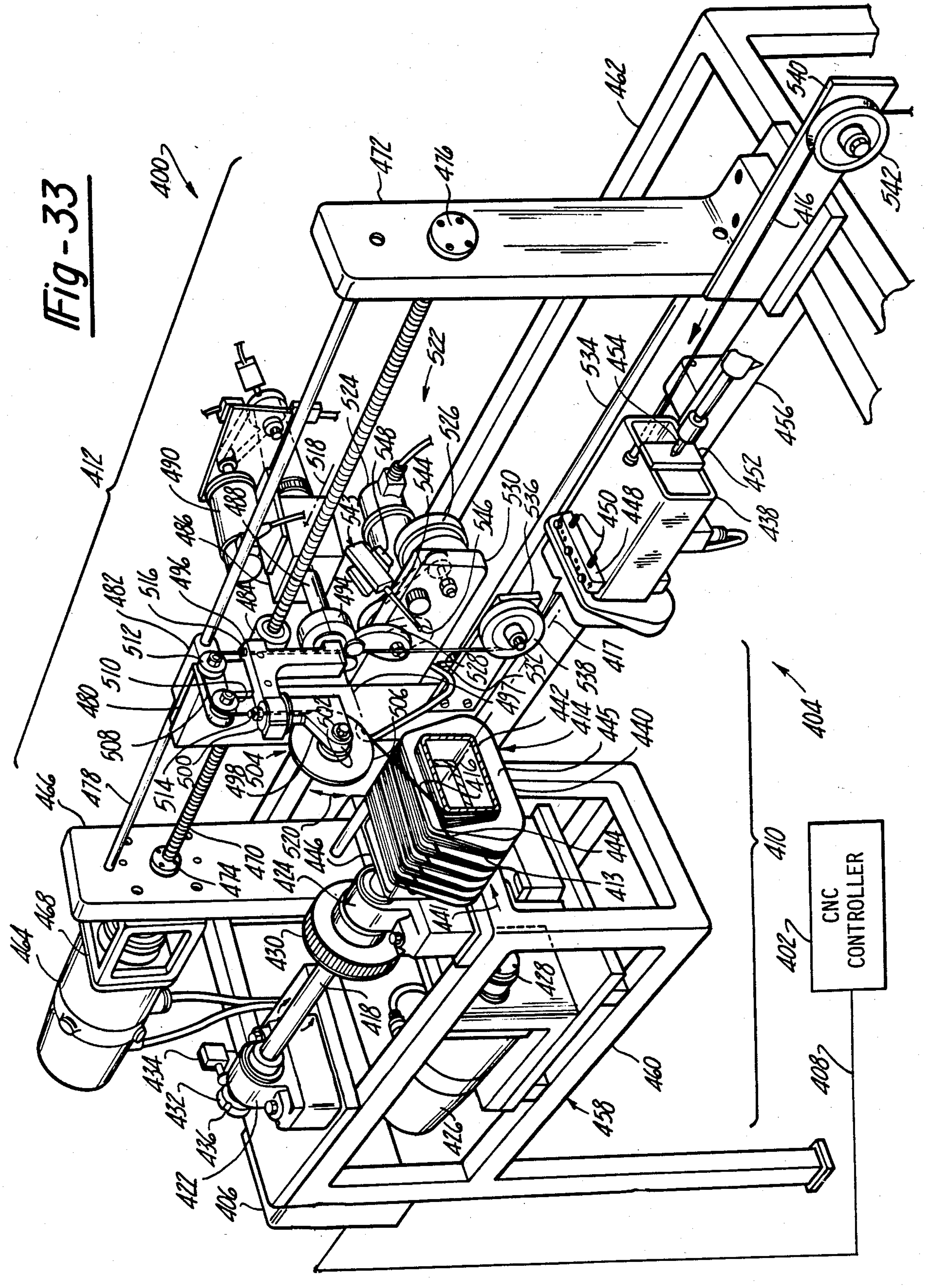

FIG. 33 is an overall view of a preferred high voltage coil winding machine used in connection with the present invention.

Figure 33A:
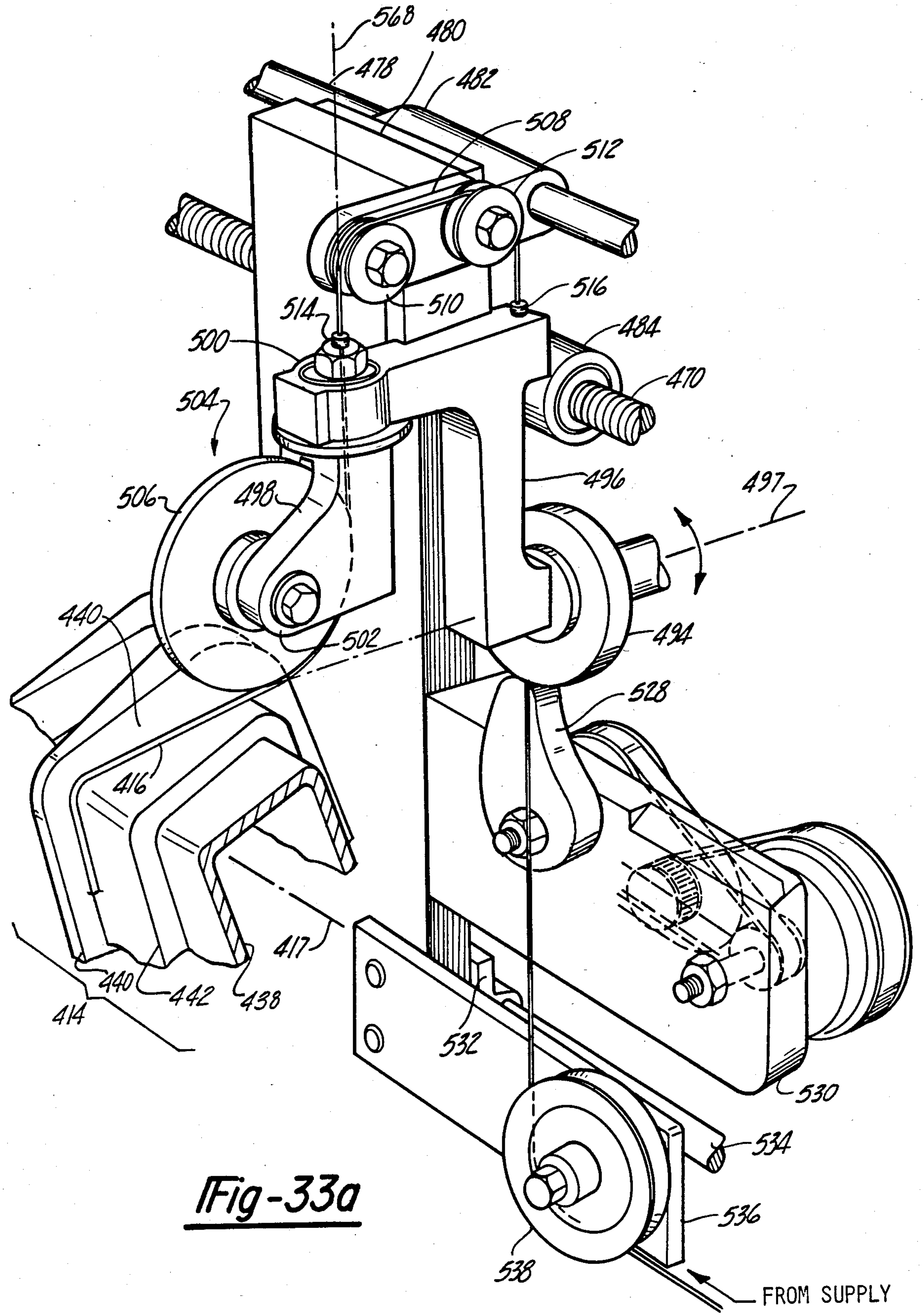

FIG. 33a is a detail view of a portion of a wire placement subassembly of the high voltage coil winding machine of FIG. 33.

FIG. 34 is a side elevation detail view of a mandrel and mandrel position measuring device of the high voltage coil winding machine of FIG. 33.

FIG. 34a is a perspective view of the mandrel and mandrel position measuring device of FIG. 34.

FIGS. 35 through 38 are a series of sequential views of the mandrel and wire placement subassembly of the high voltage coil winding machine of FIG. 33.

Figure 35:
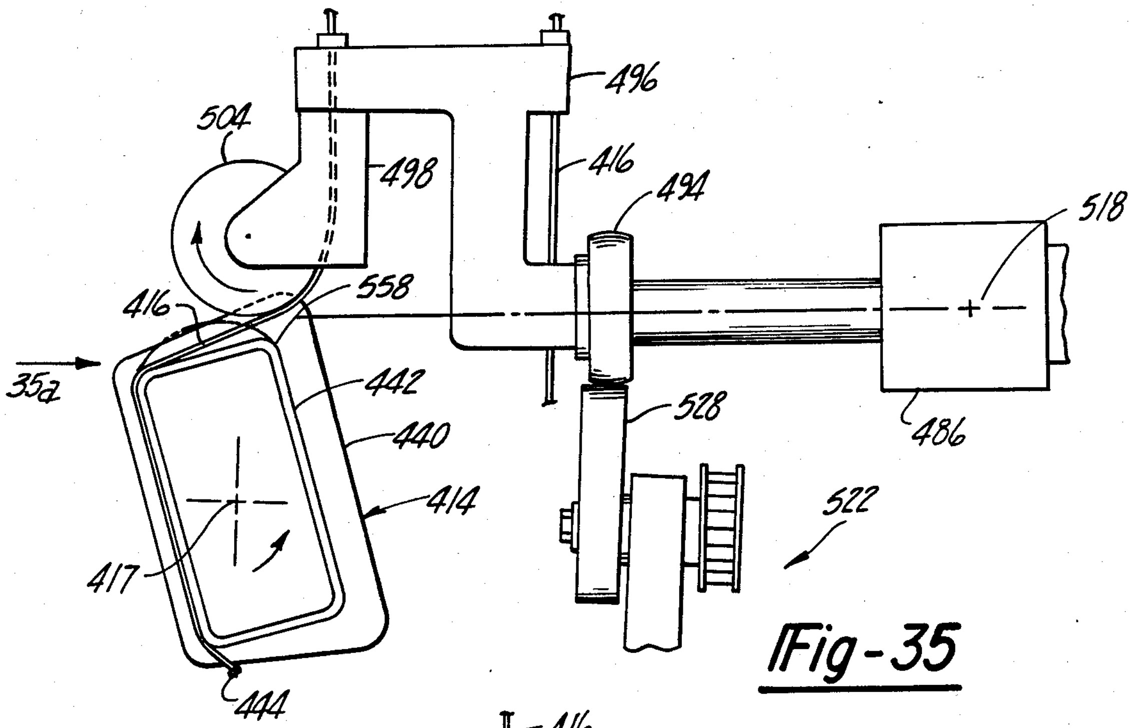

FIG. 35 is a side elevation view of the mandrel and wire placement subassembly at an initial stage in the winding of a high voltage coil.

Figure 35A:
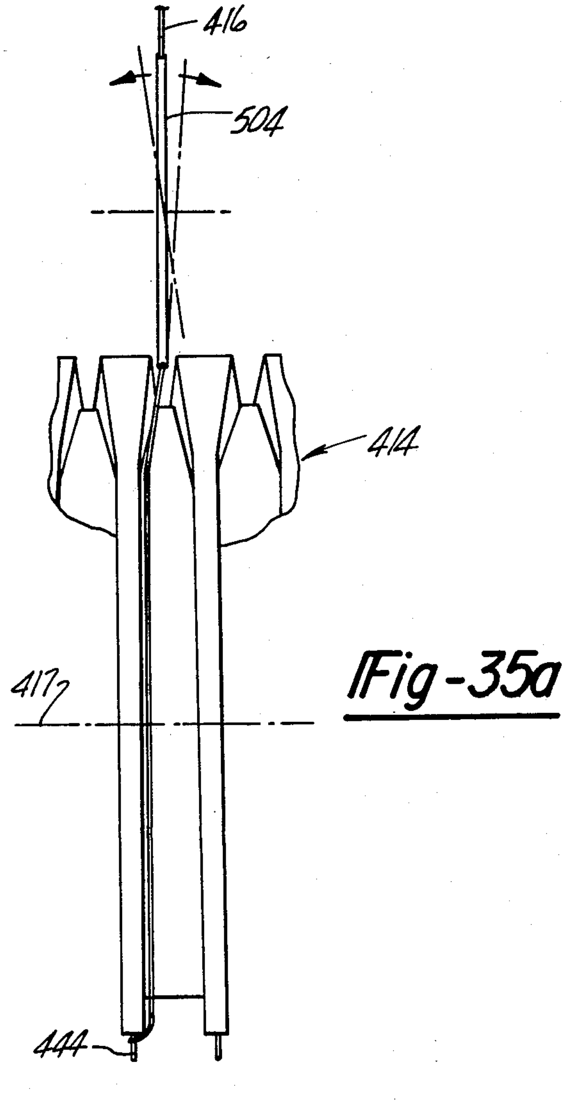

FIG. 35a is a front elevation view of the mandrel and is viewed along arrow 35a of FIG. 35.

Figure 36:
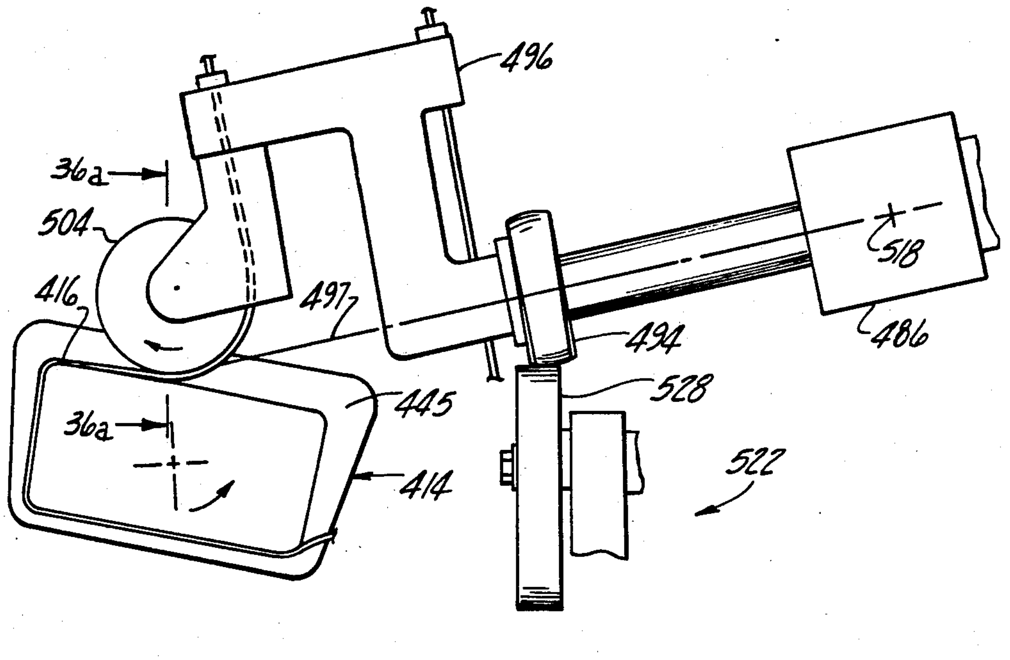

FIG. 36 is a side elevation view of the mandrel and wire placement subassembly at a later stage in the winding of a high voltage coil.

Figure 36A:
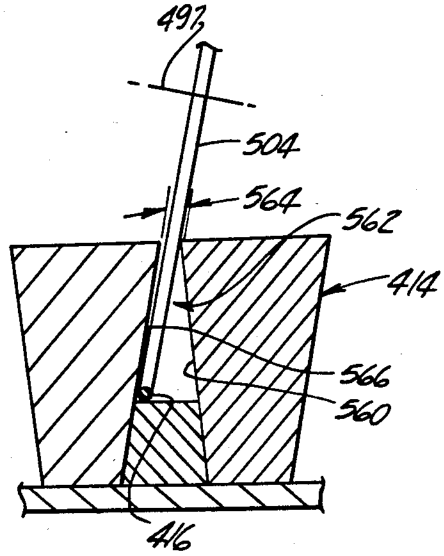

FIG. 36a is a sectional detail view of the mandrel and is viewed along line 36a—36a of FIG. 36.

Figure 37:
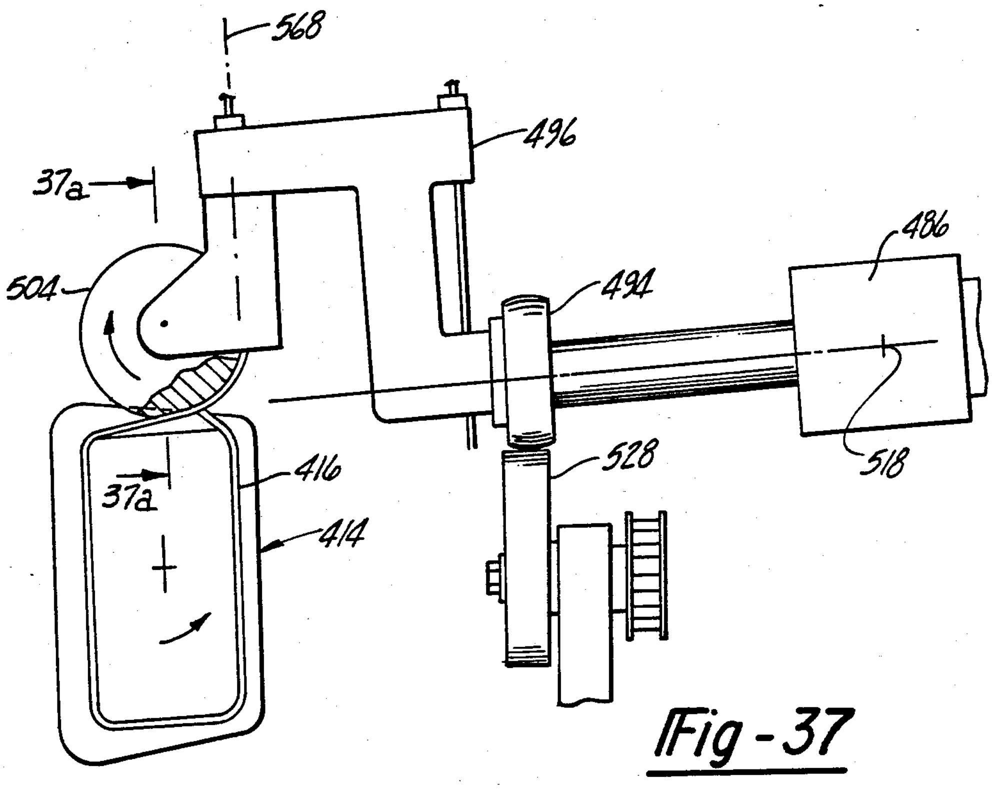

FIG. 37 is a side elevation view of the mandrel and wire placement subassembly at a later stage in the winding of a high voltage coil.

Figure 37A:
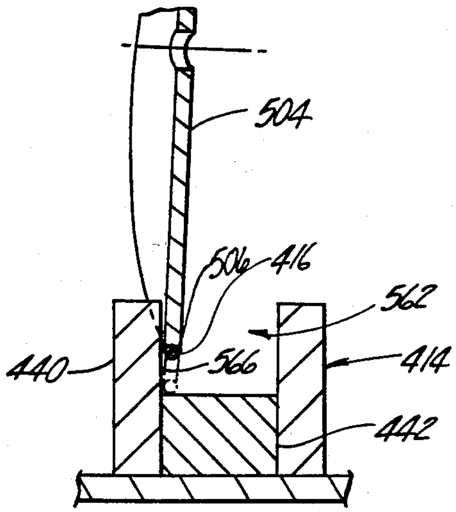

FIG. 37a is a sectional detail view of the mandrel and is viewed along line 37a-37a of FIG. 37.

Figure 38:
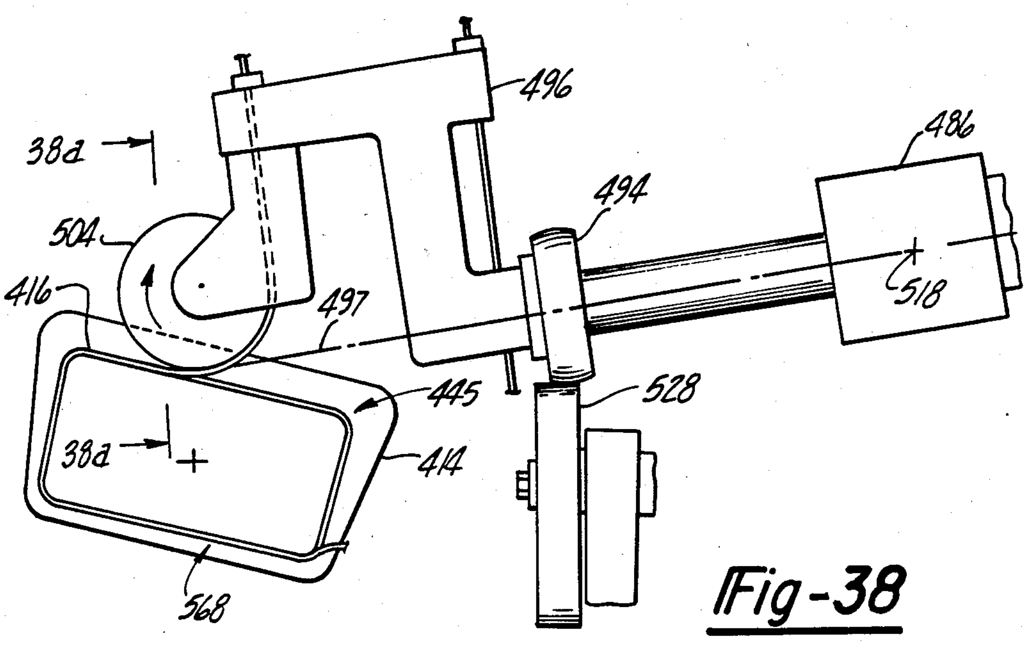

FIG. 38 is a side elevation view of the mandrel and wire placement subassembly at a later stage in the winding of a high voltage coil.

Figure 38A:
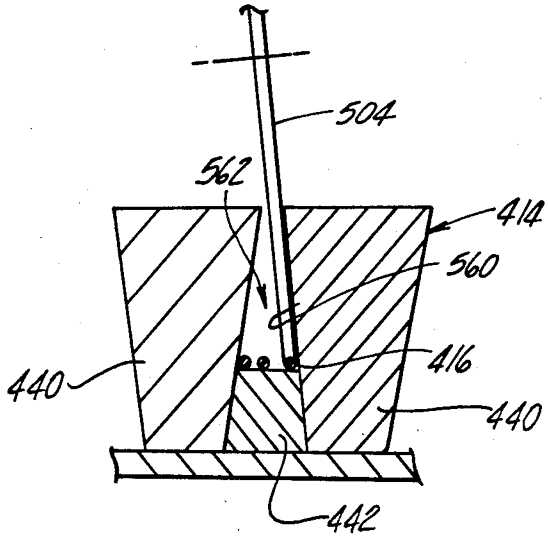

FIG. 38a is a sectional detail view of the mandrel and is viewed along line 38a-38a of FIG. 38.

FIG. 39 is a sectional detail view of the mandrel at a still later stage in the winding of a high voltage coil.

Figure 40:
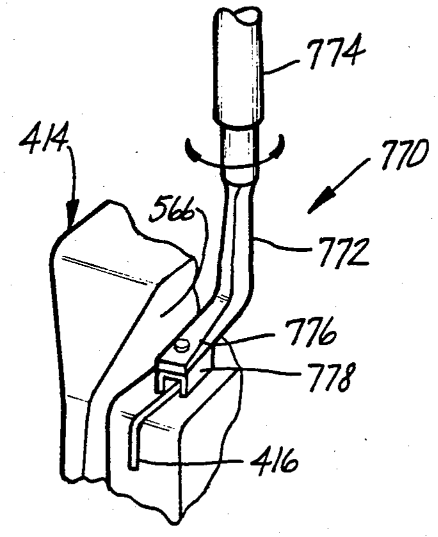

FIG. 40 is a perspective detail view of a portion of an alternative embodiment of a wire placement guide for use with the high voltage coil winding machine.

Figure 40A:
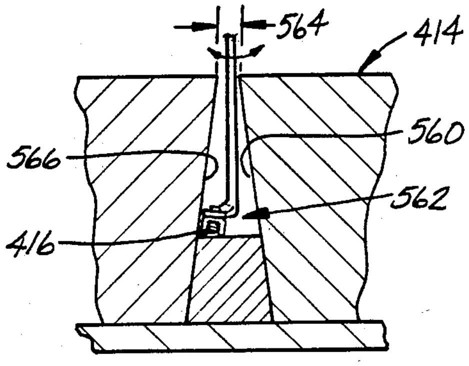

FIG. 40a is a sectional detail view of a winding mandrel and the wire placement guide of FIG. 40.

Figure 41:
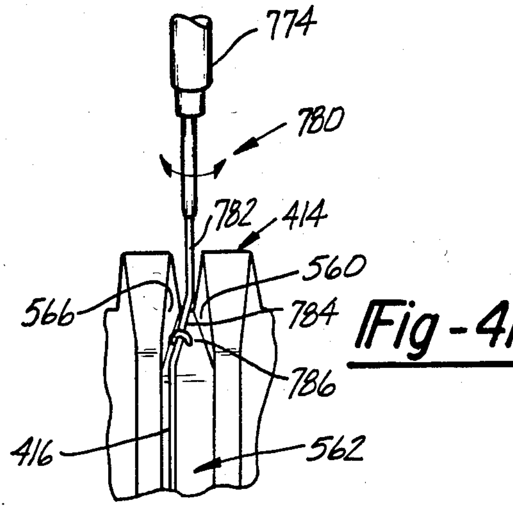

FIG. 41 is a side detail view of another alternative embodiment of a wire placement guide for use with the high voltage coil winding machine.

Figures 42, 42A, 42B:
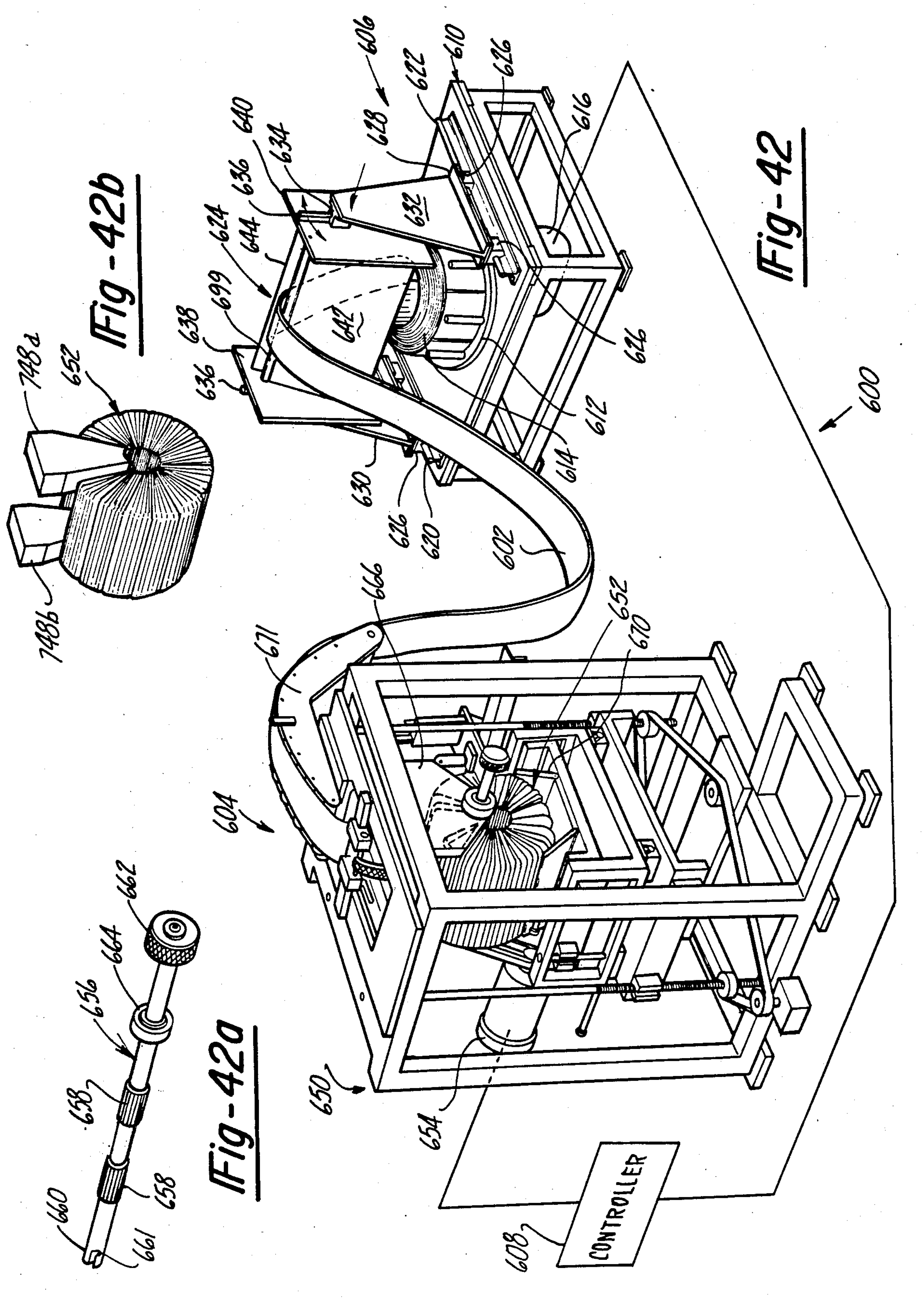

FIGS. 42, 42a and 42b are views of a preferred core wind-in machine used in connection with the present invention.

Figure 43:
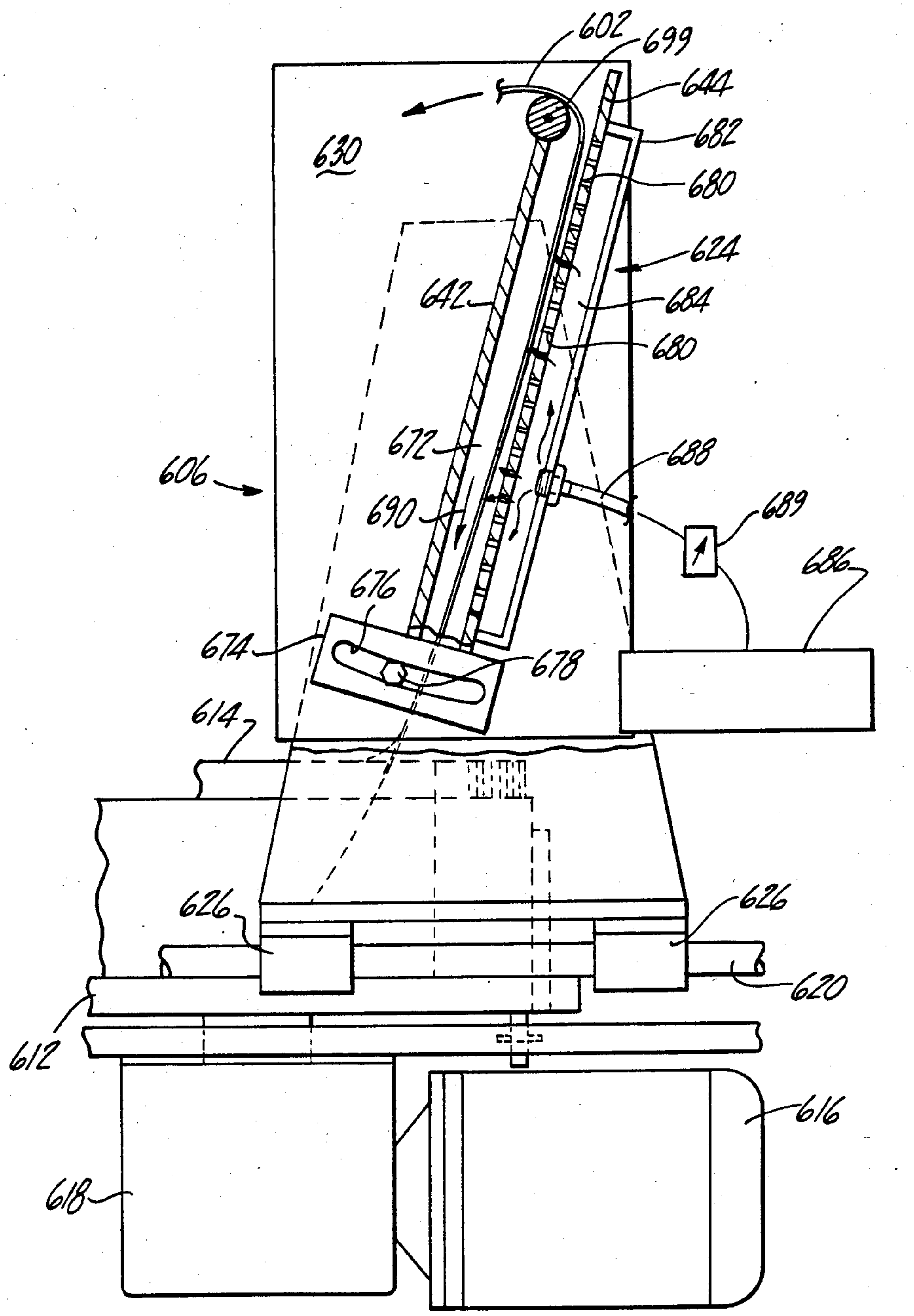

FIG. 43 is a sectional detail view of a core dereeling subassembly of the core wind-in machine of FIG. 42.

Figure 44:
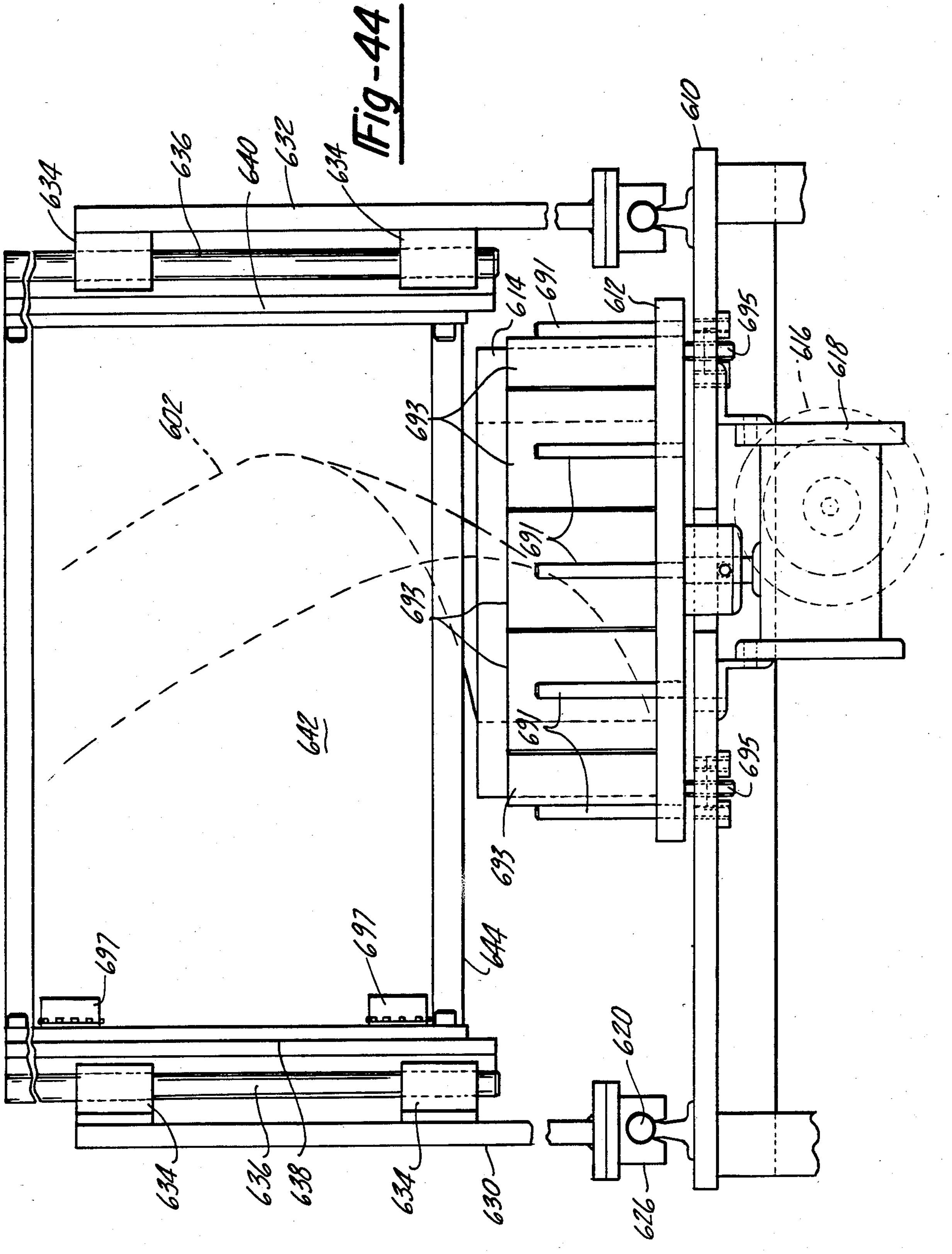

FIG. 44 is a front elevation view of the core dereeling subassembly of FIG. 43.

Figure 45:
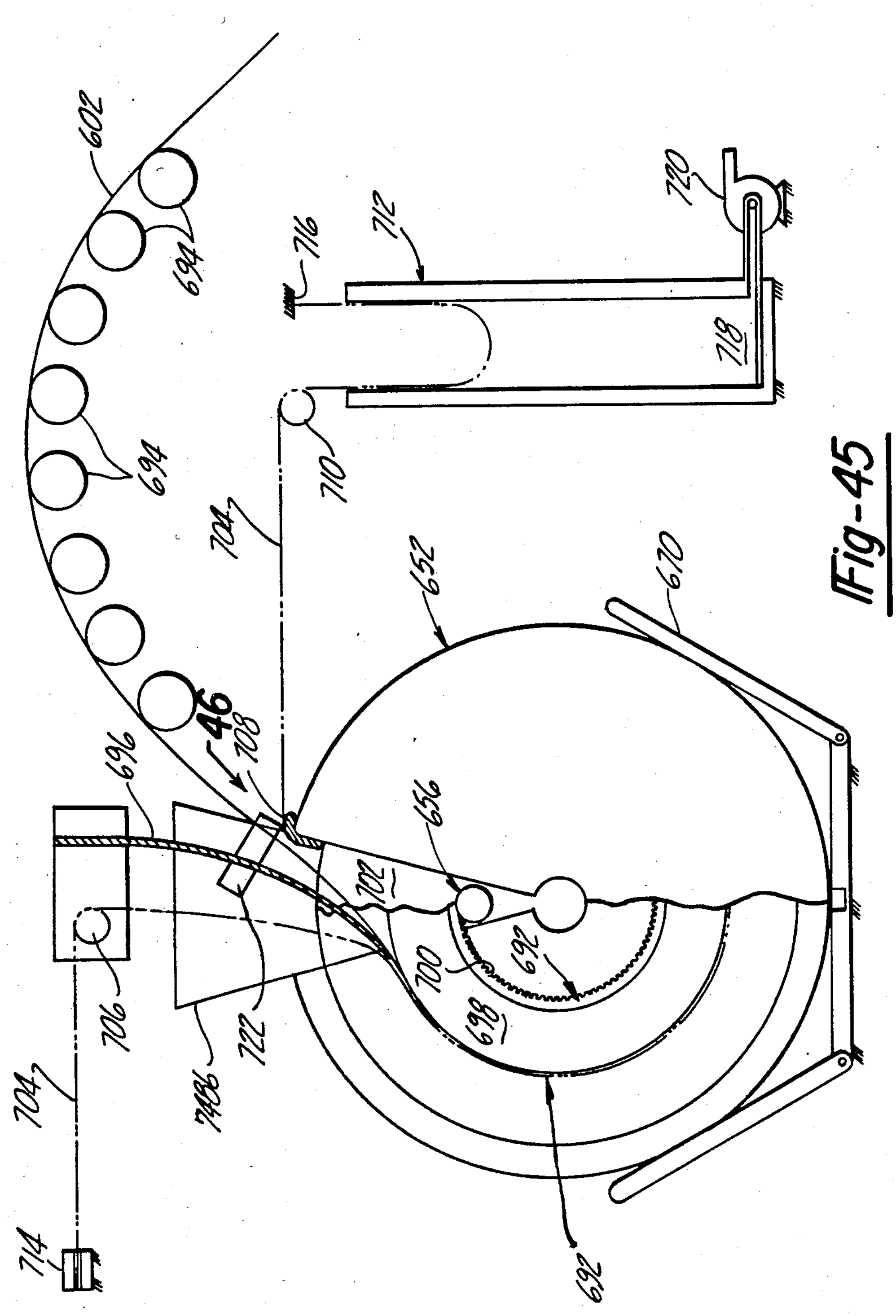

FIG. 45 is a schematic view partially in section of a core insertion subassembly of the core wind-in machine of FIG. 42.

Figure 46:
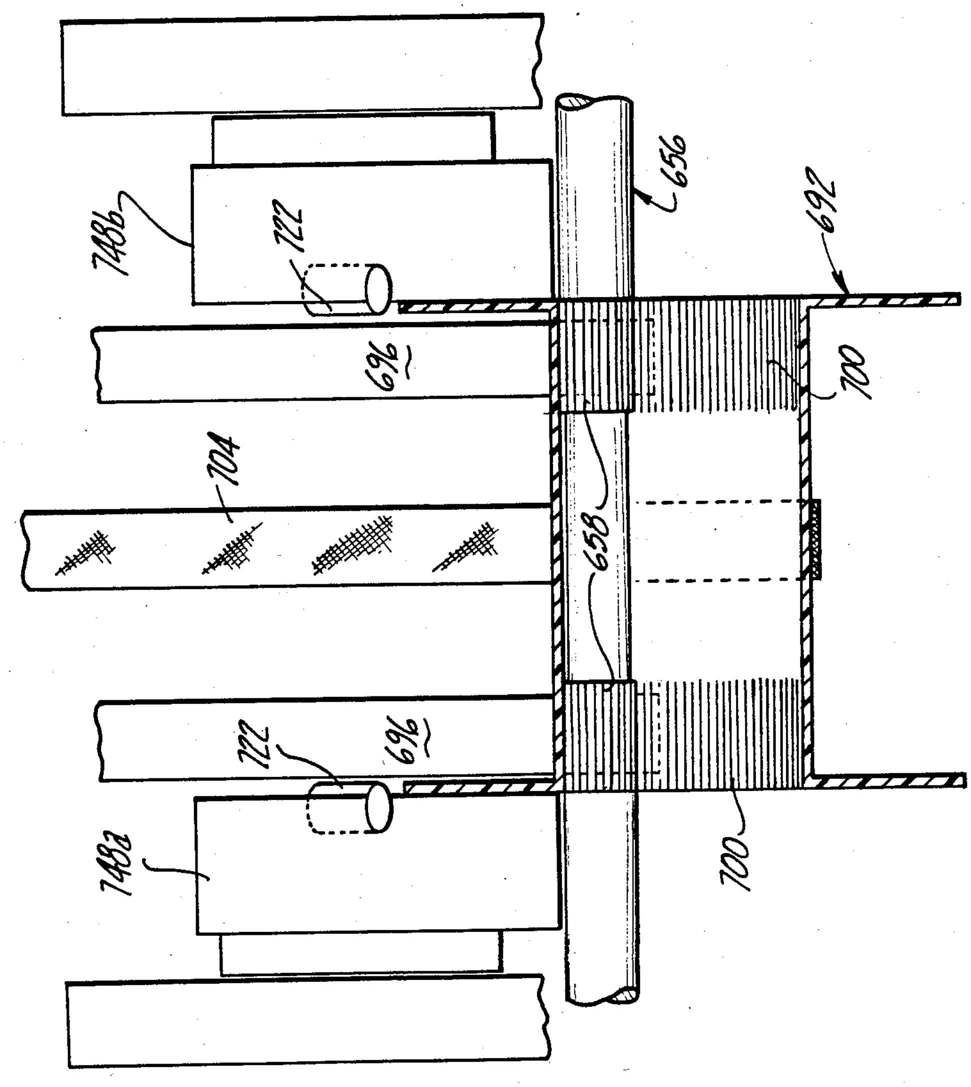

FIG. 46 is a sectional detail view of a bobbin used in the core insertion subassembly of FIG. 45.

Figure 47:
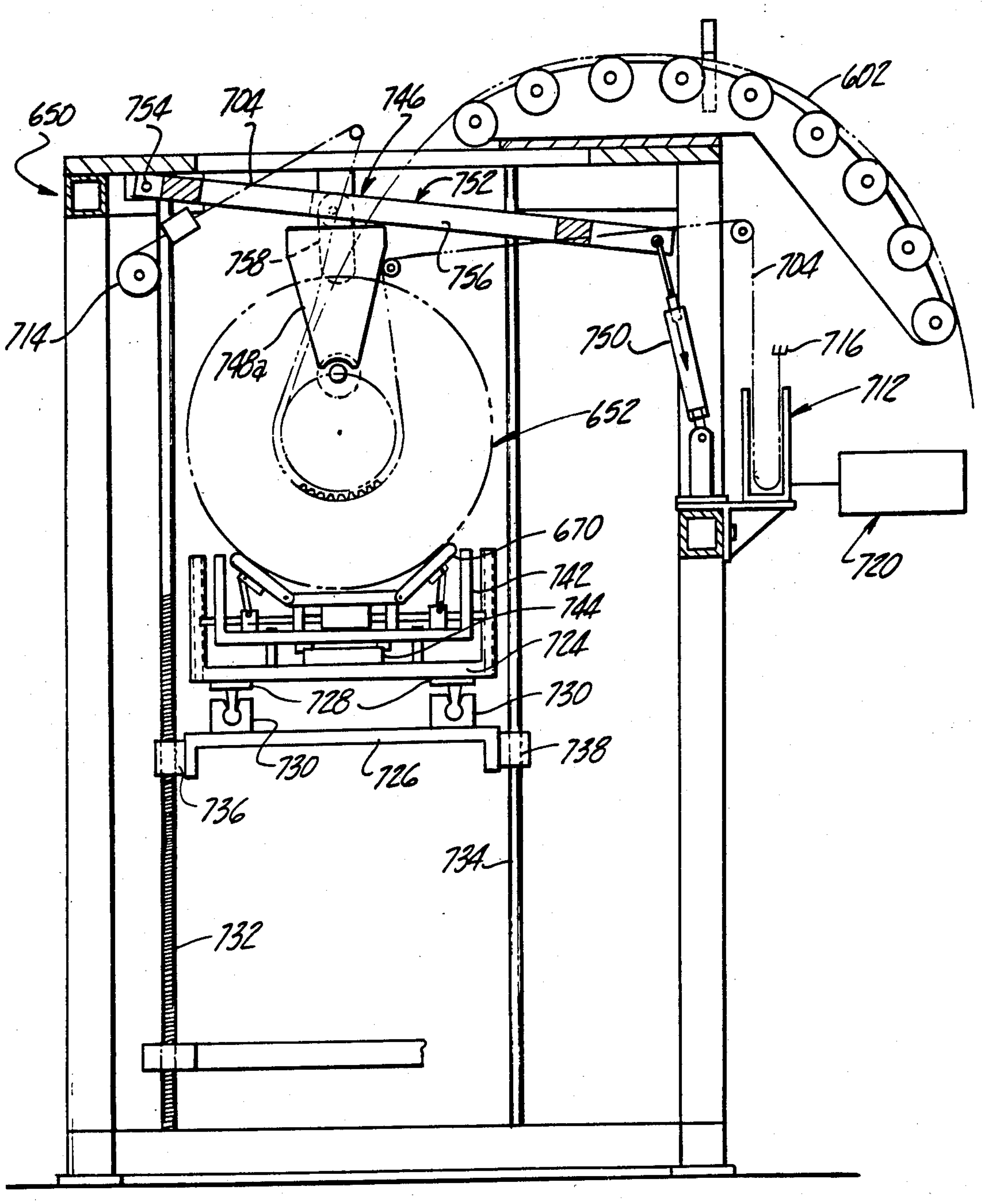

FIG. 47 is a side elevation view of the core insertion subassembly of FIG. 45.

FIG. 48 is a front elevation view partially in section of the core insertion subassembly of FIG. 45.

DESCRIPTION OF THE SPECIFIC EMBODIMENTS

FIGS. 1 through 48 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
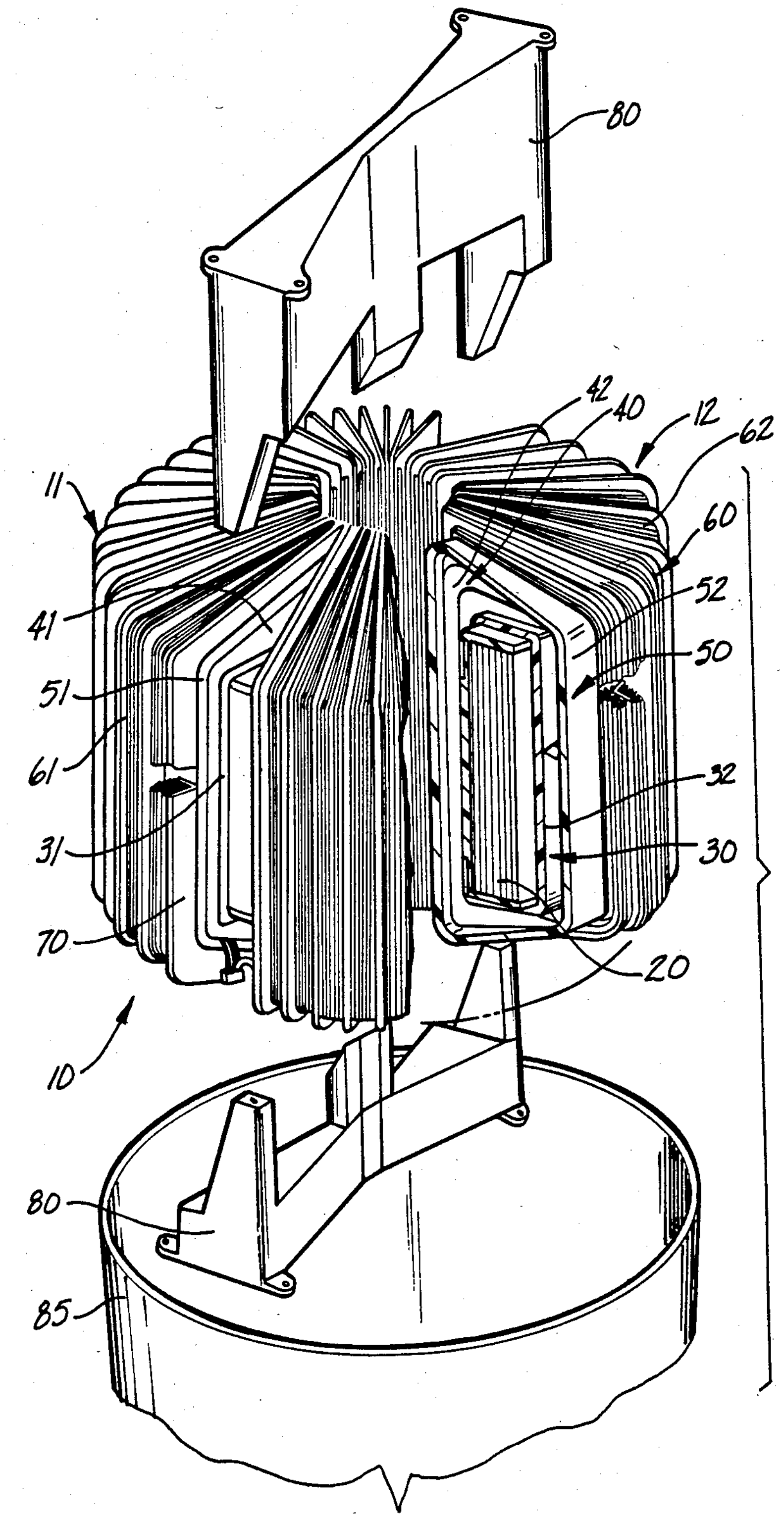
FIG. 1 is a partially cut-away, partially exploded, perspective view of a preferred toroidal electrical transformer according to the present invention.

FIGS. 1 through 3 illustrate a preferred toroidal electrical transformer 10 including a continuously wound, toroidal or annular core 20 disposed within a core insulation tube 30. A low voltage coil or winding 40 surrounds the core insulation tube 30 and is encased by a high/low insulation barrier 50, which is in turn surrounded by a high voltage coil or winding 60.

The high voltage winding 60 is preferably made up of two substantially semi-toroidal sections 61 and 62, each including a plurality of pie or wedge shaped bundles or coils continuously wound from a common wire and connected by loops of said common wire, e.g., twenty 8.25° coils forming in total an arc of about 165° in each of said semi-toroidal sections. At least the coils of the high voltage winding 60 near the ends of the sections 61 and 62 are preferably separated by insulating inserts or collars 70, around which said loops extend, for purposes of resisting impulse stresses resulting from any non-linear voltage distribution to which the high voltage winding may be subjected, such as those encountered during high voltage impulses caused, for example, by lightning. Such inserts 70 may in some cases be required between all high voltage winding segments as shown in the drawings, or more than one insert may be required between each segment. The inserts 70 include a radial flange separating the adjacent coils of the high voltage winding 60 and are preferably composed of a moldable paper board, Kraft paper or a synthetic insulator material, such as "MYLAR" or "KAPTON". The inserts 70 are retained in place by molded cuffs or flanges 71 which extend axially and circumferentially under the high voltage winding segments as shown in FIG. 2.

Similarly, the preferred low voltage winding 40 is also made up of two substantially semitoroidal sections 41 and 42, corresponding to the high voltage winding sections 61 and 62. Such preferred low voltage coil sections 41 and 42 may each include either a singular winding conductor, bifilar or multifilar parallel conductors in an interleaved configuration, one of such parallel conductors for each voltage winding, as is explained in detail below. In the preferred embodiment, as shown in the drawings, the high voltage winding sections 61 and 62 and the low voltage winding sections 41 and 42 each extend circumferentially through an arc of approximately 165 degrees on each side of the transformer 10. Correspondingly, the core insulation tube 30 and the high/low insulation barrier 50 are each formed in two semi-toroidal sections, with each of the sections extending circumferentially through an arc of approximately 165 degrees on each of the two sides of the preferred transformer 10. Thus, the low voltage coil 40 is preferably disposed within the high voltage coil 60, and the two coils preferably encompass approximately 165 degrees of the circumferential length of the toroidal or annular core 20.

The term "continuous" as used herein in connection with the high voltage winding or coil 60, and the sections 61 and 62 thereof, includes a preferred configuration wherein the pie-shaped bundles or coils and the connecting loops are wound and formed from a single wire or conductor that is continuous over the length of each of the high voltage coil sections 61 or 62, or in other words, over substantially one-half of the toroidal transformer 10. Such term "continuous" also refers to various alternate configurations of the high voltage coil 60, wherein at least each pie-shaped coil is wound from such a continuous wire or conductor.

With respect to the low voltage winding or coil 40, and the sections 41 and 42 thereof, the term "continuous" includes the above-mentioned preferred singular, bifilar or multifilar arrangements, wherein the conductor is continuous over the length of each of the low voltage coil sections 41 or 42. Thus in such preferred embodiment, the low voltage coil is continuous over substantially one-half of the toroidal transformer 10. The term "continuous" also includes any of several alternative low voltage coil structures wherein at a minimum the low voltage conductor, whether singular, multifilar, or otherwise, and whether interleaved or not, is continuous over at least three turns thereof.

The term "continuous," as used with reference to the magnetic core 20, includes such core structures wound from a single or multifilar group of ribbon-like strips of continuous core material as well as a successive, serially-connected group of core material strips, wound-in successively to form increasingly large diametric regions of the core 20. Accordingly, while in the preferred embodiment a single strip of core material forms the wound core, the term "continuous" contemplates plural strips of core material which are wound through a substantial number of turns greater than two to provide a wound core.

The terms "toroidal" or "annular" as used herein in connection with the high and low voltage coils 60 and 40, respectively, and in connection with the magnetic core 20, refer to the configuration of a torus generated by the revolutions of any of a number of regular or irregular shapes about an external axis. The various preferred structures and configurations of the high and low voltage windings or coils 60 and 40, respectively, and of the magnetic core 20 are described in detail below.

FIG. 4 represents a detailed view of the section 31 of a preferred core insulation tube or barrier 30 comprising two semi-toroidal sections 31 and 32 (the latter not shown). Although only section 31 is shown in FIGS. 4 and 4a for purposes of illustration, one skilled in the art will appreciate that the section 32 is identical to the section 31.

The core insulation tube section 31 is preferably molded from an insulating and moldable paper board, Kraft paper or synthetic insulation material and each section is identical with respect to each other. Thus, the two identical sections required to form the core insulation tube 30 may be molded from a single mold. The sections 31 are preferably molded from a suitable moldable paper board as known in the art or high-strength, glass-filled synthetic material, such as polyester, nylon, or epoxy, for example.

The sections 31 of the core insulation tube 30 each include inner and outer walls 34 and 35, respectively, extending in an axial direction between a base portion 36 and a top portion 37. It is preferable to construct each section in one piece for improved insulation performance.

FIG. 5 shows the preferred section 51 of the high/low insulation tube or barrier 50, comprising two semi-toroidal sections 51 and 52. One skilled in the art will readily understand that section 52 is identical to section 51. The section 51 of the high/low insulation barrier 50 may be molded in one piece from a moldable paper board or a suitable reinforced synthetic insulation material. A set of inner and outer walls, 55 and 56, respectively, extend axially between a base portion 57 and a top portion 58.

The particular cross-sectional shapes of the generally toroidal or annular shaped core insulation tube 30 and high/low insulation barrier 50 correspond to the desired cross-sectional shapes of the toroidal or annular magnetic core 20 and high and low voltage coils 60 and 40, respectively.

The sections 51 and 52 of insulation tube 50 are each preferably provided with end cuffs 59, which mate with the ends of each such section as illustrated in FIG. 5. To this end, the end cuffs 59 are provided with circumferentially extending flanges which closely fit with the interior of the insulation sections 51, 52. Each cuff has a radial flange which acts as an added barrier against electrical breakover during high voltage conditions.

FIG. 4*a* illustrates a broken-away portion of the high/low insulation barrier 50 including a preferred but optional internal wall structure of the present invention. The wall structure shown in FIG. 4*a* and the related discussion herein are equally applicable to the oore insulation tube 30.

Transformers of the type disclosed herein frequently employ oil or other fluids, either liquid or gaseous, for cooling their components during operation. Such cooling fluid is typically an electrical grade insulating oil. The high/low insulation barrier 50 in FIG. 4*a* includes a number of ridges 95 molded into the internal side of the outer wall 56. The ridges 95 may be inclined, spiral, involute, or the like, and form a plurality of cooling fluid branch channels 96 therebetween. The ridges 95 are interrupted short of the base portions 57 and thereby form common header channels 97 at the upper and lower peripheries of the outer wall 56. The branch channels 96 and the header channels 97 act as conduits for the r:onvective flow of the cooling liquid. The configuration of the ridges 95, being inclined or spiral, etc., imparts convectively induced circulating motion to the cooling fluid flow throughout the inside of the high/-low insulation barrier 50, as illustrated by the flow arrows in FIG. 4*a*. Such circulating motion promotes both cooling of the components and uniform temperature distribution throughout the transformer.

In FIG. 6, a detailed view of the bobbin 692 is provided. The bobbin 692 is utilized in the fashion described in connection with FIGS. 42 through 48 to facilitate the installation of the magnetic core 20 of the toroidal transformer. The bobbin 692 generally comprises a central cylindrical hollow hub 81 which joins two radial flanges 698. The bobbin is adapted so that the strip of core material can be wound upon the hub 81 and constrained between the radial flanges 698. The interior of the hollow hub 81 has a pair of axially-spaced, circumferentially-extending gear drive surfaces 700 provided with axially disposed gear teeth used for rotatably driving the bobbin 682. A bearing surface 82 is located between the gear drive surfaces 700 and projects radially inward beyond the gear teeth of gear drive surfaces 700A and 700B. When installed, the bearing surface 82 will contact the coil insulation material 30 prior to any contact by the gear teeth to prevent that material from being abraded or otherwise damaged by the gear teeth during rotation of the bobbin 692.

The bobbin 692 consists of a pair of identical halves 692A and 692B which are adapted to mate to form the complete bobbin 692 after assembly of each of the bobbin halves into respective half sections 11 and 12 of the transformer. The bobbin halves 692A and 692B are especially configured to permit efficient operation of the assembled bobbin 692. Particularly, the bobbin halves 692A and 692B are provided with an axial lock at each joint of the bobbin half 692A and 692B. Each axial lock includes flanges 83*a* and 83*b* which are adapted to interlock with inset shoulders 84*a* and 84*b* upon mating of the bobbin halves 692A and 692B to prevent axial shifting of the bobbin halves. Each bobbin half 692A is provided with a pair of projecting tabs 85 and complementary recesses 86 which are designed to mate with corresponding recesses 86 and tabs 85 of the other bobbin half, with the tabs 85 wholly residing within their mated recesses 86. Preferably, the tabs 85 are glued or otherwise adhered to their mated recesses 86 to retain the bobbin halves 692A and 692B in their interlocked state.

It should be noted that the gear surfaces 700A and 700B terminate at different circumferential positions. Consequently, when the bobbin 692 is driven by the pinion shaft drive gears (see FIGS. 45 through 48), the pinion shaft drive gears transition between the bobbin halves one pinion gear at a time to reduce the drive forces tending to separate the bobbin halves 692A and 692B. In other words, the two pinion gears driving the bobbin 692 do not simultaneously switch between the gear teeth of one bobbin half to the gear teeth of the other bobbin half, but switch in staggered fashion so that any imperfection at the mating of the bobbin halves will be compensated by circumferential offset of the joints in the gear surfaces 700A and 700B.

As previously explained, the bobbin halves 692A and 692B are assembled with the pre-formed high and low voltage winding assemblies, including the insulating tubes 30 and 50 with cuffs 59, and are then joined to construct a complete bobbin 692 within the pre-formed windings and insulation whereby the core can thereafter be wound into the pre-formed windings onto the bobbin 692.

As is shown schematically in FIG. 7, the semitoroidal transformer half-portions or sections 11 and 12 each extend circumferentially through an arc of approximately 165 degrees as described above. The preferred transformer portions 11 and 12, when combined, thus form a substantial portion of a torus made up of two symmetrical halves with a circumferential space of approximately 15 degrees therebetween on each side. One of the primary purposes for the above-described construction is to form an arcuate elongated passage for allowing the core 20 to be continuously wound in place in a toroidal or annular configuration as is illustrated in FIGS. 1 through 3 and described in detail below. Once the core wind-in operation is completed, the transformer assembly is retained in its proper configuration by means of supporting blocks 80 (see FIG. 1), which maintain an equal spacing between the half-portions 11 and 12 on both sides of the transformer 10. The transformer assembly is then installed in a suitable containment structure such as the tank or housing 85 shown in FIG. 1. Various additional features will become readily apparent from the following description of the methods employed in the manufacture of a toroidal electrical transformer and the components thereof according to the present invention.

FIG. 8 illustrates, in block diagram form, an overview of the major operations involved in the preferred method of manufacturing the toroidal electrical transformer 10. Although for purposes of illustration, the reference numerals in FIG. 8 and in the following discussion relate to the transformer half-portion 11, the structure and production methods of the transformer half-portion 12 are preferably identical to those of the transformer half-portion 11.

The low voltage coil section 41 is preferably wound from bifilar conductor stock with each turn being formed into a pie or wedge shape (as viewed from above or below) to provide the toroidal or annular configuration. The above low voltage coil producing steps are described in detail below in connection with FIGS. 9 through 32 of the drawings.

The low voltage coil 41 is then positioned onto the exterior of the core insulation barrier 31 and encased within the high/low insulation barrier section 51 as is shown schematically in FIG. 7. The subassembly is then ready for addition of the high voltage coil section 61.

The high voltage coil section 61 is preferably wound from a continuous wire and formed into a number of pie or wedge shaped bundles or coils. These winding operations are described in detail below in connection with FIGS. 33 through 41.

As is illustrated schematically in FIG. 7, the insulating inserts 70 are located between adjacent coils of the high voltage coil section 61 with the cuffs 71 extending into the toroidal openings in the segments. The high voltage coil section 61 and the inserts 70 are then positioned onto the exterior of the high/low insulation barrier section 51 and the bobbin 692 is installed in the arcuate passage within the core insulation barrier 31. Thereafter, the end cuffs 59 are installed on the ends of the barrier tube 51, as illustrated in FIG. 5 to complete the operation of forming the half-portion 11 prior to the winding in of the core 20.

The core material, which is of a relatively thin, ribbon-like or strip configuration is preferably pre-wound into a tight coil and automatically severed at a prescribed length determined by the size of the transformer being produced. The coil is then preferably restrained and annealed to relieve its internal stresses. The resultant structure is a pre-wound, toroidal coil 614 (FIG. 42) which is ready for winding into the above-described transformer half-portions 11 and 12.

The remaining steps in the production process include the winding of the pre-formed, pre-annealed coil 614 into the bobbin 692 within the arcuate elongated passage through a circumferentially extending gap between the semi-toroidal sections 11 and 12 (FIGS. 42 through 48), and the finishing assembly steps of installing the supporting blocks 80, electrically connecting the respective sections of low voltage coil 40 and the high voltage coil 60, and mounting the assembly in a suitable housing structure 85 (see FIG. 1).

The Low Voltage Conductor Winding Machine

In FIG. 9, the low voltage conductor winding machine 100 is illustrated. The low voltage conductor winding machine 100 has four major subassemblies, a forming mandrel subassembly 102, a twist head subassembly 104, a pressure roller subassembly 106, and a storage mandrel subassembly 326.

Figure 10A:
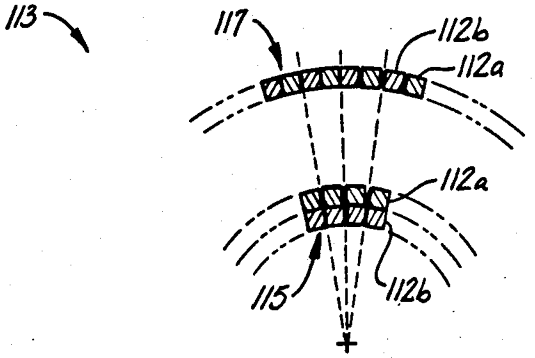
Figure 10B:
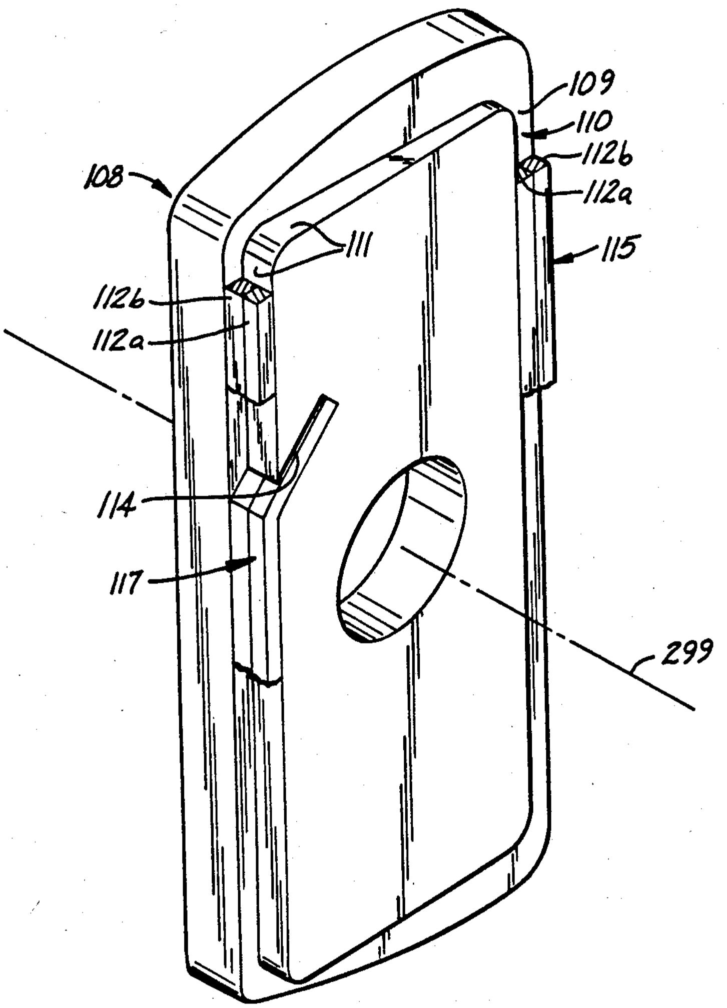

The forming mandrel subassembly 102 includes a forming or winding mandrel 108 having a peripheral cavity 110 defining a side wall 109 and a bottom surface 111 of a pie-shaped cavity adapted for receiving a bifilar (two wire) low voltage conductor 112 in its unformed state and for cooperating with the pressure rollers of the pressure roller subassembly 106 to form the bifilar low voltage conductor 112 into pie-shaped coils 113, illustrated in FIG. 10. FIG. **10*a* shows the coils 113 as having a wedge or pie shape in plan view, while FIG. 10 shows the coils 113 as having a quadrilateral section in side view, with the interior of the coils having a rectangular shape and the exterior or outside periphery of the coils having a trapezoidal shape. Alternatively, one or more sides of the coils 113 may be somewhat curved. A complete winding of several pie-shaped coils forms a semitoroidal low voltage conductor 41 for the toroidal electrical transformer 10. As illustrated in FIG. 10*b*, the peripheral cavity 110 of the forming mandrel 108 has increased radial depth and reduced axial width at the portion of the forming mandrel 108 corresponding to the inside portion 115 of the coil 113. Conversely, the opposed portion of the peripheral cavity 110 has decreased radial depth and increased width at the portion of the forming mandrel 108 corresponding to the outside portion 117 of the coil 113. The forming mandrel 108 is mounted on a shaft for rotation about a mandrel axis 299, as will be explained in greater detail in connection with FIG. 15. The bottom surface 111 of the peripheral cavity 110 is generally quadrilateral in shape which defines the quadrilateral sectional shape of the coils 113. Note that the peripheral cavity 110 has a varying radial displacement from the axis 299 of the forming mandrel 108 which necessitates certain movements of the twist head subassembly 104 and the pressure roller subassembly 106, as will be explained below. The forming mandrel 108 has a slot 114 for receiving the ends of both wires 112*a* and 112*b* of the low voltage conductor 112 at the beginning of the forming cycle. The slot 114 is sufficiently narrow, and appropriately angled, to capture and retain the end of the low voltage conductor 112 during the formation of the first coil. As is described in more detail with respect to FIGS. 17 through 24, the forming mandrel 108 rotates to wind the low voltage conductor 112 into the peripheral cavity 110 to bend the conductor 112 into the pie-shaped coils 113**.

As shown in FIG. 11, the twist head subassembly 104 provides guide means for feeding the two wires **112*a* and 112*b* of the conductor 112 to the forming mandrel 108. The twist head subassembly 104 includes a twist head 116 which receives the two wires 112*a* and 112*b* of the bifilar low voltage conductor 112 at its input end 118 and directs those two wires of the conductor 112 along a feed axis 119 to its output end 120. The twist or directing head 116 serves to position and orient the low voltage conductor 112 at its output end 120 for feeding to the forming mandrel 108. To accomplish the positioning and orienting of the low voltage conductor 112, the twist head 116 is articulated through three motions; rotation about its feed axis 119, pivoting about a horizontal pivot axis 132**, and up and down reciprocation.

Rotation of the twist head 116 about its feed axis 119 is accomplished by a rack 122 which meshes with a pinion gear 124 which is fixed to the twist head 116 for rotation therewith. Back and forth reciprocation of the rack 122 in a direction perpendicular to the feed axis 119 causes alternating clockwise and counterclockwise rotation of the twist head 116. The rack 122 is reciprocated by a twist head air cylinder 126.

Twist head 116 is mounted on a twist head table 128 which in turn is pivotally mounted with respect to the frame 130 for limited pivoting motion about a pivot axis 132. The pivot axis 132 is perpendicular to and intersects the feed axis 119 and is also parallel to the mandrel axis 299. Suitable uprights and bearings are provided, not illustrated in FIG. 11, for providing such pivotal motion of the twist head 116, which freely pivots as the forming mandrel 108 rotates.

The twist head table 128 has elongated openings for freely receiving vertical guide rods 134 to allow pivoting of the twist head with respect to the guide rods 134 during up and down reciprocal movement of the table 128, the guide rods 134, and the twist head 116 along a path generally orthogonal to and spaced from the mandrel axis 299. Such up and down movement of the twist head table 128 and the twist head 116 is provided by translation means including a twist head lift cam 136, a twist head lift cam follower 138, a twist head lift cam follower arm 140 and a twist head lift cam link 142. Particularly, upon rotation of the twist head lift cam 136, the follower 138 reciprocates upwardly and downwardly within a cam slot 144 on the twist head lift cam 136. The upward and downward movement of the twist head cam follower 138 causes the twist head lift cam follower arm 140 to correspondingly pivot upwardly and downwardly about a fixed pivot 146. The opposite end 148 of the twist head lift cam follower arm 140 is pivotably connected to the lower end of the twist head lift cam link 142 and moves the twist head lift cam link 142 upwardly and downwardly as the twist head lift cam follower arm 140 pivots upwardly and downwardly, which correspondingly moves the twist head table 128 that is connected to twist head lift cam link 142 at 150. The table 128, in turn, is guided for vertical motion by the twist head guide rod 134. The twist head lift cam 136 is coupled for rotation with the forming mandrel 108 to link the up and down reciprocal movement of the table 128 and the twist head 116 to the rotation of the forming mandrel 108.

The ranges of the three articulations of the twist head 116, i.e. rotation, tilt or pivot, and lift, are best illustrated in connection with FIGS. 17 through 24 in which the winding of the low voltage conductor 112 on the forming mandrel 108 is illustrated in a series of sequential views.

The pressure roller subassembly 106 includes a peripheral pressure roller 152, side pressure rollers 154 and 156 (side pressure roller 156 being illustrated in FIG. 15), left containment roller 158 and right containment roller 160. The peripheral pressure roller 152 is carried by a pressure roller arm 162. The pressure roller arm 162 has an extending flange 164 which is located by a pair of ball pressure bearings 166 and 168 which restricts the motion of pressure roller arm 162 to the vertical plane defined by the flange 164. Within that vertical plane, the peripheral pressure roller 152 is moved horizontally by a horizontal motion link 170 which is coupled to a horizontal motion cam follower arm 172. Additionally, the peripheral pressure roller 152 is moved vertically by a vertical motion cam follower arm 174. The horizontal motion link 170 and the vertical motion cam follower arm 174 are pivotably coupled to the pressure roller arm 162 at pivots 171 and 173, respectively. The horizontal motion cam follower arm 172 and the vertical motion cam follower arm 174 are moved by a combination pressure roller cam 176 (also known as a double cam) which has a horizontal motion cam slot 178 and a vertical motion cam slot 182. A horizontal motion cam follower 180 resides in the horizontal motion cam slot 178 and is mounted on horizontal motion cam follower arm 172 for causing rotation of the horizontal motion cam follower arm 172 about a fixed pivot 184 to move the horizontal motion link 170 leftward and rightward with respect to the frame 130, which correspondingly pivots the pressure roller arm 162 about the pivot 173 at the left end of the vertical motion cam follower arm 174 to impart a reciprocal horizontal motion to the peripheral pressure roller 152. The vertical motion cam slot 182 receives a vertical motion cam follower 186 which is mounted on the vertical motion cam follower arm 174. Rotation of the combination pressure roller cam 176 causes the vertical motion cam follower 186 to move upwardly and downwardly thereby pivoting the vertical motion cam follower arm 174 about the pivot 188 causing upward and downward motion of the pressure roller arm 162 and attached peripheral pressure roller 152 in the vertical plane. The combination pressure roller cam 176 is coupled for rotation with the forming mandrel 108. The vertical and horizontal reciprocal motions of the peripheral pressure roller 152 imparted by rotation of the pressure roller cam 176 are coupled to the rotation of the forming mandrel 108 for a purpose as described in detail in connection with the sequential winding views of FIGS. 17 through 24. Briefly, the horizontal and vertical motion mechanisms provide means for translating the peripheral pressure roller 152 in accordance with the rotation of the forming mandrel 108 to substantially maintain a predetermined positional relationship among the peripheral pressure roller 152, the side pressure rollers 154 and 156, and the forming mandrel 108.

The terms vertical and horizontal are used herein as being descriptive of the preferred embodiment. It will be appreciated, however, that these terms are not limiting and can be deemed in a broader sense to relate to radial and lateral motions, respectively, with respect to the axis of the forming mandrel 108.

The pivot 188 of the vertical motion cam follower arm 174 is mounted on four compression springs 190 to permit limited downward motion of the pivot 188, and corresponding limited upward motion of the peripheral pressure roller 152 when a jamming or overpressure condition occurs between the peripheral pressure roller 152 and forming mandrel 108. Ordinarily, however, the springs 190 remain substantially uncompressed thereby fixing the position of pivot 188. The compression forces of the springs 190 are sufficiently high so that the springs 190 will be compressed to move the pivot point 188 only under a fault condition.

Left containment roller 158 and right containment roller 160 are each provided with a central core 192 and 194 respectively and lateral flanges 196 and 198, respectively. The cores 192 and 194 ride on the periphery of the forming mandrel 108 and the periphery of the formed coil 113. The flanges 196 and 198 straddle the formed coil 113 and the forming mandrel 108 to retain the formed coil 113 within the peripheral cavity 110 of the forming mandrel 108 during rotation of the forming mandrel 108. The formed coil 113 is not removed from the peripheral cavity 110 of the forming mandrel 108 until a turn is nearly completed, as illustrated in the sequential winding views of FIGS. 17 through 24.

Left containment roller 158 is mounted on the end of a left containment pivot arm 200 which in turn is mounted on a fixed pivot 202 for rotation in the plane of the figure. Left containment roller 158 is biased against the forming mandrel 108 by a pressure cylinder 204 which extends between a fixed pivot mount 206 and a pivot 208 on the left containment roller arm 200 near the end thereof which carries the left containment roller 158.

Right containment roller 198 is mounted on the end of a right containment roller pivot arm 210 which in turn is pivotally mounted at fixed pivot 212. The right containment roller 160 is biased against the forming mandrel 108 by a right containment roller pressure cylinder 214 which extends between a fixed pivot 216 and a pivot 218 on the right containment roller pivot arm 210 near the right containment roller 160.

With more particular regard to FIG. 12, the structure of the twist head subassembly 104 will be better appreciated. As can be seen in the figure, the twist head cylinder 126 includes a rod 220 which is extended from or retracted into the twist head cylinder 126 as air or pressurized fluid is supplied to lines 222 and 224. Twist head cylinder rod 220 is connected to the twist head rack 122 for reciprocal motion in the direction of arrows 226 to cause clockwise and counter clockwise rotation of the twist head pinion 124 in accordance with the rotation of the forming mandrel 108. The degree of extension of the rod 220, and therefore, the degree of rotation of the twist head pinion 124, is controlled by an adjustable twist head rack stop 228. The twist head rack stop 228 is threadly engaged with a twist head rack stop base 230 so that the twist head rack stop 228 can be adjusted inwardly and outwardly by rotation of the twist head rack stop 228.

FIG. 12 also illustrates an optional stabilizer bar 232 which is fixed to the twist head guide rods 134 for the purpose of assuring that each of the guide rods moves vertically in unison in response to vertical movement of the twist head table 128 under the control of the twist head lift cam 136. The twist head guide rods 134 slide in suitable bushings 234 which are mounted in upper guide plate 236 that is affixed to the frame 130. The twist head lift cam link 142 is coupled to the twist head table 128 by a clevis 283 that is fastened to the underside of the twist head table 128 and provides a pivotable coupling to the twist head lift cam link 142 at pivot 150.

In FIG. 12, a twist head vertical motion shock absorber 238 is illustrated. The vertical motion shock absorber 238 cushions the downward drop of the twist head table 128 by engaging the lower end of the guide rod 134. In this regard, it has been found in practice that the twist head table 128 must be lowered rapidly during the conductor forming cycle causing shock loads to be applied to the twist head lift cam follower 138. Those shock loads are alleviated by the twist head vertical motion shock absorber 238.

In FIG. 13, further details of the twist head subassembly 104 can be seen. In the figure, twist head air cylinder 126 is shown with a mounting bracket 240 which securely mounts the cylinder 126 to the twist head table 128. The table 128 has an elongated groove 242 which receives a linear bearing guide 244 which in turn guides the twist head rack 122 for reciprocal movement. The shaft 220 of the twist head air cylinder 126 extends through the mounting bracket 240 and attaches to a rack drive head 246. The rack drive head 246 has an upward projection 248 which extends through a slot 250 in the linear bearing guide 244 to permit the rack drive head 246 to be secured to the rack 122 by suitable screws 252. The rack 122 is retained in position by rack covers 254 and 256, the former having a notch 258 for providing clearance for the twist head housing 274.

As can be seen in FIG. 13, the twist head 116 includes a pair of twist head wire guides 260 and 262. Guide 260 is provided with a pair of longitudinal slots or channels 264 which are sized to accept the two wires 112*a* and 112*b* of the low voltage conductor 112. The guide slots 264 are substantially parallel to the feed axis 119 but converge slightly as they traverse the guide 260 so that the two wires 112*a* and 112*b* are closely spaced at the exit end 120 and are directed to converge into engagement at the forming mandrel 108. The twist head wire guides 260 and 262 are held together by a twist head collar 266 which surrounds the wire guides 260 and 262 and is adapted for connection to flanges 268 and 270 on the wire guides 260 and 262, respectively, by suitable screws 272. The twist head 116 is mounted for rotation about the feed axis 119 within a twist head housing 274 by suitable bearings 276. The pinion gear 124 is secured to the twist head 116 and coaxial to the feed axis 119 by means of a suitable key 278 which engages a key way 280 in the pinion gear 124 and by means of a set screw 282 which engages a flat 284 on the twist head 116. The feed axis 119 is substantially orthogonal to the axis of the forming mandrel 108.

Figure 13A:
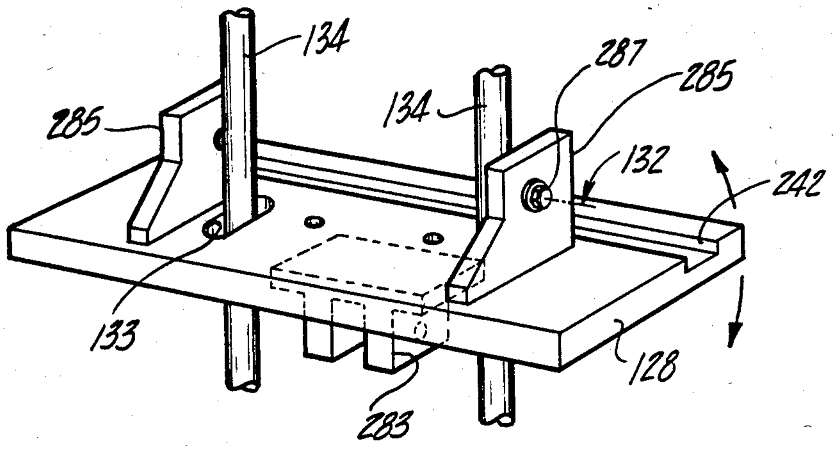

The twist head table 128 is pivotably coupled to the vertical guide rods 134 for pivoting about the pivot axis 132, as shown in FIGS. 13 and 13*a*. Two cradle members 285 are fastened to the twist head table 128 near the elongated slots 133 through which the vertical guide rods extend. Two suitable fasteners 287 extend through radial holes in the vertical guide rods 134 and are threaded into the cradle members 285 at opening 289. The fasteners 287 permit the cradle members 285 and attached twist head table to pivot about the pivot axis 132.

With reference now to FIGS. 12 and 14, the mounting of the pressure roller arm 162 can be better appreciated. The pressure roller arm 162 has a flange 164 which is disposed between two pressure roller arm mounting brackets 286 and 288. Each mounting bracket 286 and 288 is U-shaped having the pressure roller arm bearings 166 and 168 mounted on the bight of the U. The sides of the U are rigidly mounted to the twist head guide plate 236 and the frame 130 of the low voltage conductor winding machine 100. Bearings 166 and 168 confront the flange 164 of the pressure roller arm 162 to locate the arm generally in the vertical plane, but to permit motion parallel to the vertical plane.

The arrangement of the pressure rollers and the forming mandrel 108 can be best seen in FIG. 15. In FIG. 15, the forming mandrel 108 is shown with the peripheral cavity 110 which contains the low voltage conductors 112. Note that at the bottom of the forming mandrel 108, in a position corresponding to the radially-inward portion 115 of the toroidal transformer, the two wires 112*a* and 112*b* are shown radially stacked whereas at the top of the forming mandrel 108, in a position corresponding to the radially-outward portion 117 of the toroidal transformer, the two wires 112*a* and 112*b* are shown disposed axially side by side.

The forming mandrel 108 is secured by suitable screws to a backing plate 290. The backing plate 290 includes a radial flange 292 which projects slightly outwardly of the periphery of the forming mandrel 108 at all locations. The backing plate 290 is in turn secured to an outer driveshaft 294 by a large threaded nut 296. The outer driveshaft 294 is mounted for rotation about a mandrel axis 299 by bearings 298 and 300, and is rotatably driven by a motor and drive mechanism 301 (FIG. 9) through a pair of input sprockets 297. In addition to drive sprockets 297, the outer driveshaft 294 includes output sprockets 302 which drive the pressure roller combination cam 176 and single sprocket 304 which drives the lift cam 136. To the left of bearing 300 is an incremental twist drive mechanism 306 which will be described in detail hereinafter.

Returning to the forming mandrel 108, the peripheral pressure roller 152 is shown to be disposed at a predetermined positional relationship with respect to the periphery of the forming mandrel 108. Preferably, the peripheral pressure roller 152 bears upon the periphery of the forming mandrel 108 to cause the low voltage conductor 112 to deform to the height of the peripheral cavity. Such deformation is accomplished laterally by the front side conical pressure roller 156 which bears upon the front of the forming mandrel 108 and the low voltage conductor 112 to cause the low voltage conductor 112 to laterally (axially) deform to the width of the peripheral cavity. The side pressure roller 156 is conical so that at each point along the line of engagement between the side pressure roller 156 and the forming mandrel 108, the engaging surfaces move at the same speed.

In other words, the apex of the truncated cone of conical pressure roller 156 is located at the mandrel axis 299. By minimizing the speed differences between the engaged surface of the forming mandrel 108 and the engaged surface of the side pressure roller 156, wear due to sliding motion is reduced to a minimum. Note that the peripheral pressure roller 152 is positioned between the side pressure roller 156 and the flange 292 of the backing plate 290. The backing plate 290 is supported by the rear side pressure roller 154, which bears upon the back side of the backing plate 290. While the front side pressure roller 156 accomplishes a forming function, the rear side pressure roller 154 merely acts as a backing device to counteract the axial forming force generated by the front side pressure roller 156. The rear pressure roller 154 is conical for the same reasons previously explained with respect to the front side pressure roller 156.

The left containment roller 158 is seen in FIG. 15 as having its core roller 192 abutting the periphery of the forming mandrel 108 and the backing plate 290 while its side flanges 196 straddle the sides of the forming mandrel 108 and the backing plate 290 to retain the two wires 112*a* and 112*b* of the conductor 112 in position within the peripheral cavity 110. To accommodate the flange 292 of the backing plate 290, the core 192 of each containment roller 158 and 160 is provided with a central groove 293 which receives the flange 292. The containment rollers 158 and 160 provide no forming function, and therefore, the forces applied to the forming mandrel 108 and the low voltage conductors thereby are modest. Consequently, the differential speeds between the flanges 196 and the sides of the forming mandrel 108 and the backing plate 290 are not a significant disadvantage.

The mounting of the pressure rollers is best seen in FIG. 16. Each of the side pressure rollers 154 and 156 is rotatably mounted in a side pressure roller bearing block 308 which in turn is mounted in a side pressure roller mounting arm 310. In particular, the side pressure roller mounting arm 310 has an inwardly facing bifurcated portion 312 which receives one of the side pressure roller bearing blocks 308. The side pressure roller bearing blocks 308 are retained in the side pressure roller mounting arms 310 by suitable fasteners 314 and 316. The side pressure roller mounting arms 310 are in turn rigidly mounted to the frame 130 such that the side rollers 154 and 156 remain fixed in position but rotatable about their axes as the forming mandrel 108 rotates. In this regard, the conical roller 156 must be sufficiently tall so as to completely engage the low voltage conductor 112 throughout the entire rotation of the forming mandrel 108 from the lowest point when the center of the long sides of the forming mandrel 108 is adjacent the side pressure roller 156 to the highest point when the diagonals of the forming mandrel 108 are adjacent the side pressure roller 156.

The various motions and positional relationships of the forming mandrel 108, the twist head 116, the peripheral pressure roller 152, and the side pressure roller 156 are best seen in the sequential views of FIGS. 17 through 24.

FIGS. 17 and 17*a* illustrate the position of the various operating members approximately one-quarter turn after the start of winding of the first coil 113. Note that during the formation of the first coil, the end of the low voltage conductor 112 is disposed within and retained by groove 114. As shown in FIG. 17, the forming mandrel 108 has rotated clockwise about the mandrel axis 299 to a position where the peripheral pressure roller 152 is engaging the low voltage conductor 112 at the first corner 318 of the forming mandrel 108. FIGS. 17 and 17*a* aptly illustrate two basic conditions.

Firstly, a horizontal line of contact or engagement between the peripheral pressure roller 152 and the low voltage conductor 112 intersects a vertical center line of the side pressure rollers 154 and 156, which is the line of contact or engagement between side pressure roller 156 and the low voltage conductor 112. This relationship is established in order to define a forming window in a single plane defined by the horizontal and vertical contact lines and the peripheral cavity 110 so that the low voltage conductor 112 is wholly constrained at its top, bottom and two sides within that forming window. By so constraining the low voltage conductor 112, conformance with the desired cross section as defined by the peripheral cavity 110 and the pressure rollers 152 and 156 is assured. If the low voltage conductor 112 is not constrained in a single plane, the unconstrained side would relieve the pressure applied to the constrained sides thereby thwarting the intended forming action.

Secondly, note that the low voltage conductor 112 forms a generally straight line along the feed axis 119 through the twist head 116 to the forming window formed by the rollers 152 and 156 and the forming mandrel 108. This straight line relationship is accomplished by controlling both the height of the twist head through the twist head lift cam 136 and associated lift mechanism, and the tilt of the twist head 116 through the pivot axis 132. Note that the tilt of the twist head 116 need not be driven or controlled since the twist head 116 will tend to take the optimum tilt by pivoting freely about the pivot axis 132. Lift, however, is controlled through the twist head lift cam 136 acting through its follower arm 140 and link 142. Because of geometric constraints of the cams used in the instant system, the straight line relationship may not always be achieved.

Since the side pressure rollers 154 and 156 are fixed in position with respect to the frame 130, all relative motion between the peripheral pressure roller 152 and the side pressure rollers 154 and 156 is provided by movement of the peripheral pressure roller 152. This is accomplished by moving the peripheral pressure roller 152 both vertically and horizontally in the plane of the pressure roller arm 162. Particularly, the peripheral pressure roller 152 is raised and lowered by pivotal movement of the vertical motion cam follower arm 174 about pivot 188 in response to movement of the vertical motion cam follower 186 within the groove 182 of the combination cam 176 to maintain a predetermined positional relationship between the peripheral pressure roller 152 and the forming mandrel 108 as the forming mandrel rotates to present varying radial displacements to the peripheral pressure roller 152. Horizontal movement of the peripheral pressure roller 152 is accomplished by pivoting the pressure roller arm 162 about pivot 173 in response to movement of the horizontal motion link 170 which responds in turn to movement of the horizontal motion cam follower arm 172 which pivots about point 184 in response to movements of the horizontal motion follower 180 in cam track 178 of the combination cam 176. As shown in FIG. 17, the peripheral pressure roller 152 has been moved to a maximum radial displacement from the mandrel axis 299 to accommodate the corner 318 of the forming mandrel 108. FIG. 17 also shows that the peripheral pressure roller 152 is laterally positioned at the axis of the side pressure roller 156 during this stage of the low voltage conductor winding process.

During the rotation of the forming mandrel 108 about the mandrel axis 299, the rotary position of the twist head 116 about the feed axis 119 is controlled by the pinion 124 and rack 122. As best illustrated in FIGS. 17 and 17*a*, which represents the forming of the outside portion 117 of the coil 113 with the wires 112 disposed in side-by-side relationship, the twist head 16 is positioned to align the two wires in side-by-side relationship at the corner 318 of the forming mandrel 108.

FIG. 18 illustrates the relationship of the subassemblies of the low voltage conductor winding machine 100 as the forming mandrel 108 rotates clockwise about the mandrel axis 299 to a position wherein corner 318 has rotated past vertical. Note that the height of the twist head 116 has been increased by the lift cam 136 and the degree of tilt has been reduced to generally maintain the straight line relationship between the twist head 116 and the line of engagement of the low voltage conductor 112 with the forming mandrel 108. Also note that the line of engagement between the peripheral roller 152 and the low voltage conductor 112 lies along the axis of the side roller 156.

At the instant illustrated in FIG. 18, the twist head 116 has just rotated about the feed axis 119 to a position which is slightly past the vertical. This rotation twists the wires of the low voltage conductor 112 to accommodate the transition from an axially side-by-side relationship of the low voltage conductor wires at the outside portion 117 of the coil 113 (which corresponds to side 319 of the forming mandrel 108) to a radially stacked relationship at the inside portion 115 of the coil 113 (which corresponds to side 321 of forming mandrel 108). An over twist is required to provide 90° of twist at corner 320. However, only a small amount of over twist is required since there is a relatively small distance between the twist head 116 and the corner 320.

In FIGS. 19 and 19*a*, the subassemblies are shown in their operating positions as the forming mandrel 108 continues to rotate clockwise about the mandrel axis 299 and the second corner 320 is approached. Note that the wires 112*a* and 112*b* of the bifilar low voltage conductor 112 are twisted to a radially stacked relationship such that the entire transition between the axially side by side relationship at corner 318 and the radially stacked relationship at corner 320 has occurred on the short side of the coil, i.e., the top 317 or bottom 315 (FIG. 10) of the toroidal coil 113. Note also that the line of engagement between the peripheral pressure roller 152 and the conductor 112 continues to be aligned with the axis of the side pressure roller 156. This is accomplished by translating the peripheral pressure roller 152 to the right, as viewed in FIG. 19, to a position behind the axis of the side pressure roller 156. Also note that the twist head 116 is pivoted to a generally horizontal attitude to provide a generally straight line to the point of contact of the low voltage conductor 112 with the forming mandrel 108, namely at corner 320. The twist head 116 has not rotated about the feed axis 119 as between the FIGS. 18 and 19.

In FIG. 20, the winding process has now continued with the forming window formed by the lines of engagement between the peripheral and side pressure rollers 152 and 156 and the low voltage conductor 112 moving from corner 320 toward corner 322 along the side 321 of the forming mandrel 108 to form the radially inside portion 115 of the coil 113. At this point in the process, the wires 112*a* and 112*b* of the low voltage conductor 112 are radially stacked to provide the pie-shaped construction necessary to form the toroidal shape of the low voltage winding. Note particularly that the twist head 116 has been lowered to a position 323 (shown in dashed lines in FIG. 17) such that it is now below the mandrel axis 299 and is pivoted upwardly to maintain the substantially straight line relationship to the forming window formed by the peripheral pressure roller 152 and the side pressure roller 156. Additionally, the peripheral pressure roller 152 has moved forwardly and downwardly with respect to the side pressure roller 156 to maintain the forming window in a single vertical plane at the center line of the side pressure roller 156. Thus, the peripheral pressure roller 152 is positioned ahead of the axis of the side pressure roller 156 when the center of side 321 of the forming mandrel 108 is approaching the peripheral pressure roller 152 and the corner 320 of the forming mandrel 108 is receding from the peripheral pressure roller 152. The twist head 116 has not rotated about the feed axis 119 as between FIGS. 19 and 20.

In FIG. 21, the winding operation is shown with the pressure rollers 152 and 156 positioned at the center of surface 321 of the forming mandrel 108 which corresponds to the inside portion 115 of the toroidal transformer coil 113. Note that the twist head 116 has moved upwardly slightly and has pivoted to a near horizontal position. However, the twist head 116 has not rotated about the feed axis 119 as between FIG. 20 and FIG. 21. The peripheral pressure roller 152 has moved further downwardly to its minimal radial displacement relative to the mandrel axis 299 and somewhat rightwardly into alignment with the axis of the side pressure roller 156.

In FIG. 22, the forming mandrel 108 continues to rotate clockwise about the mandrel axis 299 to complete the formation of the inside portion 115 of the coil 113. The twist head 116 rises as the corner 322 rises but remains pivoted to a near horizontal position. No rotation of the twist head 116 about the feed axis 119 has occurred as between FIGS. 21 and 22. In FIG. 22, to accommodate the slope of the surface 321, the peripheral pressure roller 152 has moved rightwardly with respect to the side pressure roller 156 to maintain the line of engagement between the peripheral pressure roller 152 and the low voltage conductor 112 at the center line of the side pressure roller 156. Thus, the peripheral pressure roller 152 is positioned past the axis of the side pressure roller 156 when the corner 322 of the forming mandrel 108 is approaching the peripheral pressure roller 152 and the center of side 321 of the forming mandrel 108 is receding from the peripheral pressure roller 152.

In FIG. 23, the forming mandrel 108 has continued its clockwise rotation about the mandrel axis 299. To accommodate the transition from a radially stacked relationship of the wires 112*a* and 112*b* of the low voltage conductor 112 to an axially side by side relationship as required for the outside 117 of the toroidal coil 113, the twist head 116 has rotated clockwise about the feed axis 119 somewhat in excess of 90° to provide an overtwist. The overtwist is designed such that the next corner, i.e. corner 324, will engage substantially horizontally disposed wires of the low voltage conductor 112. Note that, while the two wires 112*a* and 112*b* of the low voltage conductor 112 are disposed generally horizontally, they are twisted beyond horizontal by a number of degrees, for example, 20 to 30 degrees. Since the twist head 116 is spaced from the corner 324 of the forming mandrel 108, and since the twist of the wires is distributed over its entire length between the corner 322 of the forming mandrel 108 and the output end 120 of the twist head 116, it is necessary to over-rotate the twist head 116 by an amount in accordance with that space so that the wires are horizontally positioned at the point that the corner 324 of the forming mandrel 108 meets the low voltage conductor 112 during clockwise rotation of the forming mandrel 108. To accommodate the high point at the corner 322, the peripheral pressure roller 152 has risen to near its maximum height and has moved leftward slightly with respect to the axis of the side pressure roller 156 to maintain the forming window at the axis of the side pressure roller 156. Similarly, the twist head 116 is now near its maximum height and is substantially horizontal in orientation.

In the final figure of this series, FIG. 24, the completion of a full coil 113 of the low voltage winding is shown. The wires 112*a* and 112*b* of the low voltage conductor 112 lie axially side by side as appropriate for the outside 117 of the toroidal transformer winding. The twist head 116 has moved downwardly below the mandrel axis 299 and is pivoted upwardly to maintain a near straight line with the surface 319 of the forming mandrel 108. The peripheral pressure roller 152 has moved leftwardly to keep its line of engagement with the low voltage conductor 112 at the axis of the side pressure roller 156. As between FIGS. 23 and 24, there has been no rotation of the twist head 116 about the feed axis 119. Just prior to the completion of the first coil 113, the end of the low voltage conductor 112 is removed from the slot 114 and is placed outwardly of the side pressure roller 156 so that succeeding coils of the low voltage winding can be formed.

In the sequence illustrated in FIGS. 17 through 24, the left and right containment rollers 158 and 160 have been following the form of the forming mandrel 108 to retain the formed coil 113 in position within the peripheral cavity 110 of the forming mandrel 108. While the containment rollers 158 and 160 are not actively controlled, they are continuously biased against the forming mandrel 108 under the action of their air cylinders 204 and 214, respectively.

As stated above, it is desirable that the peripheral pressure roller 152 and the side pressure roller 156, in conjunction with the forming mandrel 108, create a forming window located in a single plane extending through the axis of the side pressure roller 156. Due to the practical limitations of the contours of mechanical cams, this result can be achieved approximately, but not precisely. It is envisioned that the cams 136 and 176 can be replaced by electronically controlled motors to provide relatively precise location of the peripheral pressure roller 152 so as to provide the desired window in the plane of the axis of side pressure roller 156 without the compromise made necessary by the mechanical cams. Accordingly, such a construction is envisioned as within the scope of the claims of present invention.

FIG. 10 shows a few formed coils 113 of the low voltage winding. Note that the winding is bifilar (consisting of two wires 112*a* and 112*b*) and is characterized by radially stacked wires at the radially-inward portion 115 of the toroidal winding and axially side-by-side wires at the radially-outward portion 117 of the toroidal winding, with all transitions between the side-by-side and stacked relationships occurring entirely at the top 317 and bottom 315 portions of the winding. By restricting the transitions to the top and bottom portions of the windings, the space factor of the coil is improved and some nesting of the twisted bifilar winding at the top and bottom is achieved. Additionally, a pie-shaped form for each coil 113 as viewed from above or below is approximated, as shown in FIG. 10*a*. This pie-shaped form can be enhanced by increasing the forming pressures provided by the peripheral pressure roller 152 and the side pressure roller 156. In the case of preinsulated wire conductor 112, those pressures are selected so as to limit deformation of the conductor 112 to a degree which will not adversely affect the insulating qualities of the insulating layer. To the extent that the insulating layer is more resilient and damage resistant, the deformations can be increased. In the case of low voltage conductor 112 which are not preinsulated, the deformation can be substantially increased to form a more perfect pie-shaped bifilar conductor.

Due to the width of the conical side pressure roller 156 which effectively peels the formed coils 113 off of the forming mandrel 108, the formed coils 113 of the low voltage conductor are axially expanded as they are stripped off of the forming mandrel 108 causing the formed coils 113 of the low voltage conductor 112 to be spaced in spring like fashion as illustrated in FIG. 25. When the low voltage winding is ultimately used in the toroidal transformer, the coils 113 are compressed into an abutting relationship.

In FIGS. 25 and 26, the fourth subsystem, the storage mandrel subassembly 326 of the low voltage conductor winding machine 100, is illustrated. The storage mandrel subassembly 326 includes a first storage mandrel 328 and a second storage mandrel 330. The first storage mandrel 328 has an input end bell 332 which is connected for rotation with the forming mandrel 108 and the outer drive shaft 294 by a suitable coupling 334. The first storage mandrel 328 also has an output end bell 336 which is mounted for rotation with respect to a support post 338 by suitable bearing 340. The width of the support post 338 is less than the open space between the formed low voltage coils 113. The first storage mandrel has four corner rods 342 mounted on and extending between the input end bell 332 and the output end bell 336 to define a support structure of quadrilateral cross-section for supporting the formed coils 113. When the drive shaft 294 rotates, the forming mandrel 108 and the first storage mandrel 328 rotate therewith. As the low voltage conductor 112 is formed into quadrilateral pie-shaped coils 113 on the forming mandrel 108, the coils are continuously peeled off the forming mandrel 108 by the conical side pressure roller 156 and onto the first storage mandrel 328, which as previously explained, is rotating in unison with the forming mandrel 108.

The second storage mandrel 330 has an input end bell 346 which is mounted on and secured to an inner driveshaft 348 by a suitable key and set screws 350. The inner driveshaft extends through the first storage mandrel 328 and the forming mandrel 108 and is coaxial with the outer driveshaft 294. A bushing 349 is disposed between the end bell 336 of the first storage mandrel and the inner driveshaft 348 to support the inner driveshaft 348 on the support post 348. The second storage mandrel 330 has an output end bell 352 which is secured to the inner driveshaft 348 by a suitable key and set screw 354. The second storage mandrel 330 also has four corner rods 356 which are mounted on and extend between the input end bell 346 and the output end bell 352 to define a quadrilateral cross storage section for storing the formed coils 113 of the low voltage conductor 112. Note that the second storage mandrel 330 is effectively cantilevered from the support post 338 to facilitate the removal of the formed coils 113 from the second storage mandrel 330.

The formed coils 113 of the low voltage conductor 112, upon leaving the first storage mandrel 328, thread past the relatively narrow vertical support post 338 and onto the second storage mandrel 330. The lengths of each of the first storage mandrel 328 and the second storage mandrel 330 are established so that each can hold and support a complete section of the formed coils 113 for the low voltage windings of the toroidal transformer.

It has been found in practice that the corners of the formed coils 113 define angles that are somewhat greater than 90° due to the natural springback of the conductor material after the conductor is bent on the forming mandrel 108. As a result of this springback, the sum of the angles of the four corners of each coil 113 is greater than 360° in angular displacement. In other words, since each corner is not bent a full 90°, each coil falls short of a completed turn. If each low voltage conductor coil 113 constituted 360° of angular displacement, the low voltage conductor would lie in its unconstrained state with the respective four corners of all coils aligned in a straight axial line. Since the sum of the four corners of each coil of the low voltage conductor exceeds 360°, the corners of the coils appear to spiral since each corner is angularly offset from the adjacent corner by the amount by which the sum of the four corners of the coil exceeds 360° of angular displacement in its unconstrained state.

The bending shortfall which caused the corners of the underbent coils 113 to spiral in the unconstrained state is compensated by the dual storage mandrel construction illustrated in FIG. 25. The storage mandrel subassembly 326 provides overwinding means for receiving the underbent coils 113 from the forming mandrel 108 and for overwinding the underbent coils to compensate for the underbending. Particularly, the second storage mandrel 330 is designed to periodically over-rotate with respect to the first storage mandrel 328 to induce an additional bend in the formed coils 113 of the low voltage conductor to cause the corners of the formed coils 113 of the low voltage conductors to bend to approximately 90°. As a result of the over-rotation, the corners are positioned along a straight line when the overbent coils are in an unconstrained state. In particular, this is accomplished by rotating the second storage mandrel 330 by 0° to 180° clockwise with respect to the first storage mandrel 328 while three coils shown as 358, 360 and 362 are positioned in the space between the first storage mandrel 328 and the second storage mandrel 330. Since the coils 113 of the low voltage conductor which are on the first storage mandrel 328 are constrained by the four corner rods 342, and likewise, the coils 113 of the low voltage conductor which are disposed on the second storage manual 330 are constrained by the four corner rods 356, the bending motion resulting from the over rotation of the second storage mandrel 330 with respect to the first storage mandrel 328 is applied solely to the three unconstrained coils 358, 360 and 362. This overturning additionally bends the coils 358, 360 and 362 to compensate for the springback and resultant underbending which occurred on the forming mandrel 108. The overturning of the second storage mandrel 330 with respect to the first storage mandrel 328 is programmed by the machine to occur after each three rotations of the forming mandrel 108 so that a new group of three unconstrained coils 358, 360 and 362 is overbent on each occasion, and no coil is overbent a second time.

The second storage mandrel 330 is capable of overturning 0° to 180° relative to the first storage mandrel 328 by virtue of its mounting on the inner driveshaft 348 for independent rotation therewith. The inner driveshaft 348 is capable of the independent 0° to 180° rotation with respect to the outer driveshaft 294 by a mechanism to be described in connection with FIGS. 15, 27 and 28. It should be noted that the inner driveshaft 348 normally rotates with the outer driveshaft 294 except for the overbending rotation of 0° to 180°.

Referring now to FIGS. 15, 27, and 28, the outer driveshaft 294 is seen to have an outer driveshaft extension 364 coupled to the outer driveshaft 294 for rotation therewith. The inner driveshaft 348 is seen to extend through both the outer driveshaft 294 and the outer driveshaft extension 364. An overtwist linear cam 366 is disposed coaxially to and between the outer driveshaft extension 364 and the inner driveshaft 348. The overtwist linear cam 366 is keyed for rotation with the outer driveshaft extension 364 by a suitable pin 368 which is fixed to the inside of the outer driveshaft extension 364 and which engages an axial slot 369 in the overtwist linear cam 366. This pin and axial slot coupling allows the overtwist linear cam 366 to move axially with respect to the outer driveshaft extension 364. The inner driveshaft 348 has a pin 370 affixed thereto which resides in a cam slot in the overtwist linear cam 366. The cam slot in the overtwist linear cam 366 is an open "V" formed by an angled cam surface 372 and an axial cam surface 374.

With particular reference to FIGS. 29*a*, 29*b*, and 29*c*, it can be seen that axial motion of the overtwist linear cam 366 to the right relative to the inner driveshaft 348 and the outer driveshaft extension 364 causes the pin 370 to bear against the angled cam surface 372 and to be moved upwardly in the figure to rotate the inner driveshaft 348 clockwise (as viewed from the right) relative to the outer driveshaft extension 364. At the end of the rightward motion of the overtwist linear cam 366 relative to the inner driveshaft 348 and the outer driveshaft extension 364, the pin 370 has moved into contact with the axial cam surface 374 of the overtwist linear cam 366. When the overtwist linear cam 366 is retracted leftwardly relative to the inner driveshaft 348 and the outer driveshaft extension 364, the pin 370 remains in its clockwise rotated position near the axial cam surface 374 since the inner driveshaft 348 is held in that position by the now overbent coils residing on the storage mandrel 330. In other words, the V-shaped cam slot allows 0° to 180° lost motion depending upon the angle of the "V". Preferably, the V-shaped cam slot of the overtwist linear cam 366 provides for an angular rotation of about 50° to 60°, as illustrated. As the inner and outer driveshafts 348 and 294 continue to turn and wind additional coils 113 onto the storage mandrel, the overbent coils are moved onto the second storage mandrel 330 and new underbent coils are moved into the space between the first storage mandrel 328 and the second storage mandrel 330 thereby causing the second storage mandrel 330 to correspondingly rotate counterclockwise with respect to first storage mandrel 328. Such counterclockwise rotation continues for three turns at which time the pin 370 has returned to the angled cam surface 372 of the cam slot. At such time, three new underbent coils reside in the space between the first storage mandrel 328 and the second storage mandrel 330, and the new underbent three coils are then overbent by another rightward movement of the overtwist linear cam 366. This process repeats itself for each three coils so that compensated, overbent coils 113 are being continuously slid onto the second storage mandrel 330. FIG. 30 affords an end view of this overtwisting process.

A mechanism for moving the overtwist linear cam 366 relative to the inner driveshaft 348 is illustrated in FIG. 27. A dual air cylinder bracket 376 is securely attached to the main frame 130 of the low voltage conductor winding machine 100 by suitable fasteners. The bracket 376 has a pair of vertical mounting flanges 378 which receive and secure a pair of air cylinders 380. The air cylinders 380 have operating rods 382 which extend through openings 384 in flanges 378 of the mounting bracket 376 and attach to a push-pull yoke assembly 386 at openings 388. The push-pull yoke assembly 386 has a central bearing seat 390 and a bearing retention cap 392 for receiving and securing a bearing 394. The bearing 394 receives and rotatably mounts the overtwist linear cam 366. A collar 395 is secured to a reduced end portion 396 of the overtwist linear cam 366 to secure the overtwist linear cam 366 to the push-pull yoke assembly 386.

With reference now to FIG. 15, when the air cylinders 380 are extended, the push-pull yoke assembly 386 is in the position illustrated by the dashed lines 397. Also, the overtwist linear cam 366 is retracted to the position illustrated in FIGS. **29*a* and 29*c*. When the air cylinders 380 are then retracted, the push-pull yoke 386 is moved to the right to the position indicated in FIG. 15 by the solid lines. When this occurs, the overtwist linear cam 366 is also moved to the right as illustrated in FIG. 29*b* causing the pin 370 to be moved along the angled cam surface 372 to rotate the inner driveshaft 348 clockwise relative to the outer driveshaft 294. This relative rotation of the inner driveshaft 348 causes the second storage mandrel 330 to be rotated clockwise by a like amount relative to the first storage mandrel 328 thereby over-bending the three unconstrained coils 358, 360 and 362 which are located between the first and second storage mandrel 328 and 330. As previously explained, such additional twist compensates for the underbent conductor and causes the corners of the formed coils 113** of the low voltage conductor to be in alignment.

As the air cylinders 380 are extended to move the push-pull yoke assembly 386 to the leftward position illustrated by the dashed lines 397 in FIG. 15, the inner driveshaft 348 initially remains in the clockwise position as represented by FIG. 31 due to the holding effect of the now compensated coils 113 of the low voltage winding. As additional underbent coils 113 of the low voltage winding exit the first storage mandrel 328 into the space between the first and second storage mandrels, the second storage mandrel 330 moves counterclockwise relative to the first storage mandrel 328 to return the pin 370 to the angled cam surface 372 of the overtwist linear cam 366, as previously explained.

As also previously explained, the second storage mandrel 330 is rotated in the range from 0° to 180° clockwise with respect to the first storage mandrel 328, once for each three coils formed on the forming mandrel 108. To facilitate the counting of coils 113 formed on the forming mandrel 108, the outer driveshaft extension 364 is provided with two collars 398 having projections 399 which engage a counting device once each rotation for counting the rotations of the outer driveshaft extension 364 and the attached forming mandrel 108. Upon each count of three, a signal is generated (by means not shown) which controls the air cylinders 380 and causes the air cylinders to retract and impart the 0° to 180° clockwise rotation of the second storage mandrel 330 relative to the first storage mandrel 328. While the overwinding apparatus and method is described and illustrated for overwinding pie-shaped quadrilateral section coils, it will be appreciated that a broad range of directionally oriented coils may be overwound in like manner. Accordingly, such a use of the above-described overwinding apparatus and method is seen to be within the scope of the claims of the present invention.

In FIGS. 31A through 31C, another embodiment of a bifilar low voltage coil 301 is illustrated. As will be noted in FIG. **31*a*, the bifilar low voltage coil 301 includes a small trapezoidal conductor 303*a* and a large trapezoidal conductor 303*b* which are generally adapted to be stacked at the radially-inward leg of the low voltage winding and placed side-by-side at the radially-outward leg of the low voltage winding. Note that at the radially-inward leg, the stacked conductors 303*a* and 303*b* form a single trapezoid having four straight sides, whereas at the radially-outward leg, the side-by-side conductors 303*a* and 303*b* form a parallelogram having parallel sides. The conductors 303*a* and 303*b* are wound from continuous wire in the fashion illustrated in FIG. 31A by a combined twist and guide head 309 illustrated in its two operative positions in FIG. 31*b* and 31*c*. Note that the twist head has a fixed guide head 305 for feeding the large trapezoidal conductor 303*b* and a rotatable guide head 307 for feeding the small trapezoidal conductor 303*a*. Each guide head contains a guide passage configured to closely mate with its respective trapezoidal conductor. The rotatable guide head 307 can be rotated clockwise and counter clockwise 180° to position the rotatable guide head in the two respective positions of FIGS. 31*b* and 31*c***.

With reference to FIGS. **31*d* and 31*e*, the apparatus for further guiding the conductors 303*a* and 303*b* into the wound positions illustrated in FIG. 31*a* is illustrated. Such apparatus includes outside leg guide rollers 311*a* and 311*b* which are mounted for rotation about vertical spaced axes as illustrated. The outside leg guide rollers 311*a* and 311*b* are adapted to extend and retract in the direction of arrows 313*a* and 313*b*, respectively. Particularly, the outside leg guide rollers 311*a* and 311*b* are located adjacent a quadrilateral cross-section mandrel and are adapted to extend toward each other during winding of the outside leg of the toroidal low voltage coil while the rotatable guide head 307 is in the position illustrated in FIG. 31*b*. Engagement of the outside leg guide rollers 311*a* and 311*b* with the conductors 303*a* and 303*b* cause the conductors to be moved into side-by-side relationship to wind the outside leg of the toroidal low voltage coil 301. After the outside leg is wound, the outside leg guide rollers 311*a* and 311*b* retract in the direction of arrows 313*a* and 313*b* and the rotatable guide head rotates 180° clockwise while the top leg is wound allowing the conductors 303*a* and 303*b* to reorient to the positions illustrated in FIG. 31*c***.

During winding of the inside leg of the toroidal low voltage coil 301, a pair of inside leg guide rollers **315*a* and 315*b*, mounted on spaced converging axes, are moved inwardly in the direction of arrows 317***a* and 317*b*, respectively, to engage the conductors 303*a* and 303*b* as illustrated in FIG. 31*e*. Inside leg guide rollers 315*a* and 315*b* position the conductors 303*a* and 303*b* in a stacked relationship as illustrated in FIG. 31*e* during winding of the inside leg of the toroidal low voltage coil 301. Thereafter, during winding of the bottom leg, the rotatable guide head 307 rotates 180° counterclockwise and the inside leg guide rollers 315*a* and 315*b* retract. The process is repeated for each coil of the toroidal low voltage coil 301 until completed.

In FIG. 32*a* through 32*e*, yet another embodiment of a bifilar low voltage winding 331 is illustrated. The winding 331 includes an inside pair of bifilar conductors 323A and 323B and an outside pair of bifilar conductors 325A and 325B, each wound from continuous wire. The conductors 323 and 325 are separated by a wound insulation barrier 327. Note that the conductors 323 and 325 have an oblong cross-section with one dimension substantially greater than the orthogonal dimension. Note also that the conductors 323 and 325 are wound so that the bifilar conductor pairs are positioned on end at the radially-inward portion of the low voltage winding and on their sides at the radially-outward portion of the low voltage winding. In other words, the long cross-sectional dimension of each conductor is positioned radially at the radially-inward leg of the low voltage winding and the short cross-sectional dimension is positioned radially at the radially-outward leg of the low voltage winding with the conductors disposed side-by-side in each case.

The conductors 323 and 325 are wound in the manner shown in FIG. 32*a* by the use of a twist head 329 as illustrated in FIG. 32*b* and FIG. 32*c*. The twist head 329 is adapted to be rotated clockwise 90° from a position shown in FIG. 32*b* to a position shown in FIG. 32*c*, and alternately, counterclockwise 90° to return it to the position shown in FIG. 32*b*. Note that the conductors are guided by guide passages within the twist head 329 which are positioned in diagonally opposite quadrants with respect to the rotational axis of the twist head 329 with the opposing corners of each conductor being closely spaced. When the conductors 323 and 325 are fed onto a rotating mandrel 333 having a quadrilateral cross-section using a twist head oriented as illustrated in FIGS. 32*b* and 32*c*, the conductors 323 and 325 can be conveniently positioned as illustrated in FIG. 32*a*. Particularly, with reference to FIG. 32*b* and FIG. 32*d*, which illustrate the positioning of the conductors at the radially-outward leg of the low voltage winding, it can be seen that the conductors can be moved by a peripheral roller 335 into a side-by-side relationship with the short cross-sectional dimension of each conductor positioned radially. With reference to FIGS. 32*c* and 32*e*, it can be seen that a 90° clockwise rotation of the twist head 329 from that shown in FIG. 32*b* allows the conductors to be positioned, again side by side, but with the long cross-sectional dimension of each conductor positioned radially as appropriate for the radially-inward leg of the low voltage winding 331. Rotation of the twist head 329 occurs after the inside and outside legs of the toroidal coil are wound on mandrel 333 such that the transistions from stacked to side-by-side relationships of the conductors 323 and 325 occur at the top and bottom legs of the toroidal coil. Of course, the inside toroidal coil is wound from conductors 323*a* and 323*b* prior to the winding of the outside toroidal coil from conductors 325*a* and 325*b*. After the inside coil is wound, an insulating barrier 327 is wound over the inside toroidal coil. Through the use of such a barrier, the inside coil can be connected to one 120 volt circuit of a 120/240 volt secondary power supply and the outside coil can be connected to the other 120 volt circuit to distribute the two circuits around the entirety of the transformer core.

One exemplary embodiment of a low voltage coil used a conductor comprising five round continuous wires which were aligned side by side in a straight line by a guide head. The low voltage coils were wound in toroidal fashion on a quadrilateral cross-section, arcuate arbor by winding the groups of 5 in-line wires with each group side by side on the radially-outside leg of the toroidal coil and two groups stacked on the radially-inside leg of the toroidal coil. This was accomplished by converging two groups of five wires on the top and bottom legs of the toroidal coil to the stacked position at radially-inside leg of the toroidal coil. This pattern continued until the entire 120 volt low voltage section was wound. A layer of Kraft insulating paper was wrapped on top of the first 120 volt section and a second 120 volt section was similarly wound. In the exemplary embodiment of the low voltage coil, five conductors of 13 gauge insulated round copper wire were used. However, the number of conductors, the material of the wire, the shape of the conductors, the gauge of the conductors can all be varied by the designer. Moreover, the number of layers of conductors on the inside and outside legs of the toroidal coil can be varied so long as a greater combined thickness is provided by the radially-inside leg and greater combined width as provided at the radially-outside leg to result in a toroidal coil.

It should be noted that the low voltage winding conductor is not necessarily limited to a particular number of wires used to form each turn, a particular configuration of the wires or a particular arrangement of the wires to form pre-shaped coils.

Description of the High Voltage Coil Winding Machine

In FIG. 33, the high voltage coil winding machine 400 is seen to comprise a computer numeric controller 402 and a winding machine 404. The controller 402, for example, may be a numeric controller model Mark Century 2000 MC CNC produced by General Electric Co. Cincinnati, Ohio. The controller 402 is connected to a control cable connector box 406 on the winding machine 404 by a control cable 408. The controller 402 sends signals over the cable 408 which are effective to control the multiple functions of the winding machine 404 which will be described below. The winding machine 404 consists essentially of two subsystems, a rotatable mandrel subsystem 410 and a wire placement subsystem 412. As the mandrel rotates, the wire placement subsystem accurately positions a wire relative to the mandrel to cause the wire to be wound about the mandrel in a predetermined fashion to fabricate a plurality of integrally-connected high voltage bundles or coils 413. In plan view (FIG. 2), the coils 413 are seen as pie or wedge shaped, while in side view (FIG. 3) the coils are seen to have a generally quadrilateral section. The rotatable mandrel subsystem 410 includes a mandrel assembly 414 which is designed to rotate about a mandrel axis 417 causing wire 416 to be wound upon it in such predetermined fashion to provide the integrally-connected, pie-shaped high voltage coils 413.

The mandrel assembly 414 provides a winding mandrel that is rotated about the mandrel axis 417 by a mandrel shaft 418 which engages the mandrel assembly 414 at a mandrel drive socket (not shown) which provides driving engagement between the mandrel shaft 418 and the mandrel assembly 414. The mandrel shaft 418 is rotatably mounted by means of a left mandrel shaft bearing 422 and a right mandrel shaft bearing 424. The mandrel shaft 418 is rotatably driven by mandrel servo motor 426 which is connected to drive the mandrel shaft 418 by means of a mandrel reduction drive 428 and a mandrel shaft drive pulley 430. The mandrel shaft 418 carries for rotation therewith a mandrel positioning cam 432 at its left extremity which is cooperatively engaged by a roller follower of a mandrel position switch 434. The mandrel position cam has a detent 436 which receives the roller of the mandrel positioning switch 434 to designate a measurement position for the mandrel assembly 414 for measuring the rotational position of the mandrel assembly 414 as will be explained below.

The mandrel assembly 414 includes a rectangular mandrel tube 438 which serves as the central support member for the mandrel assembly 414. Coil side forms 440 are wedge shaped plates, each having a rectangular opening for receiving the mandrel tube 438, and are installed on the mandrel tube 438 in a radial orientation with respect to the mandrel axis 417. The coil side forms 440 are wedge or pie-shaped when viewed from the top or bottom of the high voltage winding 413 (along the direction indicated by arrow 441). It should be noted that each coil side form 440 includes a wire cross-over guide pin 444 fixed at its periphery near the transition between the top and the outside of the high voltage coils. Coil inside forms 442, which have a like rectangular opening, are interposed between the coil side forms 440 and serve to evenly space the coil side forms 440 on the mandrel tube 438. Note that the coil inside forms 442 are pie-shaped to correspond in reverse to the pie-shape of the coil side forms 440. The pie shapes of the coil side forms 440 and the coil inside forms 442 are dictated by the desired pie-shape of the high voltage coils 413. As shown in FIG. 2, the pie-shaped high voltage coils 413 are narrow at a radially inward portion 443 thereof. To form the radially inward portion 443 of the pie-shaped high voltage coils 113, the coil inside forms 442 have a corresponding lesser axial thickness and the coil side forms 440 have a corresponding greater axial thickness at the inside 445 of the pie section. The coil inside forms 442 also have a greater height from top to bottom at the inside 445 of the pie section so that its shape corresponds generally to the trapezoidal shape of the low voltage conductor with the insulated barrier 50 added thereto. The coil side forms 440 have a greater radial depth at the inside 445 of the pie section to accommodate a greater radial depth of the coil 413 at its axially narrowest point. When installed on the mandrel tube 438, each coil inside form 442 and its two adjacent coil side forms 440 form an annular wire cavity for containing multiple turns of the wire 416.

To assemble the mandrel assembly 414, alternating coil side forms 440 and coil inside forms 442 are slid over the mandrel tube 438 until they abut a left coil forms clamp 446. Once the coil side forms 440 and coil inside forms 442 are positioned in abutting relationship on the mandrel tube 438, the right coil forms clamp 448 is secured to the mandrel tube 438 and clamping screws 450 are turned to clamp the coil side forms 440 and coil inside forms 442 into position as shown in FIG. 33. Note that a portion of the mandrel assembly 414 is cut away in FIG. 33 for clarity.

As previously stated, the mandrel assembly 414 is rotatably driven by the mandrel drive socket which is mounted on a bracket on the left end of the mandrel tube 438. The mandrel assembly 414 is supported on its right end by a mandrel support bracket 452 which is secured to the right end of the mandrel tube 438. The mandrel support bracket 452 has a central depression which receives the pivot member 454 of a mandrel tail stock assembly 456. The mandrel subsystem 410 is mounted on a support frame assembly 458 which includes a rectangular, forwardly-projecting section 460 for supporting the mandrel servo motor 426, and the mandrel shaft bearings 422 and 424. The support frame assembly 458 also has a main section 462 which supports the wire positioning subsystem 412 and the mandrel tail stock assembly 456.

The wire placement subsystem 412 includes a traverse servo motor 464 which is mounted on a left traverse upright 466 by a traverse motor mount 468. The traverse servo motor 464 drives a traverse drive screw 470 of predetermined thread pitch which extends between the left traverse upright 466 and the right traverse upright 472. The traverse drive screw is supported by a left traverse drive screw bearing 474 and a right traverse drive screw bearing (not shown). An upper traverse guide rod 478 is positioned above and parallel to the traverse drive screw 470 and extends between the left traverse upright 466 and the right traverse upright 472.

A traverse frame 480 is slidably mounted on the upper traverse guide rod 478 by an upper slide bearing 482. The traverse frame 480 also carries a traverse drive ball nut 484 which is threaded on the traverse drive screw 470 so that rotation of the drive screw 470 by the traverse servo motor 464 causes the traverse drive ball nut 484 to be driven to the left or right, depending upon the direction of rotation of the traverse drive screw 470, and causing the traverse frame 480 to be moved to the left or right correspondingly. Note that the lower end of the traverse frame 480 has a lower slide bearing 532 which receives a traverse guide rod 534 for supporting and guiding the lower end of the traverse frame 480. The lower traverse guide rod 534 is supported by the left traverse upright 466 and the right traverse upright 472 as shown and is disposed parallel to the traverse drive screw 470 and the upper traverse guide rod 478.

Traverse frame 480 carries a tilt axis bearing box 486 which in turn rotatably carries a tilt axis shaft 488. The tilt axis shaft 488 is rotatably driven by a tilt servo motor 490. The tilt axis shaft 488 carries a lift cam follower 494 which is rotatably mounted relative to the tilt axis shaft 488 by means of a suitable bearing. The tilt axis shaft 488 also carries a caster arm 496 which is rigidly mounted to the tilt axis shaft 488 for rotation therewith about a tilt axis 497 as illustrated.

As best shown in FIG. 33*a*, the caster arm 496 carries a wire placement wheel yoke 498 which is rotatably mounted on the caster arm 496 by a caster bearing 500. The wire placement wheel yoke 498 is rotatable about a caster axis 568 through the center of the caster bearing 500 that is transverse to the tilt axis 497 and to the mandrel axis 417. The wire placement wheel yoke 498 is bifurcated to provide a pair of support arms 502 which receive the mounting shaft of a wire placement wheel 504. The wire placement wheel 504 is mounted on bearings for rotation relative to the wire placement wheel yoke 498 about an axis that is transverse to both the caster axis 568 and the tilt axis 497. The wire placement wheel 504 has a groove 506 in its periphery for receiving and guiding the wire 416 and provides means for placing the wire 416 within the annular wire cavities. The caster arm 496 also carries a wire guide bracket 508 having a front wire guide pulley 510 and a rear wire guide pulley 512. The front wire guide pulley 510 and the rear wire guide pulley 512 are each rotatably mounted on the wire guide bracket 508 and each has a groove in its periphery for receiving and guiding the wire 416. The wire guide bracket 508 is mounted to pivot clockwise about the axis of rear pulley 512. The wire guide pulley 508 is biased upwardly by a suitable spring (not shown) to bias front pulley 510 upwardly to tension the wire 416. Caster arm 496 also includes a forward fixed wire guide 514 and a rearward fixed wire guide 516. The rearward fixed wire guide 516 guides the wire 416 from below the caster arm 496 to the rear wire guide pulley 512. The wire 416 thereafter passes over the rear wire guide pulley 512 and extends forwardly to the front wire guide pulley 510. After traversing the wire guide pulley 510, the wire 416 extends downwardly through the forward fixed wire guide 514 to the groove 506 in the periphery of wire guide wheel 504 for accurate placement on the mandrel assembly 414 as will be explained in detail in connection with FIGS. 35 through 38.

The lower portion of the traverse frame 480 also carries a lower guide pulley bracket 536 which carries a lower wire guide pulley 538. A wire tensioning pulley bracket 540 is mounted on the right traverse upright 472 and carries a wire tensioning pulley 542. The wire 416 is guided into the wire placement subsystem 412 by the wire tensioning pulley 542 and the lower wire guide pulley 538. Wire 416 is directed from the lower wire guide pulley 538 upward through the rearward fixed wire guide 516, and hence to the wire placement wheel 504 as previously described. The wire tensioning pulley 542 is spring-loaded to maintain a suitable tension on the wire 416 as the wire is wound onto the mandrel assembly 414.

As previously indicated, the tilt axis bearing box 486 is carried by the traverse frame 480. However, it is not rigidly mounted to the traverse frame 480. Rather, it is mounted by a suitable bearing shaft (not shown) for rotation about a Z-axis pivot 518 (FIG. 33). Pivoting of the tilt axis bearing box 486 about the Z-axis pivot 518 causes corresponding tilting of the tilt axis shaft 488 and corresponding upward and downward movement of the wire placement wheel 504 in the direction of arrows 520.

Pivoting of the tilt axis bearing box, 486 and corresponding upward and downward movement of the wire placement wheel 504 is provided by a lift cam subassembly 522. As shown in FIG. 33, the lift cam subassembly 522 includes a lift cam servo motor 524 which drives a lift cam reduction drive 526 to, in turn, rotatably drive a lift cam 528. The lift cam 528 engages the lift cam follower 494 to cause upward and downward movement of the lift cam follower 494 and corresponding pivoting of the tilt axis bearing box 486 in accordance with the profile of the lift cam 528 as the lift cam 528 rotates under control of the lift cam servo motor 524. Note that in FIG. 33 the tilt axis bearing box 486 and attached wire placement wheel 504 are pivoted upward for clarity. The lift cam subassembly 522 is mounted on a lift cam bracket 530 which is securely mounted on the traverse frame 480 for leftward and rightward movement with the traverse frame 480 under control of the traverse servo motor 464 and the controller 402.

The lift cam bracket 530 also carries a mandrel position measuring device 543 (see FIG. 34A) which includes a probe 544 and a probe transducer 546. The probe transducer 546 is slidably mounted on a support 548 which in turn is mounted on the lift cam bracket 530. The probe transducer 546 can be extended from and retracted toward the support 548 by a suitable air cylinder arrangement (not shown). The mandrel position measuring device 543 is connected to the computer numeric controller 402 and is used to measure the axial position of one edge of each coil inside form 440 of the mandrel assembly 414 and to provide that position information to the computer numeric controller 402 so that it may in turn accurately position the wire placement wheel 504 between the coil side forms 440 for winding the coils.

It should be noted that the traverse servo motor 464, the mandrel servo motor 426, the tilt servo motor 490, and the lift cam servo motor 524 are all highly accurate devices which operate in response to control signals sent by the computer numeric controller 402. The computer numeric controller 402 causes each of the servo motors to operate cooperatively to perform the functions hereinafter described.

In the operation of the high voltage coil winding machine 400, an empty mandrel assembly 414 is mounted on the mandrel subsystem 410 between the mandrel drive socket and the mandrel tail stock assembly 456. Since, in a production environment, each high voltage coil winding machine will be operated with several mandrel assemblies 414 used sequentially, and since it must be expected that the component parts of each mandrel assembly 414 used with the coil winding machine 400 will have somewhat different dimensions due to normal manufacturing tolerances, the total accumulated tolerance of the stack of coil side forms 440 and coil inside forms 442 is expected to vary considerably over the length of the mandrel assembly 414. Therefore, to facilitate accurate positioning of the wire 416 within each annular wire cavity it is necessary to measure the position of each coil side form 440 in the mandrel assembly 414. This measurement is accomplished by the mandrel position measuring device 543 and is more particularly described with respect to FIGS. 34 and 34*a*.

To facilitate measurement of the mandrel assembly 414, the mandrel shaft 418 is rotated to an initial position in which the roller of the mandrel positioning switch 434 resides in the detent 436 of the mandrel positioning cam 432. In that position, the mandrel assembly 414 is positioned substantially as illustrated in dashed lines at position 550 in FIG. 34. With the mandrel 414 at position 550, the probe transducer 546 is moved forwardly into its extended position 552. Note that when the mandrel assembly 414 is at position 550, there is clearance between the mandrel assembly 414 and the probe transducer 546 to permit the transverse servo motor 464 to move the traverse frame 480 and attached mandrel position measuring device 543 with respect to the mandrel assembly 414.

To begin the axial measurement of the annular wire cavities of the mandrel assembly 414, the mandrel position measuring device 543 is moved to a position adjacent the first wire cavity by rotation of the traverse servo motor 464. During that movement, the mandrel assembly 414 is in position 550 to provide clearance for the probe transducer 546. Once the probe transducer 546 is in the appropriate position, the mandrel assembly 414 is rotated approximately 90° to a measurement position 554 to present the face or side wall of the coil side form 440 adjacent its radially-outside corner, to the probe transducer 546 as illustrated in FIGS. 34 and 34*a*. With the mandrel assembly 414 in the measurement position 554, the position of that face can be determined with accuracy by the mandrel position measuring device 543 by further rotation of the traverse servo motor 464 until the probe transducer 546 senses the coil side form 440 that forms the side wall of the wire cavity. Preferably, the probe transducer 546 is a contact sensor which senses the coil side form 440 by contact. The axial measurement of the wire cavity equals the position of the traverse servo motor 464 when the probe transducer 546 senses the coil side form 440. That measurement is remembered by the computer numeric controller 402. After that measurement is taken, the mandrel assembly 414 again rotates to the probe-clearance position 550, the mandrel position measuring device 543 is traversed by rotation of the traverse servo motor 464 to a position adjacent to the next wire cavity, and then the mandrel assembly 414 is again rotated to the measuring position 554. Thereupon, a measurement is taken of the corresponding side surface of the second wire cavity, and that measurement is stored in the computer numeric controller 402. This measuring-traversing-measuring operation is repeated for each wire cavity until the corresponding surface of each wire cavity of the entire mandrel assembly 414 is taken and recorded in the computer numeric controller. Those measurements are thereafter used to control the rotation of the traverse servo motor 464 to position the wire placement wheel 504 accurately with respect to each of the wire cavities during the coil winding operation.

The manner in which the conductive wire is laid into the annular wire cavity defined by the coil side forms 440 and coil inside form 442 during winding is illustrated in FIGS. 35 through 38. As described above, the wire placement wheel 504 acts as a positioning guide to place the wire 416 within the wire cavities. In FIGS. 35 and 35*a*, the wire placement wheel 504 is illustrated at the upper inside corner of the winding mandrel assembly 414 for one of the wire cavities. Note that the wire 416 is held in place on the outside portion of the cavity by virtue of the wire cross-over guide pin 444. Note also that the wire placement wheel 504 is lifted above the bottom surface of the wire cavity by the lift cam 528 in addition to the amount necessary to clear the bottom surface corner 558 of the mandrel assembly 414 as the mandrel assembly 414 rotates in a counterclockwise direction. An additional amount of lift is required in order to allow placement of the wire 416 in predetermined positions which vary as between the inside leg and the outside leg of the toroidal high voltage winding, for example, as illustrated in FIG. 39. Particularly, without the additional lift of the wire placement wheel 504, the wire 416 will tend to guide along the previously laid turn since it is being pulled along the side of the previously-laid turn because of the winding tension in wire 416. Consequently, this guiding effect must be overcome to allow the new turn to cross over the previously-laid turn as required by the predetermined coil placement patterns of the inside and outside legs, for example, as illustrated in FIG. 39. Without the additional lift, the maximum lateral force which can be applied to the wire by the wire placement wheel 504 is insufficient to accomplish the cross over of the previously laid turn. The maximum lateral force which the wire placement wheel 504 can apply to the wire 416 is a function of the depth of the groove 506 and the winding tension. If it is exceeded, the wire 416 will slip off the wire placement wheel 504 preventing further accurate placement of the wire 416 until it is re-mounted on the wire placement wheel 504. Consequently, when the additional lift is not employed, the wire 416 tends to slip off the wire placement wheel 504 as a result of the guiding force caused by the previously-laid turn. The additional lift, as illustrated in the FIGS. 35–39, reduces the guiding force of the previously laid turn to keep it within the maximum lateral force capability of the wire placement wheel 504. It should be noted that to achieve volumetric efficiency, all cross overs of wire 416 occurs on the top or bottom legs of the toroidal high voltage coils. As illustrated in FIG. 35*a*, at the rotational position of the mandrel assembly 414 illustrated in FIG. 35, the wire placement wheel 404 is oriented perpendicularly to the mandrel axis 417.

In FIGS. 36 and 36*a*, the mandrel assembly 414 is seen rotated counterclockwise to a position in which the wire placement wheel 504 is located near the midpoint of the inside leg of the wire cavity. The axial cross-section of the cavity at the inside leg is trapezoidal as illustrated in FIG. 36*a* in other words, the side walls 560 and 566 of the annular wire cavity 562 converge toward the entrance 564 to the wire cavity. To accommodate this trapezoidal cross-section, but yet place the wire at positions within the wire cavity which are laterally outside of the narrow entrance 564 to the wire cavity, the wire placement wheel 504 is tilted about the tilt axis 497 by rotation of the tilt servo motor 490. Note that the tilt axis 497 is tangent to the lower edge of the wire placement wheel 504 where the wire exits the groove 506 of the wire placement wheel 504, which allows the caster arm 496 to be tilted without changing the axial position of the wire 416. The axial position of the wire 416 within the wire cavity 562 is determined by the position of the traverse frame 480, and is controlled by the traverse servo motor 464. Additionally, to place the wire 416 in the bottom of the wire cavity, the caster arm 496 and the tilt axis bearing box 486 are pivoted about the Z-axis 518 upon rotation of the lift cam 528 to lower the wire placement wheel 504 into the wire cavity 562 to place the wire 416 in the proximity of the bottom of the wire cavity. Note that, since the wire tensioning pulley 542 maintains tension on the wire 416 as the mandrel rotates, the wire conforms to the shape of the periphery of the wire placement wheel 504. In other words, the wire placement wheel 504 imposes a prebend on the wire 416 that is opposite the bend imposed on the wire 416 as it is wound into the wire cavity 562. This prebend reduces the tendency of the wire to bow away from the bottom surface of the wire cavity 562. Also note that, at the inside leg 445 of the wire cavity 562, the opening 564 into the wire cavity is slightly wider than the thickness of the wire placement wheel 504.

In FIGS. 37 and 37*a*, the mandrel assembly 414 has further rotated counterclockwise to position the wire placement wheel 504 within the bottom leg of the wire cavity 562. Note that as shown in FIG. 37, the lift cam 528 has rotated to position the wire placement wheel 504 above the bottom of the wire cavity 562 to not only clear the corners of the bottom surface of the wire cavity, but an additional amount as previously explained. As illustrated in FIG. 37*a*, the wheel has tilted to a position near vertical. Additionally, the wire placement wheel 504 has castered by rotating about the caster axis 568 so that the lower part of the wheel lays along the skewed left side wall 566 of the coil side form 440 to place the wire 416 near the bottom corner of the wire cavity 562. But for this castering feature, the wire placement wheel 504 would be unable to follow the skewed side wall of the wire cavity. To place the wire 416 along the skewed side wall, in addition to the castering action, the traverse servo motor 464 drives the traverse frame 480 and the wire placement mechanism including the wire placement wheel 504. Note that castering in the opposite direction must occur to place the wire 416 at the lower right-hand corner of the wire cavity 562. Additionally, no castering is required for placement of the wire 416 in the center of the wire cavity since the wire placement wheel 504 need not place the wire along the skewed side walls.

The castering action of the wire placement wheel 504 is not separately driven. Rather, castering rotation is freely permitted and occurs by virtue of the drag or tension force of the wire 416 as it is being wound into the wire cavity. For example, when the traverse servo motor 464 rotates to move the traverse frame 480 and the wire placement mechanism including the wire placement wheel 504 to position the bottom periphery of the wire placement wheel 504 in position to locate the wire 416 at the left side wall 566 of the wire cavity 562 as illustrated in FIG. 39*a*, the wire placement wheel 504 rotates about the caster axis 568 by virtue of the wire 416 pulling the wheel 504 toward the left side wall of the wire cavity. In effect, the tension force on the wire 416 which is applied to the periphery of the wire placement wheel 504 at a point displaced from the caster axis causes alignment of the wire placement wheel 504 with the wire 416.

In FIGS. 38 and 38*a*, the winding of the next full turn is illustrated. As shown in FIG. 38*a*, the wire 416 is placed at the bottom of the wire cavity 562 at the rightward side wall 560. To cause placement at the rightward side wall 560, the tilt servo motor 490 has rotated the caster arm 496 and the wire placement wheel 504 about the tilt axis 497 to position the bottom of the wire placement wheel 504 at the bottom right of the wire cavity 562, and the traverse servo motor 464 has moved the traverse frame 480 and attached wire placement wheel 504 to the right. Since the wire placement wheel 504 is now traversing the axially straight inward leg of the coil, it does not caster.

The winding process continues until the entirety of the bottom of the inward leg 445 of the wire cavity 562 is covered with a single layer of wire, for example, in a sequence as illustrated in FIG. 39. Note that the first turn is laid at the bottom left corner of the inside leg 445 of the wire cavity 562 and at the bottom left corner of the outside leg 568 of the wire cavity. The second turn is laid adjacent the first turn. Thereafter, the third turn is laid at the bottom right corner of the inside leg 445 of the wire cavity 562 while the third turn is laid approximately two-thirds of the distance across the outside leg 568 of the wire cavity from the first turn. Subsequently, the fourth turn is laid in between the second and third turns in the inside leg 445 of the wire cavity to wedge the second and third turns apart to tightly fill the bottom of the inside leg 445 of the wire cavity. Subsequent turns, i.e., turns 5, 6, et al., are laid on top of the first layer of the inside leg 445 of the wire cavity until the first layer of the outside leg 568 of the wire cavity 562 is filled. The first layer of the outside leg 568 of the wire cavity is tightened by a similar wedging placement of the last turn of the first layer of the outside leg. The winding build continues until the appropriate number of turns has been laid in a pie-shaped pattern as defined by the side walls of the coil side forms 440, thus forming a bundle or coil 413 of the high voltage winding 60.

After a complete coil 413 has been wound in the first wire cavity 562, the lift cam servo motor 524 lifts the wire placement wheel 504 from the wire cavity and the traverse frame 480 carrying the wire placement wheel 504 traverses to the next wire cavity under control of the traverse servo motor 464. That traverse occurs with the mandrel assembly 414 positioned so as to cause the wire 416 to loop around the wire cross-over guide pin 444 as illustrated in FIG. 33. Thereafter, the next coil 413 is wound in the next wire cavity in the same fashion described above. It should be noted in this regard that accurate axial placement of the wire 416 within the wire cavities is accomplished by accurate axial positioning of the wire placement wheel 504 in accordance with the measured axial positions of the side walls of the coil side forms 440 which were stored in the computer numeric controller 402. Consequently, the computer numeric controller causes the traverse servo motor 464 to rotate in an amount in accordance with that measured dimension when the traverse frame 480 is moved from a position suitable for winding one coil to a position suitable for winding the next coil.

When all of the wire cavities of the mandrel assembly 414 have been wound to form the pie-shaped coils 413, the end of the wire 416 is cut and secured, and the mandrel assembly is removed from the high voltage coil winding machine 400. Thereafter, a new mandrel assembly is installed and measured to determine accurately the axial positions of the wire cavities 562. Thereafter, a new sequence of operations occurs to wind coils into each of the wire cavities as previously described.

After removal of the mandrel assembly 414, the coils of wire 416 are bonded together, for example by apparatus of heat to a thermo-bonding coating on the wire 416. This heat can be generated in an oven or by passing a heating current through the wire 416. The wire 416 is bonded to preserve the shape of the preshaped coils with the wire retained in the predetermined positions.

In FIGS. 40 and 40*a*, an alternate embodiment of a wire placement device 770 is illustrated. The wire placement device 770 has a radially-extending shank 772 which is smaller in cross section than the narrowest opening 564 in the pie-shaped annular wire cavity 562 of mandrel 414. The shank 772 is mounted on an arbor 774 which in turn is connected to a drive (not shown) which is adapted to rotationally oscillate the arbor 774 and shank 772 in synchronism with the rotation of mandrel 414 for purposes to be described. The wire placement device 770 is generally L-shaped so as to have a circumferentially-projecting leg 776 disposed within the cavity 562. A wire guide head 778 is pivotedly mounted on the projecting leg 776 for rotation about a radially-extending axis. The wire guide head 778 is preferably a downward-opening U-shaped member having a stud extending from the bight of the U through a bore in the leg 776 which is secured for rotation with respect to the leg by a suitable cap as shown. The side walls of the wire guide head 778 are axially spaced apart so as to be close to the wire 416 but allow free passage of the wire 416 and are preferably as thin as practical to allow close placement of the wire 416 with respect to the converging walls 560 and 566 of the cavity 562.

In the operation of the alternate embodiment of FIGS. 40 and 40*a*, the shank 772 is rotationally oscillated about the axis on shank 772 in synchronism with the rotation of mandrel 414 and to a varied angular amount to position the wire placement head 778 at the desired lateral position within the converging portion of the cavity 562. The angular amount of rotation can be accomplished by a programmed control or by a cam and follower arrangement, the latter attached to a bellcrank connected for rotation with arbor 774. The position of the wire placement head 778 within the converging cavity 562 determines the position of the wire 416 within the cavity 562. Although the thickness of the side walls of the wire placement head 778 establishes the closeness of placement of the wire 416 to the walls 560 and 566, the wire 416 can be moved into contact with the wall 560 or 566 after placement by using a "wedging" turn as described in connection with FIG. 39.

It should be noted that the wire placement head 778 may be greater in axial dimension than the axial width of the narrowest opening 564 of the converging portion of the cavity 562 since the wire placement head 778 may be inserted from the opening at the top or bottom legs and moved into the converging position of cavity 562. It is neoessary, however, to dimension the shank 772 so that it can achieve the desired degree of rotation within the confines of the narrowest opening 564.

In FIG. 41, a modified version 780 of the alternate embodiment of a wire placement device is illustrated. The modified alternate embodiment 780 use a round shank 782 having a bend to provide a circumferentially extending leg 784. A U-shaped rod 786 is fixed to the end of the leg 784, preferably by welding or brazing. The U-shaped rod closely conforms to the wire 416 but allows free passage of the wire 416. The modified alternate embodiment 780 operates in essentially the same fashion as the embodiment 770, and consequently, the operation thereof will not be repeated here.

Core Wind-In Machine

In FIG. 42, an overall view is provided of the machine 600 used to wind the core material 602 into the completed low voltage and high voltage windings. The core wind-in machine 600 has two major subassemblies, a core insertion machine 604 and a coil dereeling machine 606. The two subassemblies are controlled by a suitable servo controller 608. In brief, the coil dereeling machine 606 supplies a continuous strip of core material from a pre-wound and annealed coil 614 to the core insertion machine 604 for rewinding onto a bobbin to form a magnetic core 20 of the toroidal transformer 10.

The coil dereeling machine 606 includes a base 610 having a horizontal turntable 612 which supports a pre-wound coil 614 of an annealed strip of the core material 602 for rotation about a vertical axis under the control of a motor 616. The motor 616 is a servo-controlled motor which drives the turntable 612 through a right angle reduction gear box 618 (shown in FIG. 43) having, for example, a gear reduction ratio of 30:1. The base 610 additionally has horizontal rails 620 and 622 which are secured to the top of base 610 and are disposed in parallel at opposite sides of the top surface of base 610. The horizontal rails 620 and 622 are adapted to support a guide chute assembly 624. The guide chute assembly 624 has rail guide bushings 626 on bottom plate 628 which have openings configured to receive and mate with the horizontal rails 620 and 622 and to allow back-and-forth sliding motion of the guide chute assembly 624 along the horizontal rails 620 and 622. The guide chute assembly 624 further includes a pair of vertical end brackets 630 and 632. Each end bracket 630 and 632 has a pair of vertical guide bushings 634 (only one being shown) which are configured to mate with and slidably receive vertical rails 636. The vertical rails 636 are in turn secured to end panels 638 and 640 to permit up and down motion of the end panels 638 and 640 by sliding movement of the vertical rails 636 in the vertical guide bushings 634. A transverse front guide chute panel 642 extends between and is secured to the side panels 638 and 64 and is preferably slightly tilted from the vertical as illustrated. The guide chute assembly 624 also includes a back guide chute panel 644 which is spaced from the front guide chute panel 642, for example, by suitable spacers (not shown), to allow passage of the core material 602 therebetween. Preferably, the space between the back guide chute panel 644 and the front guide chute panel 642 is adjustable, for example, by substitution of spacers having different lengths.

With more particular reference to FIG. 43, the structure and operation of the dereeling subassembly 606 can be better appreciated. In FIG. 43, the turntable 612 can be seen to be rotatable by the motor 616 via the gear box 618 to cause dereeling of the core material 602. The strip of core material 602 is dereeled through a directing passage 672 between the front guide panel 642 and the rear guide panel 644 which receives the strip of core material 602 from the inside of the pre-wound coil 614 and directs the strip of core material away from the coil 614. The directing passage 672 also coacts with the moving strip of core material 602 to apply a back force to the strip to prevent kinking during unwinding as explained below. The directing passage 672 is translatable leftwardly and rightwardly with respect to the coil 614 on horizontal rails 620 and 622, and is translatable up and down with respect to the coil 614 on vertical rails 636 (not shown in FIG. 43). Additionally, the directing passage 672 may be tilted relative to the axis of the turntable 612 and the coil 614 by virtue of a pivotal mounting between the end panels 638 and 640 and the end brackets 630 and 632, for example, by pivotal mounting of the mounting block 634 (FIG. 42). The angle of the passage 672 can be adjusted and fixed in position by a suitable bracket 674 having slot 676 which is secured by a bolt 678. The front panel 642 is provided with a bearing rod 699 which may be nonrotatable but provides a smooth curved surface over which the core material 602 is guided and which prevents the imposition of a sharp bend in the core material 602 at the upper edge of the front guide panel 642.

The back guide panel 644 is provided with a large number of small through holes 680 spaced both vertically and horizontally. The back guide panel 644 has a plenum housing 682 which provides a plenum chamber 684 communicating with the plurality of holes 680. The plenum chamber 684 is provided with a source of pressurized air 686 which is communicated to the plenum chamber 684 via a regulator valve 689 and a suitable hose 688. The rate of flow of air into the plenum chamber 684, and thus, the rate of air flow through the openings 680 is controlled by the regulator valve 689 to adjust the frictional force between the core material 602 and the back guide panel 644 of the directing passage 672.

Since the air bearing support provided by air flow through opening 680 is generally used to control rather than completely eliminate friction as the core material 602 passes through the passage 672, it is desirable that the core material 602 passing through passage 672 have a certain degree of back force due to gravity and friction in the direction of arrow 690. The back force in the direction of arrow 690 effectively pushes the strip of core material 602 against the internal diameter of the coil 614 to maintain the bend angle of the core material 602 as it lifts away from the inside of the coil 614 at an acceptably small angle of bending to prevent kinking. Without some back force in the direction of arrow 690, it has been found that the bend angle of the core material 602 as it peels away from its wound position can be excessive causing loss-inducing stresses in the core material 602. Since the directing passage 672 directs the strip of core material 602 in a generally upward direction, the force of gravity on the strip of core material contributes to the back force.

While the back force in the direction of arrow 690, provided by gravity and friction as the core material 602 traverses the passage 672 has been found to be effective in preventing sharp bending or kinking of the core material 602 as it lifts away from the inside of the coil 614, that back force may be provided by means other than gravity and friction. For example, that back force may be also provided by using magnetic energy to hold the core material 602 against the inside of the wound coil 614 until it lifts off under the influence of the dereeling force applied by rotation of the turntable 612. For example, the magnetic energy may be provided by the permanent magnet located either on the surface of the turntable 612 or on the radially-inside surface of arcuate plates 693 as illustrated in FIG. 44. Yet alternatively, the turntable 612 can be made of a nonmagnetic material such as aluminum or brass and electromagnet disposed beneath the turntable to selectively energize the annealed coil 614 through the nonmagnetic turntable 612.

The path of the strip of core material 602 from the inside of the pre-wound coil 614 on turntable 612 is best seen in FIG. 44. The strip of core material 602 upon exiting the wound coil 614 and traversing the directing passage 672 moves in an upward path slanting in the direction of rotation of the turntable 612 prior to transitioning to a horizontal orientation at the top of the directing passage 672. Such a slanted path minimizes the bending of the strip of core material 602 as it is dereeled from the wound coil 614.

As apparent from the illustration in FIG. 44, the turntable 612 is provided with a plurality of spaced vertical posts 691 disposed in a circular path and supporting arcuate plates 693, which define a cylindrical inside wall with the inside diameter of that cylindrical wall being slightly greater than the outside diameter of the wound coil 614 so as to accurately locate the wound coil 614 concentric to the axis of rotation of the turntable 612. The arcuate plates 693 may include permanent magnets which magnetically attract the turns of the wound coil 614. This magnetic attraction facilitates the dereeling of the core material 602 particularly when few turns of the core material 602 remain in the coil 614. When few turns remain, the weight of the remaining turns of the coil 614 is insufficient to prevent the coil 614 from sliding and rotating relative to the turntable 612. The magnetic attachment of the outer turns of the coil 614 to the arcuate plates 693 prevent such rotation so that the core material 602 continues to be smoothly dereeled from the wound coil 614. As previously described, the magnetic force applied by arcuate plates 693 may also assist in providing a back force in the direction of arrow 690.

As also illustrated in FIG. 44, the base 610 of the dereeling machine 606 can be provided with rotatable support wheels 695 which are preferably four in number and are positioned near the periphery of the turntable 612 for supporting the weight of the turntable 612 and the wound coil 614 of core material 602. The wheels 695 advantageously limit the otherwise required size and strength of the bearing supporting the central drive shaft of the turntable 612.

As also illustrated in FIG. 44, the front panel 642 of the dereeling machine 606 can be opened by virtue of a pivotal mounting of the left end of the front panel 642 using hinges 697 and a suitable latch at the right end of the front panel 642 by a latching means (not shown) to facilitate the initial installation of the coil 614.

As shown in FIG. 42, the core-insertion machine 604 includes a frame 650 which supports the partial transformer assembly 652 consisting of the high voltage winding 60, the low voltage winding 40, and the various insulating barriers 30 and 50 between the windings themselves and between the windings and the core. Additionally, the partial assembly 652 includes a bobbin 692 (shown in FIG. 45) having a hollow hub with internal gear teeth.

A servo-controlled motor 654 of the core insertion machine 604 is controlled by the servo-controller 608 so as to be driven in synchronism with the servo-controlled motor 616 of the core dereeling machine 606 so that the speed of the strip of core material 602 being wound into the winding assembly 652 matches the speed of the strip of core material 602 being unwound from the annealed coil 614 of the core material 602. The motor 654 is connected via a chain drive to a socket 740 (shown in FIG. 48) which engages a pinion shaft 656, shown in FIG. **42*a*. The pinion shaft 656 has two pinion portions 658 separated by an undercut portion 659, a socket engaging portion 660 including a J slot 661 as shown, a handle 662 and a bearing 664. The J slot 661 of the socket engaging portion 660 couples to a coupling pin (not shown) in the socket 740 (FIG. 48) so that the motor 654 rotatably drives the pinion 658. In turn, the pinions 658 engage the internal gear teeth of the bobbin 692 to rotate the bobbin 692. The coil wind-in pinion shaft 656 is supported by a pair of bearing support plates 666 (only one being shown in FIG. 42) disposed on opposite sides of the partial transformer assembly 652**.

The partial transformer assembly 652 is supported within the core-insertion machine 604 by a movable cradle 670 having oblique sides for engaging and thereby positioning the partial transformer assembly 652 as shown. The cradle 670 is raised and lowered by a suitable lift mechanism to correspondingly raise and lower the partial transformer assembly 652, as described in detail in connection with FIG. 47 and 48.

The strip of core material 602 is received from the coil dereeling machine 606 and is guided for winding onto the bobbin within the partial transformer assembly 652 by a suitable free-rolling conveyor 671. The conveyor 671 is configured to provide a gradual curved transition for the strip of core material 602 and may be adjustable for that purpose to suit core material 602 of different thicknesses, and therefore, of different curvature.

The path of the core material as it enters the core wind-in subassembly 604 is best seen in FIG. 45. In FIG. 45, the elements which control the strip of core material 602 as it winds into the bobbin 692 are illustrated. Rollers 694 of the free-rolling conveyor 671 are seen supporting the core material 602 in the horizontal position after having been dereeled from the dereeling machine 606. The strip of core material 602 passes beneath hold-down tines 696 which are fabricated of spring material and which bear radially inward upon the core material 602 to prevent lifting thereof during the core winding operation. Such lifting could occur, for example, if the strip of core material 602 catches on the side flanges of bobbin 692 during wind-on. Note that as bobbin 692 is rotated, a core build 698 of core material is effected within the prewound low voltage and high voltage transformer windings. As can be seen in the figure, the bobbin 692 includes a plurality of internal gear teeth 700 which are engaged by the pinions 658 of the pinion bobbin drive shaft 656. The bobbin 692 is disclosed in greater detail in FIG. 6.

To assure a tightly wound core build, a tension belt 704 is used which extends about and frictionally engages most of the periphery of the core build 698. Particularly, the drag belt 704 extends over a first horizontal pulley 706 and downwardly into the bobbin 692. The drag belt 704 then passes counter-clockwise about the periphery of the core build 698 and past a removable horizontal guide lip 708. The drag belt 704 thereafter passes over a second horizontal pulley 710 and into a tension-producing vacuum box 712 which contains a loop of the drag belt 704. The drag belt is fixedly connected to clamps 714 and 716 at its respective ends such that the tension applied to the drag belt 704 is predominantly a function of the tension produced by the vacuum box 712. The vacuum box 712 fits snugly with the sides of the drag belt 704 to contain a partial vacuum in the bottom cavity 718 of the vacuum box 712 as supplied by a suitable blower 720 or other vacuum source. The vacuum in the bottom 718 cavity of the vacuum box 712 creates a differential pressure across the drag belt 704 which pulls the drag belt loop downwardly to apply tension to the drag belt 704 thereby causing the friction between the drag belt 704 and the core build 698 to be controlled thereby. Note that the drag belt 704 contacts a substantial portion of the periphery of the outside turn of the core build 698, for example, approximately 270° or more. This substantial area of contact provides an even distribution of drag force to the core build 698.

With reference now to FIG. 46, the relationship of the hold-down tines 696 and the drag belt 704 can be best seen. In FIG. 46, the bobbin 692 is shown prior to the winding of any of the core material 602. Looking from the direction of the arrow in FIG. 45, the hold-down tines 696 are seen to be positioned at the lateral extremities of the interior of the bobbin 692 to engage the lateral extremities of the core material 602. The drag belt 704 is positioned approximately midway between the hold-down tines 696. A cylindrical guide bushing 722 is positioned at each side of the bobbin 692 for guiding the core material 602 into the bobbin 692. The guides 722 are preferably made of wear-resistant material such as carbide and are also preferably adjustably rotatable about their axes to present new wear surfaces to the core material 602 as necessary.

In FIG. 47 and 48, the apparatus for supporting and positioning the partial transformer assembly 652 is illustrated. The purpose of such positioning and supporting structure is to align the gear teeth of the bobbin 692 with the drive for the bobbin drive shaft 656 and to spread the respective halves of the winding subassemblies to provide a maximum opening for ingress and control of the core material 602 for winding on the bobbin 692 while maintaining the concentricity of the respective halves of the winding subassemblies. Such concentricity is desired since the unimpeded rotation of the bobbin requires an annular core cavity.

The cradle 670 is mounted on a horizontal slide platform 724 which in turn is mounted on an elevating platform 726 via a pair of parallel slide rails 728 and four guide bushings 730 which slidably receive the guide rails 728. By virtue of the slidable mounting of the platform 724, the cradle 670 can be slid frontwardly, i.e., outwardly of frame 650, to permit easy removal and replacement of transformer assemblies 652 before and after the core wind-in operation. The elevating platform 726 is mounted on a pair of diagonally-disposed jack screws 732 (only one being shown) and a pair of diagonally disposed guide rods 734 via jack nuts 736 and guide bushing 738, respectively. The jack screws 732 are driven in synchronism (by a drive not illustrated) to raise and lower the elevating platform 726, and consequently, to raise and lower the cradle 670 thereby positioning the partial core assembly 652 accurately relative to the drive socket 740 for the bobbin drive shaft 656.

Accurate positioning of the partial core assembly 652 relative to the drive socket 740 can be facilitated by an optional fine-adjust mechanism disposed between the horizontally-slidable platform 724 and the cradle 670. The fine-adjust mechanism 744 may consist of a slidable wedge for elevating an intermediate platform 742 on which the cradle 670 resides or may consist of a low-hydraulic piston and cylinder arrangement. The fine-adjust mechanism 744 would be used complmentary to the jack screw 732 and jack nut 736 height adjusting mechanism to provide fine adjustments in the height of cradle 670 to accurately position the partial transformer assembly 652 with respect to the drive socket 740 to provide appropriate engagement between the teeth 700 of the bobbin 692 and the pinion 658 of the bobbin drive shaft 656. This alignment is illustrated in FIG. 48 in which the two sets of teeth 700 of the bobbin 692 are seen to be engaged with the two sets 658 of pinion teeth of the bobbin drive shaft 656.

Accurate positioning of the transformer assembly 652 is also accomplished by the cooperation of the cradle 670 and a wedge insertion mechanism 746 which is adapted to forcibly separate the halves of the transformer assembly to provide a maximum practical entry passage for wind-in of the core material 602. More particularly, the wedge mechanism 746 includes a pair of axially spaced wedge members **748*a* and 748*b* having converging side surfaces which define an included angle of 30°. The wedge members 748 are forcibly positioned between the halves of the transformer assembly 652. Such forcible positioning of the wedge members 748 causes the closure of the arcuate gap between the halves of the transformer assembly 652 at the lower portion thereof and opens the arcuate gap between such halves at the upper portion thereof to 30°. Such opening of the upper arcuate gap to 30° facilitates wind-in of the core material 602**.

As can be seen in FIG. 48, the wedge members 748 are sufficiently axially-spaced to permit unimpeded ingress of the full width of the core material 602. Additionally, the support provided by the three points of engagement of the cradle 670 in cooperation with the locating effect of the wedge members 748 rigidly locates the transformer assembly 652 so that the arcuate passages through each of the halves of the transformer assembly are aligned concentrically. The concentric alignment of the arcuate passages through the halves of the transformer assembly is necessary to allow the annular bobbin 692 to freely rotate within the transformer assembly 652. If the arcuate passage walls within the transformer assembly 652 did not define substantially perfect circles, the bobbin 692 would tend to bind with and abrade the core insulation tube 30, thereby increasing substantially the bobbin drive force and risking stripping of the bobbin teeth.

It should be noted that the concentric alignment of the halves of the transformer assembly 652 is in addition to the requirement that the pinion gears 658 of the drive shaft 656 be accurately aligned with the gear teeth on surfaces 700 of the bobbin 692; such accurate alignment of the pinion gears and gear teeth is also facilitated by the wedge members 748 and the three point support provided by the cradle 670.

The wedge members 748 are forcibly driven by means of an air piston and cylinder 750 which is pivotedly connected to one end of a centrally-bifurcated actuating arm 752. The actuating arm 752 is pivotedly connected at its other end to a fulcrum 754 which is fixed relative to frame 650. The actuating arm is bifurcated at its central position to provide two axially spaced center arms 756. Each axially spaced center arm 756 is aligned with and carries one wedge member *748a* or *748b* via a short link 758 which is pivotedly connected to the respective center arm 756 and is rigidly connected to the wedge member *748a* or *748b*. The pivoted connection of each link 758 allows the wedge members 748 to self-align to the transformer assembly 652. Contraction of the piston and cylinder 750 causes forcible downward movement of the wedge member 748 to spread the upper arcuate gap of the transformer assembly 652 and causes the accurate alignments as described above.

After the bobbin halves *692a*, *692b* have been inserted into the insulation tube 30 and the transformer assembly 652 has been spread and aligned, the core material 602 can be wound onto the bobbin 692 by rotation of the drive shaft 656. The drive shaft 656 is rotated by the synchronous motor 654 through the drive belt and coupling 740 as previously described. During wind-in of the core material 602, the drag belt 704 frictionally engages the outside turn of the core build to maintain a tight build of core material 602. The spring tines 696 bear radially upon the core material 602 to prevent lift up during occasional engagements between the side flanges 698 of the bobbin 692 and the edges of the core material 602. After the core is nearly completely wound, the drag belt 704 is removed to eliminate its bulk and the last several turns of the core material 602 are wound onto bobbin 692. Upon completion of core wind-in, the transformer assembly 652 is removed from the core winding machine 604 by lifting the wedge members 748, lowering the cradle 670, and sliding clear of the transformer assembly 652 the lift platform 724 outwardly. Thereafter, the halves of the transformer assembly 652 are rotated to provide equal arcuate gaps of 15° between the two winding sections. Spacers 80 are then installed to fix the winding sections in position.

The foregoing discussion discloses and describes merely exemplary methods and embodiments of the present invention. One skilled in the art will readily recognize from such discussion that various changes, modifications and variations may be made therein without departing from the spirit and scope of the invention described in the following claims.

What is claimed is:

1. An apparatus for unreeling a strip of metallic material of a composition suitable for use as the core of a transformer from the inside of a wound coil of the material, said apparatus comprising:

turntable means for rotating the coil about its axis in a direction to continually unwind the strip of material from the inside of the coil;

directing means including a directing passage for receiving the strip of material from the inside of the coil and for directing the strip of material away from the coil, said directing passage coacting with the strip of material for applying a force along the strip of material toward the inside of the coil and acting against the unwinding of the strip from the inside of the coil to limit the degree of bending of the strip as it separates from the inside of the coil during unwinding;

receiving means for receiving the strip of material upon exiting from said directing passage; and winding the strip of material into a core of an electrical transformer.

2. An apparatus as recited in claim 1 wherein said directing means is adapted to provide a frictional force between the strip of material and said directing passage due to sliding contact between the strip of material and said directing passage, said frictional force being applied to the strip of material to act against the unwinding of the strip from the inside of the coil.

3. An apparatus as recited in claim 2 further comprising source means for providing pressurized air and air bearing means communicating with said directing passage and said source of pressurized air for utilizing said pressurized air for reducing said frictional force applied to the strip of material as the strip of material moves through said directing passage.

4. An apparatus as recited in claim 3 wherein said air bearing means includes a plenum chamber containing pressurized air from said source means, and also includes a porous member forming a portion of said directing passage and disposed between said plenum chamber and the strip of material, and wherein pressurized air flows from said plenum chamber and through said porous member toward the strip of material to reduce the contact force between the strip of material and said porous member to thereby reduce said frictional force.

5. An apparatus as recited in claim 4 wherein said air bearing means further includes adjustable pressure control means for adjusting the pressure of the air within said plenum chamber to adjust the amount of reduction in said frictional force provided by said air bearing means.

6. An apparatus as recited in claim 2 wherein said directing means is adapted to direct the strip of material away from the coil in a generally upward direction, and wherein said force applied applied to the strip of material further includes a gravity force due to the weight of the strip of material, said gravity force being applied to the strip of material to act against the unwinding of the strip from the inside of the coil.

7. An apparatus as recited in claim 1 wherein said directing means is adapted to direct the strip of material away from the coil in a generally upward direction, and wherein said force applied to the strip of material includes a gravity force due to the weight of the strip of material, said gravity force being applied to the strip of material to act against the unwinding of the strip from the inside of the coil.

8. An apparatus as recited in claim 7 wherein said turntable means includes a turntable and means for rotatably driving said turntable about a substantially vertical axis coextensive with the axis of the coil.

9. An apparatus as recited in claim 1 wherein said turntable means includes a turntable that is rotatably driven about a substantially vertical turntable axis by servo motor means, and also includes coil mounting means for mounting the coil onto said turntable at a position coaxial to said turntable axis.

10. An apparatus as recited in claim 9 wherein said coil mounting means includes coil support means for retaining the outer diameter of the coil, said coil support means having an axially extending cylindrical surface coaxial to said turntable axis and with an inner diameter adapted for receiving the outer diameter of the coil.

11. An apparatus as recited in claim 10 wherein said coil mounting means additionally includes magnetic means for magnetically attracting and retaining the outer diameter of the coil to said inner diameter of said coil support means.

12. An apparatus as recited in claim 1 wherein said directing means includes first and second guide chute panels defining said directing passage therebetween, said guide chute panels extending from a location proximate the inside of the coil where the strip of material enters said directing passage to a location away from the coil where the strip of material exits said directing passage, and also includes support means for supporting said guide chute panels in spatial relation to the coil.

13. An apparatus as recited in claim 12 wherein said first and second guide chute panels are generally planar in shape and are disposed substantially parallel.

14. An apparatus as recited in claim 13 wherein said support means includes means for adjusting the spacing between said first and second guide chute panels to vary the height of said directing passage.

15. An apparatus as recited in claim 12 wherein said support means includes means for translating said guide chute panels in a direction parallel to the axis of the coil to vary the axial separation distance between said directing passage and the coil.

16. An apparatus as recited in claim 12 wherein said support means includes means for translating said guide chute panels in a direction transverse to the axis of the coil to vary the transverse separation distance between said directing passage and the coil.

17. An apparatus as recited in claim 12 wherein said support means includes means for tilting said guide chute panels with respect to the axis of the coil to vary the direction of travel of the strip of material within said directing passage.

18. An apparatus for unreeling a strip of metallic material of a composition suitable for use as the core of a transformer from the inside of a coil of the material, said apparatus comprising:

- a turntable for rotating the coil about its axis in a direction to continually unwinding the strip of material from the inside of the coil;
- a directing passage for receiving the strip of material from the inside of the coil and for directing the strip of material away from the coil;
- means for applying a retarding force to the strip of material directed toward the inside of the coil to push the strip against the inside of the coil to minimize bending of the strip as it separates from the inside of the coil during unwinding; and
- receiving means for receiving the strip of material from said directing passage for winding the strip of material into a core of an electrical transformer.

19. An apparatus as recited in claim 18 wherein said means for applying said retarding force to the strip of material includes said directing passage coacting with the strip of material to apply a frictional force to the strip of material in the direction opposite to the direction of motion of the strip of material.

20. An apparatus as recited in claim 19 wherein said means for applying said retarding force to the strip of material further includes source means for providing pressurized air and air bearing means communicating with said directing passage and said source of pressurized air for utilizing said pressurized air for reducing said frictional force applied to the strip of material as the strip of material moves through said directing passage.

21. An apparatus as recited in claim 20 wherein said air bearing means includes a plenum chamber containing pressurized air from said source means, and also includes a porous member forming a portion of said directing passage and disposed between said plenum chamber and the strip of material, and wherein pressurized air flows from said plenum chamber and through said porous member toward the strip of material to reduce the contact force between the strip of material and said porous member to thereby reduce said frictional force.

22. An apparatus as recited in claim 21 wherein said air bearing means further includes adjustable pressure control means for adjusting the pressure of the air within said plenum chamber to adjust the amount of reduction in said frictional force provided by said air bearing means.

23. An apparatus as recited in claim 19 wherein said means for applying said retarding force to the strip of material further includes means for directing the strip of material away from the coil in a generally upward direction whereby a gravity force due to the weight of the strip of material acts to push the strip of material toward the inside of the coil.

24. An apparatus as recited in claim 23 wherein said turntable includes means for rotatably driving said turntable about a substantially vertical axis coextensive with the axis of the coil.

25. An apparatus as recited in claim 18 wherein said turntable is rotatably driven about a substantially vertical turntable axis by servo motor means, and includes coil mounting means for mounting the coil onto said turntable at a position coaxial to said turntable axis.

26. An apparatus as recited in claim 25 wherein said coil mounting means includes coil support means for retaining the outer diameter of the coil, said coil support means having an axially extending cylindrical surface coaxial to said turntable axis with an inner diameter adapted for receiving the outer diameter of the coil.

27. An apparatus as recited in claim 26 wherein said coil mounting means further includes magnetic means for magnetically attracting and retaining the outer diameter of the coil to said inner diameter of said coil support means.

28. An apparatus as recited in claim 18 wherein said receiving means includes means for winding the strip of material into a core of an electrical transformer.

29. An apparatus as recited in claim 18 wherein said directing passage is defined between first and second guide chute panels, said guide chute panels extending from a location proximate the inside of the coil where the strip of material enters said directing passage to a location away from the coil where the strip of material exits said directing passage, and wherein said apparatus further comprises support means for supporting said guide chute panels in spatial relation to the coil.

30. An apparatus as recited in claim 29 wherein said guide chute panels are generally planar in shape and are disposed substantially parallel.

31. An apparatus as recited in claim 30 wherein said support means includes means for adjusting the spacing between said first and second guide chute panels to vary the height of said directing passage.

32. An apparatus as recited in claim 29 wherein said support means includes means for translating said guide chute panels in a direction parallel to the axis of the coil to vary the axial separation distance between said directing passage and the coil.

33. An apparatus as recited in claim 29 wherein said support means includes means for translating said guide chute panels in a direction transverse to the axis of the coil to vary the transverse separation distance between said directing passage and the coil.

34. An apparatus as recited in claim 29 wherein said support means includes means for tilting said guide chute panels with respect to the axis of the coil to vary the direction of travel of the strip of material within said directing passage.

35. A method for unreeling a strip of metallic material of a composition suitable for use as the core of a transformer from the inside of a coil of the material, said method comprising the steps of:

unwinding the coil by rotating the coil about its axis in a direction to continually unwind the strip of material from the inside of the coil;

receiving the strip of material from the inside of the coil in a directing passage and directing the strip of material away from the coil;

applying a retarding force to the strip of material directed toward the inside of the coil to push the strip against the inside of the coil to minimize bending of the strip as it separates from the inside of the coil during unwinding; and receiving the strip of material from said directing passage for winding the strip of material into a core of an electrical transformer.

36. A method as recited in claim 35 wherein said step of applying said retarding force to the strip of material includes applying a frictional force to the strip of material in the direction opposite to the direction of motion of the strip of material by sliding contact between the strip of material and said directing passage.

37. A method as recited in claim 36 wherein said step of applying said retarding force to the strip of material further includes reducing said frictional force applied to the strip of material as the strip of material moves through said directing passage using air bearing means communicating with said directing passage.

38. A method as recited in claim 37 wherein said step of reducing said frictional force includes supplying pressurized air through a porous member and into said directing passage toward the strip of material to reduce the contact force between the strip of material and said porous member to thereby reduce said frictional force.

39. A method as recited in claim 38 wherein said step of reducing said frictional force further includes adjusting the supply of pressurized air to adjust the amount of reduction in said frictional force.

40. A method as recited in claim 36 wherein said step of applying said retarding force to the strip of material further includes directing the strip of material away from the coil in a generally upward direction to increase said retarding force by the weight of the strip of material.

41. A method as recited in claim 35 wherein said step of unwinding the coil by rotating the coil about its axis includes mounting the coil onto a turntable having a substantially vertical turntable axis at a position coaxial to said turntable axis, and rotatably driving said turntable by servo motor means.

42. A method as recited in claim 41 wherein said step of mounting the coil onto said turntable includes retaining the outer diameter of the coil in coil support means having an axially extending cylindrical surface coaxial to said turntable axis with an inner diameter adapted for receiving the outer diameter of the coil.

43. A method as recited in claim 42 wherein said step of mounting the coil onto said turntable further includes magnetically attracting and retaining the outer diameter of the coil to said inner diameter of said coil support means.

44. A method as recited in claim 35 wherein said step of receiving the strip of material from said directing passage includes rewinding the strip of material into a core of an electrical transformer.

45. A method as recited in claim 35 further comprising the step of positioning said directing passage in spatial relation to the coil to orient said directing passage to receive the strip of material as it is unwound from the coil.

46. A method as recited in claim 45 wherein said step of positioning said directing passage includes translating said directing passage in a direction parallel to the axis of the coil to vary the axial separation distance between said directing passage and the coil.

47. A method as recited in claim 45 wherein said step of positioning said directing passage includes translating said directing passage in a direction transverse to the axis of the coil to vary the transverse separation distance between said directing passage and the coil.

48. A method as recited in claim 45 wherein said step of positioning said directing passage includes tilting said directing passage with respect to the axis of the coil to vary the direction of travel of the strip of material within said directing passage.

* * * * *